US010150389B2

(12) United States Patent
Cohen et al.

(10) Patent No.: US 10,150,389 B2
(45) Date of Patent: Dec. 11, 2018

(54) CAR SEAT AND CONNECTION SYSTEM

(71) Applicant: Pidyon Controls Inc., New York, NY (US)

(72) Inventors: Yochanan Cohen, New York, NY (US); Velissa Van Scoyoc, Philadelphia, PA (US); Ahmet T. Becene, West Simsbury, CT (US); Ekaterina Kravchenko, Philadelphia, PA (US); Peter Byar, Willingboro, NJ (US)

(73) Assignee: Pidyon Controls Inc., New York, NY (US)

( * ) Notice: Subject to any disclaimer, the term of this patent is extended or adjusted under 35 U.S.C. 154(b) by 88 days.

(21) Appl. No.: 15/152,180

(22) Filed: May 11, 2016

(65) Prior Publication Data

US 2016/0332542 A1 Nov. 17, 2016

Related U.S. Application Data

(63) Continuation-in-part of application No. 14/838,847, filed on Aug. 28, 2015, which is a (Continued)

(51) Int. Cl.
*B60N 2/42* (2006.01)
*B60N 2/26* (2006.01)
*B60N 2/28* (2006.01)

(52) U.S. Cl.
CPC ......... *B60N 2/2875* (2013.01); *B60N 2/2821* (2013.01); *B60N 2/2887* (2013.01); *B60N 2/2884* (2013.01)

(58) Field of Classification Search
None
See application file for complete search history.

(56) References Cited

U.S. PATENT DOCUMENTS 2,911,652 A  11/1959 Ekman
3,015,104 A  1/1962 Crosson et al.
(Continued)

FOREIGN PATENT DOCUMENTS

CN  201320533171.1  * 8/2013  ........... B60N 2/2884
EP  1953035  8/2008

OTHER PUBLICATIONS

Children, NHTSA Traffic Safety Facts, 2003, National Center for Statistics and Analysis, DOT HS 809 762.
(Continued)

*Primary Examiner* — Joshua J Michener
*Assistant Examiner* — Kyle J. Walraed-Sullivan
(74) *Attorney, Agent, or Firm* — Gordon & Jacobson, P.C.

(57) ABSTRACT

Embodiments of a car seat include an outer protective shell, an inner seat, a suspension system connecting and permitting relative movement between the inner seat and the outer protective shell. The suspension system may include a plurality of deformable metal straps. Also, embodiments of a car seat system include a frame constructed to couple to a vehicle seat. The frame has a vertical portion that extends upwardly substantially along a vehicle seatback. The vertical portion extends at least half of the height of vehicle seatback. Also, the system includes a car seat constructed to couple to the frame.

24 Claims, 52 Drawing Sheets

Related U.S. Application Data continuation-in-part of application No. 14/197,855, filed on Mar. 5, 2014, now Pat. No. 9,487,110, and a continuation-in-part of application No. PCT/US2014/020527, filed on Mar. 5, 2014, which is a continuation-in-part of application No. 13/785,555, filed on Mar. 5, 2013, now Pat. No. 8,911,015.

(60) Provisional application No. 62/160,185, filed on May 12, 2015, provisional application No. 62/043,947, filed on Aug. 29, 2014.

(56) References Cited

U.S. PATENT DOCUMENTS

| | | | |
|---|---|---|---|
| 3,023,134 | A | 2/1962 | Creswell et al. |
| 3,174,155 | A | 3/1965 | Pitman |
| 3,186,004 | A | 6/1965 | Carlini |
| 3,320,619 | A | 5/1967 | Latsnik et al. |
| 3,479,666 | A | 11/1969 | Webb |
| 3,577,562 | A | 5/1971 | Holt |
| 3,818,508 | A | 6/1974 | Lammers |
| 3,906,546 | A | 9/1975 | Gooding |
| 3,957,303 | A * | 5/1976 | Mauron ............... B60N 2/2839 297/216.11 |
| 4,101,983 | A | 7/1978 | Dera et al. |
| 4,106,124 | A | 8/1978 | Green |
| 4,345,338 | A | 8/1982 | Frieder, Jr. et al. |
| 4,484,364 | A | 11/1984 | Mitchell et al. |
| 4,599,752 | A | 7/1986 | Mitchell |
| 4,690,455 | A | 9/1987 | Bailey et al. |
| 4,845,786 | A | 7/1989 | Chiarella |
| 4,937,888 | A | 7/1990 | Straus |
| 4,972,527 | A | 11/1990 | Wallace |
| 5,018,220 | A | 5/1991 | Lane et al. |
| 5,143,420 | A | 9/1992 | Switlik |
| 5,149,165 | A * | 9/1992 | Woolley ............... B60N 2/4235 180/274 |
| 5,204,998 | A | 4/1993 | Liu |
| 5,259,071 | A | 11/1993 | Scott et al. |
| 5,324,064 | A * | 6/1994 | Sumser ............... A47D 13/043 108/120 |
| 5,409,294 | A | 4/1995 | Czemakowski |
| 5,451,094 | A * | 9/1995 | Templin ............... B60N 2/4221 296/68.1 |
| 5,466,044 | A | 11/1995 | Barley et al. |
| 5,475,878 | A | 12/1995 | Dawn et al. |
| 5,611,596 | A | 3/1997 | Barley et al. |
| 5,630,645 | A | 5/1997 | Lumley et al. |
| 5,638,544 | A | 6/1997 | Sump |
| 5,680,656 | A | 10/1997 | Gath |
| 5,724,681 | A | 3/1998 | Sykes |
| 5,758,859 | A * | 6/1998 | Gonzalez ............... B60N 2/4235 248/420 |
| 5,845,968 | A | 12/1998 | Lovie |
| 5,916,828 | A | 6/1999 | Messner |
| 5,930,840 | A | 8/1999 | Arai |
| 5,947,552 | A | 9/1999 | Wilkins et al. |
| 5,951,102 | A | 9/1999 | Poulson et al. |
| 5,956,777 | A | 9/1999 | Popovich |
| 5,961,180 | A | 10/1999 | Greger et al. |
| 5,997,086 | A | 12/1999 | Gibson et al. |
| 5,997,098 | A | 12/1999 | Coffeen |
| 6,017,088 | A | 1/2000 | Stephens et al. |
| 6,027,163 | A | 2/2000 | Longenecker |
| 6,032,297 | A | 3/2000 | Barthold et al. |
| 6,048,028 | A | 4/2000 | Bapst |
| 6,070,890 | A | 6/2000 | Haut et al. |
| 6,079,780 | A | 6/2000 | Bapst |
| 6,082,814 | A | 7/2000 | Celestina-Krevh et al. |
| 6,109,689 | A * | 8/2000 | Nanni ............... B60N 2/2821 248/638 |
| 6,139,101 | A | 10/2000 | Berringer et al. |
| 6,155,638 | A | 12/2000 | Bapst |
| 6,161,847 | A | 12/2000 | Howell et al. |
| 6,170,910 | B1 | 1/2001 | Bapst |
| 6,272,692 | B1 | 8/2001 | Abraham |
| 6,296,259 | B1 * | 10/2001 | Anderson ............ B60N 2/2806 280/30 |
| 6,319,138 | B1 | 11/2001 | Fair et al. |
| 6,322,140 | B1 * | 11/2001 | Jessup ................. B60N 2/4221 296/68.1 |
| 6,325,454 | B1 | 12/2001 | Maier |
| 6,331,032 | B1 | 12/2001 | Haut et al. |
| 6,367,875 | B1 | 4/2002 | Bapst |
| 6,389,607 | B1 | 5/2002 | Wood |
| 6,409,205 | B1 | 6/2002 | Bapst et al. |
| 6,421,840 | B1 | 7/2002 | Chen et al. |
| 6,428,099 | B1 | 8/2002 | Kain |
| 6,431,647 | B2 | 8/2002 | Yamazaki |
| 6,450,576 | B1 | 9/2002 | Rhein et al. |
| 6,457,774 | B2 | 10/2002 | Baloga |
| 6,471,298 | B2 | 10/2002 | Carine et al. |
| 6,474,735 | B1 | 11/2002 | Carnahan et al. |
| 6,513,827 | B1 | 2/2003 | Barenbrug |
| 6,540,292 | B2 | 4/2003 | Darling et al. |
| 6,540,579 | B1 | 4/2003 | Gubitosi et al. |
| 6,561,915 | B2 | 5/2003 | Kelly et al. |
| 6,623,074 | B2 | 9/2003 | Asbach et al. |
| 6,626,489 | B2 | 9/2003 | Geis et al. |
| 6,629,727 | B2 | 10/2003 | Asbach et al. |
| 6,634,708 | B2 | 10/2003 | Guenther |
| 6,666,505 | B2 | 12/2003 | Greger et al. |
| 6,669,302 | B2 | 12/2003 | Warner, Jr. et al. |
| 6,679,550 | B2 | 1/2004 | Goor et al. |
| 6,695,412 | B2 | 2/2004 | Barger et al. |
| 6,705,675 | B1 | 3/2004 | Eastman et al. |
| 6,705,676 | B1 | 3/2004 | Berringer et al. |
| 6,709,062 | B2 | 3/2004 | Shah |
| 6,746,080 | B2 | 6/2004 | Tsugimatsu et al. |
| 6,749,258 | B1 | 6/2004 | Leikin |
| 6,764,133 | B2 | 7/2004 | Osato |
| 6,796,610 | B2 | 9/2004 | Nakagawa et al. |
| 6,811,217 | B2 | 11/2004 | Kane et al. |
| 6,820,310 | B2 | 11/2004 | Woodard et al. |
| 6,857,965 | B2 | 2/2005 | Pook et al. |
| 6,877,801 | B2 | 4/2005 | Asbach et al. |
| 6,877,802 | B2 | 4/2005 | Christensen et al. |
| 6,877,809 | B2 | 4/2005 | Yamazaki et al. |
| 6,887,161 | B2 | 5/2005 | Mahlstedt et al. |
| 6,896,575 | B2 | 5/2005 | Fair et al. |
| 6,912,736 | B2 | 7/2005 | Moeller et al. |
| 6,926,359 | B2 | 8/2005 | Runk |
| 6,931,671 | B2 | 8/2005 | Skiba |
| 6,932,709 | B1 | 8/2005 | Gubitosi et al. |
| 7,017,921 | B2 | 3/2006 | Eros |
| 7,044,548 | B2 | 5/2006 | Mullen et al. |
| 7,044,549 | B2 | 5/2006 | Maier et al. |
| 7,062,795 | B2 | 6/2006 | Skiba et al. |
| 7,066,536 | B2 | 6/2006 | Williams et al. |
| 7,188,897 | B2 | 3/2007 | Patrizi et al. |
| 7,195,314 | B2 | 3/2007 | Spence et al. |
| 7,201,444 | B2 | 4/2007 | Schimmoller et al. |
| 7,207,628 | B2 | 4/2007 | Eros |
| 7,234,771 | B2 | 6/2007 | Nakhla |
| 7,244,165 | B2 | 7/2007 | Gubitosi et al. |
| 7,246,855 | B2 | 7/2007 | Langmaid et al. |
| 7,252,342 | B2 | 8/2007 | Patrizi et al. |
| 7,270,373 | B2 | 9/2007 | Sakamoto |
| 7,278,683 | B2 | 10/2007 | Williams et al. |
| 7,278,684 | B2 | 10/2007 | Boyle |
| 7,322,648 | B2 | 1/2008 | Nakagawa |
| 7,325,871 | B2 | 2/2008 | Gangadharan et al. |
| 7,325,872 | B2 | 2/2008 | Basu et al. |
| 7,328,462 | B1 | 2/2008 | Straus |
| 7,328,941 | B2 | 2/2008 | Asbach et al. |
| 7,338,122 | B2 | 3/2008 | Hei et al. |
| 7,370,912 | B2 | 5/2008 | Williams et al. |
| 7,387,336 | B2 | 6/2008 | Sakumoto |
| 7,413,158 | B1 * | 8/2008 | Burer ................. B60N 2/42736 248/421 |
| 7,438,644 | B2 | 10/2008 | Gubitosi et al. |
| 7,445,228 | B2 | 11/2008 | Henry |
| 7,445,559 | B2 | 11/2008 | Kakuda |

(56) References Cited

U.S. PATENT DOCUMENTS

| | | |
|---|---|---|
| 7,452,031 B2 | 11/2008 | Woellert et al. |
| 7,455,353 B2 | 11/2008 | Favorito et al. |
| 7,467,824 B2 | 12/2008 | Nakhla et al. |
| 7,472,952 B2 | 1/2009 | Nakhla et al. |
| 7,472,955 B2 | 1/2009 | Crane et al. |
| 7,484,801 B2 | 2/2009 | Kassai et al. |
| 7,488,034 B2 | 2/2009 | Ohren et al. |
| 7,497,449 B2 | 3/2009 | Logger |
| 7,506,926 B2 | 3/2009 | Carine |
| 7,523,984 B2 | 4/2009 | Steininger |
| 7,536,731 B1 | 5/2009 | Feldman |
| 7,552,969 B2 | 6/2009 | Maciejczyk |
| 7,559,606 B2 | 7/2009 | Hei et al. |
| 7,597,396 B2 | 10/2009 | Longenecker et al. |
| 7,607,734 B2 | 10/2009 | Clapper et al. |
| 7,648,199 B2 | 1/2010 | Amesar et al. |
| RE41,121 E | 2/2010 | Asbach et al. |
| 7,658,446 B2 | 2/2010 | Meeker et al. |
| 7,676,854 B2 | 3/2010 | Berger et al. |
| 7,695,374 B2 | 4/2010 | Bellows et al. |
| 7,717,506 B2 | 5/2010 | Amesar et al. |
| 7,722,118 B2 | 5/2010 | Bapst et al. |
| 7,726,734 B2 | 6/2010 | Mahal et al. |
| 7,740,313 B1 | 6/2010 | Hei et al. |
| 7,765,621 B2 | 8/2010 | Lardeau |
| 7,765,622 B2 | 8/2010 | Wiles |
| 7,770,970 B2 | 8/2010 | Hei et al. |
| 7,770,971 B2 | 8/2010 | Bellows et al. |
| 7,796,021 B2 | 9/2010 | Saban |
| 7,798,500 B2 | 9/2010 | Den Boer |
| 7,798,571 B2 | 9/2010 | Billman et al. |
| 7,802,320 B2 | 9/2010 | Morgan |
| 7,802,321 B2 | 9/2010 | Boyd |
| 7,806,471 B2 | 10/2010 | Nishimoto |
| 7,806,472 B2 | 10/2010 | Runk et al. |
| 7,810,682 B2 | 10/2010 | Balensiefer et al. |
| 7,832,023 B2 | 11/2010 | Crisco |
| 7,837,275 B2 | 11/2010 | Woellert et al. |
| 7,841,657 B2 | 11/2010 | Nishimoto et al. |
| 7,871,125 B2 | 1/2011 | Asbach et al. |
| 7,887,129 B2 | 2/2011 | Hei et al. |
| 7,891,732 B2 | 2/2011 | Hei et al. |
| 7,930,771 B2 | 4/2011 | Depreitere et al. |
| 7,938,731 B2 | 5/2011 | Papageorge et al. |
| 7,954,895 B2 | 6/2011 | Freeman et al. |
| 7,967,376 B2 | 6/2011 | Przybylo et al. |
| 7,987,525 B2 | 8/2011 | Summers et al. |
| 8,020,220 B2 | 9/2011 | McElroy et al. |
| 8,029,014 B2 | 10/2011 | Ahnert et al. |
| 8,047,608 B2 | 11/2011 | Damiani et al. |
| 8,056,975 B2 | 11/2011 | Longenecker et al. |
| 8,070,226 B2 | 12/2011 | Dingler et al. |
| 8,070,227 B2 | 12/2011 | Brunick et al. |
| 8,087,680 B2 | 1/2012 | Dotsey et al. |
| 8,147,345 B2 | 4/2012 | Furman |
| 8,166,573 B1 | 5/2012 | Chung et al. |
| 8,182,033 B2 | 5/2012 | Hei et al. |
| 8,182,355 B2 | 5/2012 | Bapst |
| 8,197,005 B2 | 6/2012 | Hopke et al. |
| 8,205,940 B2 | 6/2012 | Mahal et al. |
| 8,209,784 B2 | 7/2012 | Nimmons et al. |
| 8,210,610 B2 | 7/2012 | Berkey et al. |
| 8,235,461 B2 | 8/2012 | Cohen |
| 8,235,465 B2 | 8/2012 | Hei et al. |
| 8,240,772 B2 | 8/2012 | Kawata et al. |
| 8,256,840 B2 | 9/2012 | Dasent et al. |
| 8,256,841 B2 | 9/2012 | Hei et al. |
| 8,286,990 B2 | 10/2012 | Tanizaki et al. |
| 8,297,694 B2 | 10/2012 | Arnold, IV et al. |
| 8,308,239 B2 | 11/2012 | Lundeen |
| 8,348,337 B2 | 1/2013 | Franck et al. |
| 8,388,058 B2 | 3/2013 | Krasley |
| 8,393,679 B2 | 3/2013 | Longenecker et al. |
| 8,408,656 B2 | 4/2013 | Carpenter |
| 8,419,129 B2 | 4/2013 | Inoue et al. |
| 8,424,964 B2 | 4/2013 | Campbell et al. |
| 8,430,452 B2 | 4/2013 | Brunick et al. |
| 8,434,827 B2 | 5/2013 | Young et al. |
| 8,449,030 B2 | 5/2013 | Powell et al. |
| 8,459,739 B2 | 6/2013 | Tamanouchi et al. |
| 8,474,907 B2 | 7/2013 | Weber et al. |
| 8,491,401 B2 | 7/2013 | Szymanski |
| 8,500,196 B2 | 8/2013 | Strong et al. |
| 8,511,749 B2 | 8/2013 | Hei et al. |
| 8,534,751 B2 | 9/2013 | Hei et al. |
| 8,540,312 B2 | 9/2013 | Asbach et al. |
| 8,550,556 B2 | 10/2013 | Asbach |
| 8,556,349 B2 | 10/2013 | Welch et al. |
| 8,622,478 B2 | 1/2014 | Spence |
| 8,632,127 B2 | 1/2014 | Brunick et al. |
| 8,640,267 B1 | 2/2014 | Cohen |
| 8,684,456 B2 | 4/2014 | Powell |
| 8,690,237 B2 | 4/2014 | Allen |
| 8,864,229 B2 | 10/2014 | Rajasingham |
| 8,911,015 B2 | 12/2014 | Cohen et al. |
| 8,960,794 B2 | 2/2015 | St. Pierre |
| 8,991,935 B2 | 3/2015 | Balensiefer |
| 9,016,781 B2 | 4/2015 | Cheng et al. |
| 9,388,875 B2 | 7/2016 | Hagelin et al. |
| 9,527,413 B1 * | 12/2016 | Thyagarajan ...... B60N 2/42736 |
| 9,682,642 B2 * | 6/2017 | Fujita ........................ B60N 2/54 |
| 2001/0032351 A1 | 10/2001 | Nakayama et al. |
| 2002/0000743 A1 | 1/2002 | Mori |
| 2002/0043830 A1 | 4/2002 | Sawamoto |
| 2003/0062996 A1 | 4/2003 | Flannagan et al. |
| 2003/0222775 A1 | 12/2003 | Rackham |
| 2004/0164529 A1 * | 8/2004 | Yoshida ................ B60N 2/2806 |
| | | 280/730.2 |
| 2004/0169406 A1 * | 9/2004 | Yoshida ................ B60N 2/2812 |
| | | 297/216.11 |
| 2004/0232747 A1 * | 11/2004 | Yamazaki ............ B60N 2/2806 |
| | | 297/250.1 |
| 2004/0250339 A1 | 12/2004 | Musal |
| 2004/0255370 A1 | 12/2004 | Moeller |
| 2005/0030188 A1 | 2/2005 | Flannagan |
| 2005/0200465 A1 | 9/2005 | Fabors et al. |
| 2005/0278834 A1 | 12/2005 | Lee |
| 2006/0059605 A1 | 3/2006 | Ferrara |
| 2006/0059606 A1 | 3/2006 | Ferrara |
| 2006/0162053 A1 | 7/2006 | Lee |
| 2006/0242752 A1 | 11/2006 | Talluri |
| 2006/0267386 A1 | 11/2006 | Nakhla et al. |
| 2006/0277664 A1 | 12/2006 | Akhtar |
| 2007/0040428 A1 | 2/2007 | Sakumoto |
| 2007/0046086 A1 | 3/2007 | Sakumoto |
| 2007/0068282 A1 | 3/2007 | Nakagawa et al. |
| 2007/0080568 A1 | 4/2007 | Nakagawa et al. |
| 2007/0107112 A1 | 5/2007 | Boyd |
| 2007/0119538 A1 | 5/2007 | Price |
| 2007/0130673 A1 | 6/2007 | Wasserkrug |
| 2007/0157370 A1 | 7/2007 | Joubert Des Ouches |
| 2007/0226881 A1 | 10/2007 | Reinhard et al. |
| 2007/0284924 A1 | 12/2007 | Gold et al. |
| 2007/0296252 A1 * | 12/2007 | Mattes .................... B60N 2/242 |
| | | 297/216.1 |
| 2008/0054692 A1 | 3/2008 | Lhomme et al. |
| 2008/0222782 A1 | 9/2008 | Stokes |
| 2009/0026815 A1 | 1/2009 | Amesar et al. |
| 2009/0102253 A1 * | 4/2009 | Forbes ................. B60N 2/2821 |
| | | 297/216.11 |
| 2009/0222964 A1 | 9/2009 | Wiles |
| 2009/0241305 A1 | 10/2009 | Buckingham |
| 2009/0256406 A1 * | 10/2009 | Schrooten ............ B60N 2/2821 |
| | | 297/256.16 |
| 2009/0315299 A1 | 12/2009 | Barenbrug |
| 2010/0060046 A1 * | 3/2010 | Vertegaal ............. B60N 2/2824 |
| | | 297/216.11 |
| 2010/0295347 A1 | 11/2010 | Marsden et al. |
| 2011/0018320 A1 * | 1/2011 | Schneider ................ B60N 2/24 |
| | | 297/216.17 |
| 2011/0047678 A1 | 3/2011 | Barth et al. |
| 2011/0107503 A1 | 5/2011 | Morgan |
| 2011/0179557 A1 | 7/2011 | Rabie |

(56) References Cited

U.S. PATENT DOCUMENTS

| | | |
|---|---|---|
| 2011/0203024 A1 | 8/2011 | Morgan |
| 2011/0227376 A1* | 9/2011 | Franck ............... B60N 2/2809 297/216.11 |
| 2011/0227383 A1* | 9/2011 | Strong ............... B60N 2/2806 297/250.1 |
| 2011/0233975 A1* | 9/2011 | Mindel ............... B60N 2/24 297/216.17 |
| 2011/0241391 A1* | 10/2011 | Lamparter ............... B60N 2/24 297/216.1 |
| 2011/0272925 A1 | 11/2011 | Dijkstra |
| 2012/0013157 A1 | 1/2012 | Keegan et al. |
| 2012/0060251 A1 | 3/2012 | Schimpf |
| 2012/0151663 A1 | 6/2012 | Rumbaugh |
| 2012/0186002 A1 | 7/2012 | Bhatnagar et al. |
| 2012/0216339 A1 | 8/2012 | Nimmons et al. |
| 2012/0233745 A1 | 9/2012 | Veazie |
| 2013/0015690 A1 | 1/2013 | Mendis et al. |
| 2013/0088057 A1 | 4/2013 | Szakelyhidi et al. |
| 2013/0093227 A1* | 4/2013 | Mendes ............... A47D 13/107 297/274 |
| 2013/0125294 A1 | 5/2013 | Ferrara |
| 2013/0185837 A1* | 7/2013 | Phipps ............... A42B 3/12 2/2.5 |
| 2013/0340147 A1 | 12/2013 | Giles |
| 2014/0216241 A1* | 8/2014 | Lamparter ............... B60N 2/502 89/36.08 |
| 2014/0354021 A1* | 12/2014 | Sedlack ............... B60N 2/2821 297/216.11 |
| 2015/0130218 A1* | 5/2015 | Levin ............... B60N 2/502 296/187.09 |
| 2015/0175035 A1* | 6/2015 | Balensiefer, II ..... B60N 2/2812 297/256.15 |
| 2015/0251567 A1 | 9/2015 | Cohen et al. |
| 2015/0300785 A1* | 10/2015 | Lamparter ............... F41H 7/046 297/216.17 |
| 2016/0059744 A1 | 3/2016 | Cohen et al. |
| 2016/0059748 A1 | 3/2016 | Cohen et al. |
| 2016/0078737 A1 | 3/2016 | Cohen et al. |
| 2016/0207427 A1* | 7/2016 | Wang ............... B60N 2/286 |
| 2017/0320411 A1* | 11/2017 | Mani ............... B60N 2/42709 |

OTHER PUBLICATIONS

Children Injured in Motor Vehicle Traffic Crashes, NHTSA, May 2010, DOT HS 811 325.
U.S. Appl. No. 62/043,947, filed Aug. 29, 2014, Cohen et al.
U.S. Appl. No. 62/043,955, filed Aug. 29, 2014, Cohen et al.
U.S. Appl. No. 62/160,185, filed May 12, 2015, Cohen et al.
Helmets Preventing Concussion Seen Quashed by NFL-Riddell, John Helyar, Mar. 18, 2013, Bloomberg.

* cited by examiner

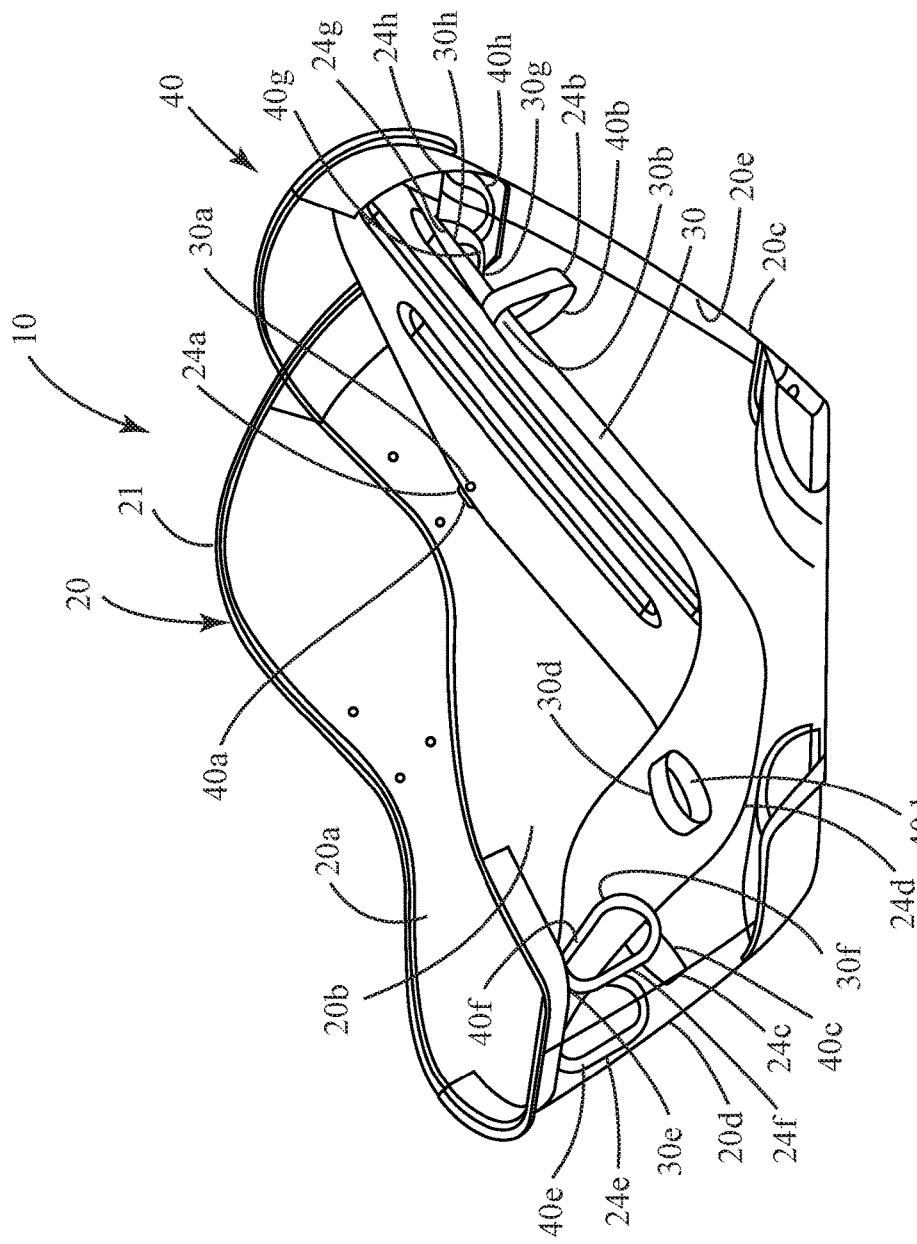

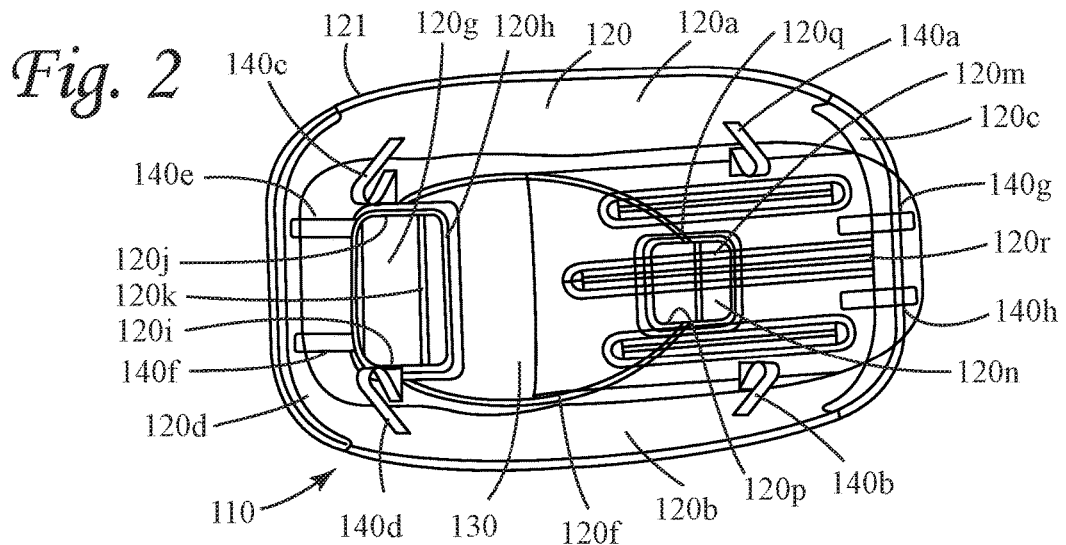
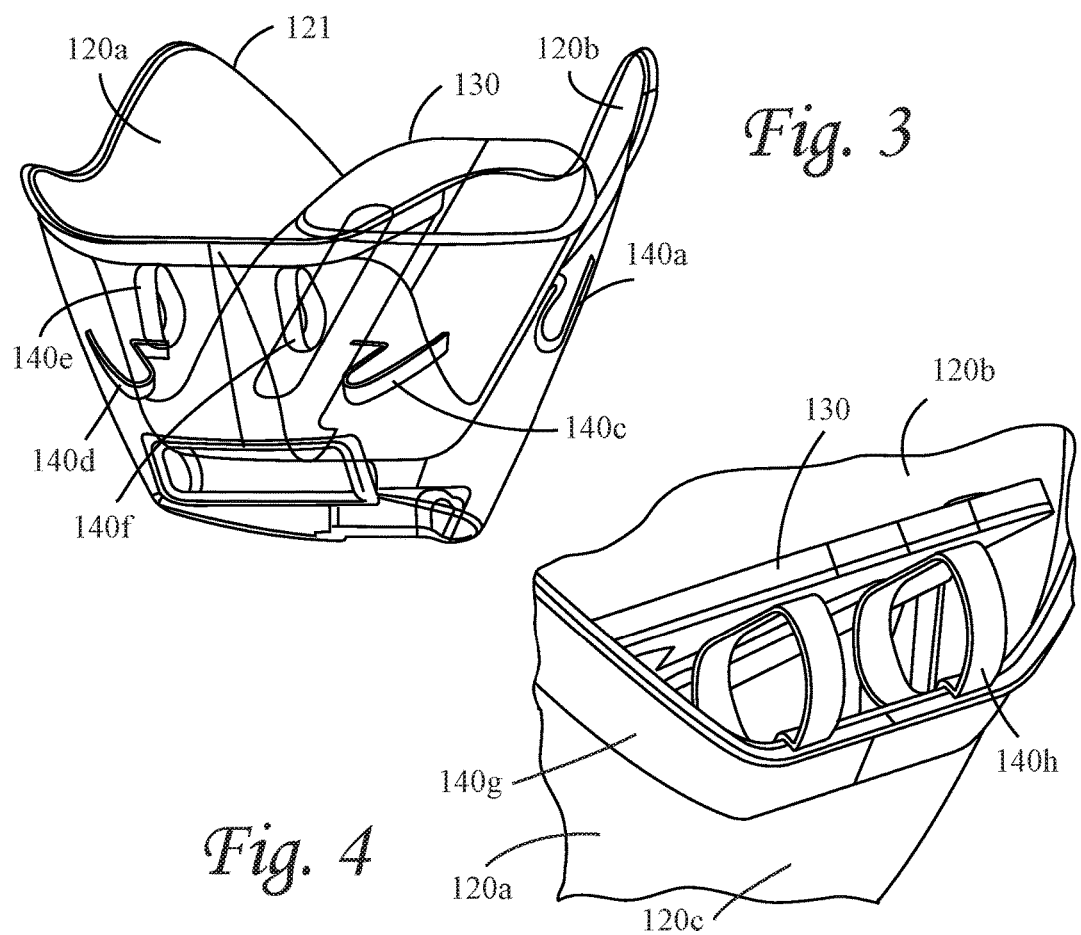

Fig. 16A

Automobile Rear Seat Depth

| Vehicle | Seat Depth (mm) | Seat Depth (in.) | Seat Angle |
|---|---|---|---|
| 1999 Volkswagon Beetle | 450 | 17.717 | 8 |
| 1990 Honda Civic | 480 | 18.898 | 9.3 |
| 1996 Chevy Cavalier | 490 | 19.291 | 8.2 |
| 1994 Honda Civic | 500 | 19.685 | 12.9 |
| 2002 Ford Focus | 500 | 19.685 | 12.6 |
| 2006 Honda Ridgeline | 500 | 19.685 | 11.4 |
| 2008 Toyota Highlander | 505 | 19.882 | 8.8 |
| 2008 Ford Taurus X | 510 | 20.079 | 6.7 |
| 2008 Subaru Tribeca | 510 | 20.079 | 9 |
| 2007 Mazda CX-9 | 515 | 20.276 | 11 |
| 2003 Honda Odyssey | 520 | 20.472 | 13.4 |
| 2007 Ford Edge | 520 | 20.472 | 15.1 |
| 2007 Ford Expedition | 520 | 20.472 | 10.2 |
| 2007 Saturn Vue | 520 | 20.472 | 8.6 |
| 2006 Volkswagon Passat | 530 | 20.866 | 11 |
| 2007 Ford 500 | 540 | 21.260 | 15 |
| 1996 Ford Taurus | 545 | 21.457 | 16.8 |
| 2008 Nissan Sentra | 555 | 21.850 | 10.3 |
| 2007 Jeep Commander | 560 | 22.047 | 12.3 |
| 2002 Honda CRV | 570 | 22.441 | 9.4 |
| 2005 Honda Odyssey | 570 | 22.441 | 12.7 |
| 2006 Dodge Durango | 575 | 22.638 | 14.4 |
| 1996 Chrysler Concord | 620 | 24.409 | 18 |
| 2009 Chevy Equinox | 690 | 27.165 | 10.8 |
| Average | | 20.989 | 11.496 |

*measurements taken from the Rear Seat Study by the SAE & NHTSA

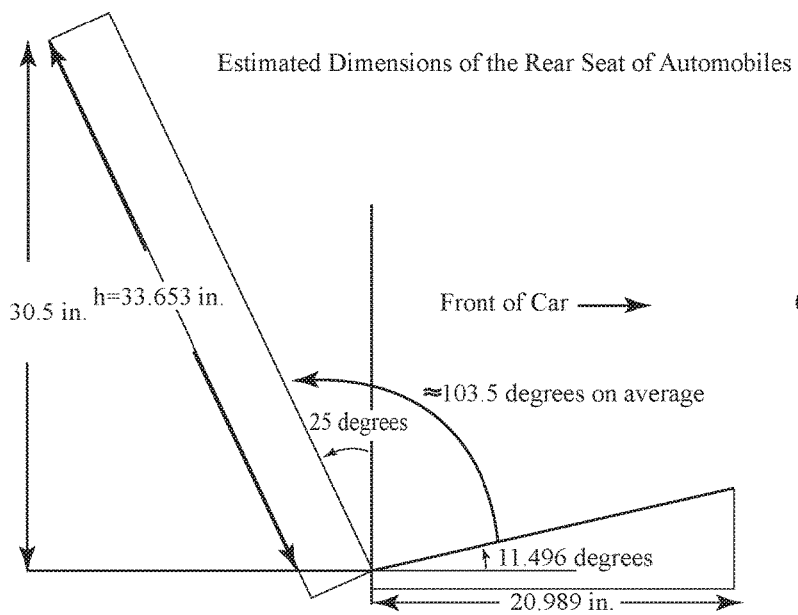

Fig. 16B

Estimated Dimensions of the Rear Seat of Automobiles

*Bottom Seat Angle and Seat Depth taken from average measurements from the Rear Seat Study by the SAE & NHTSA
*Seat Height measurements taken from Motor Vehicle Restraint Systems and Booster Seats Safety Regulations
*Back Seat Angle taken from IS 13749: Automotive vehicles - Procedure for determining the 'H' point and the torso angle for 50th percentile adult male in seating positions of motor vehicles (2009)

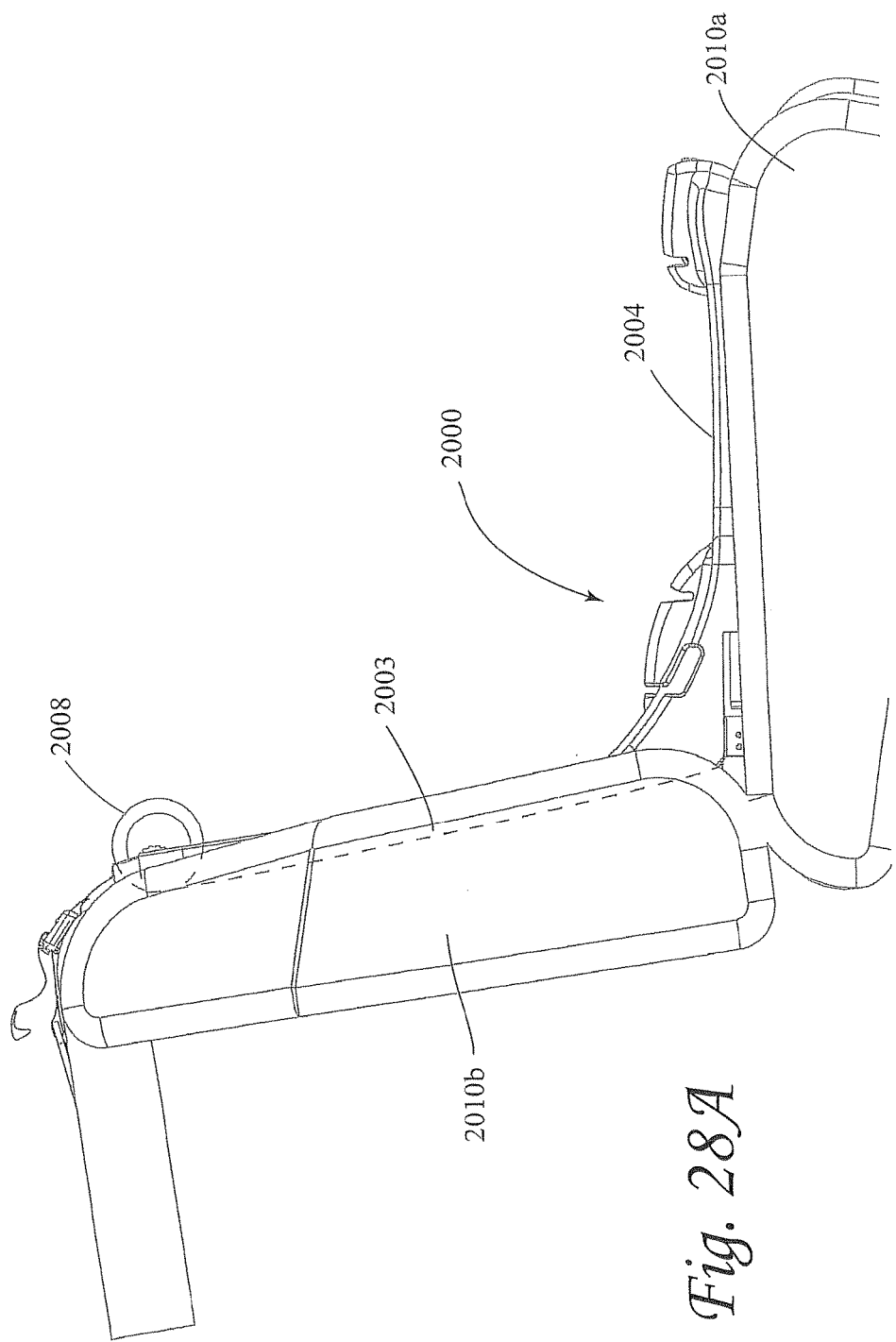

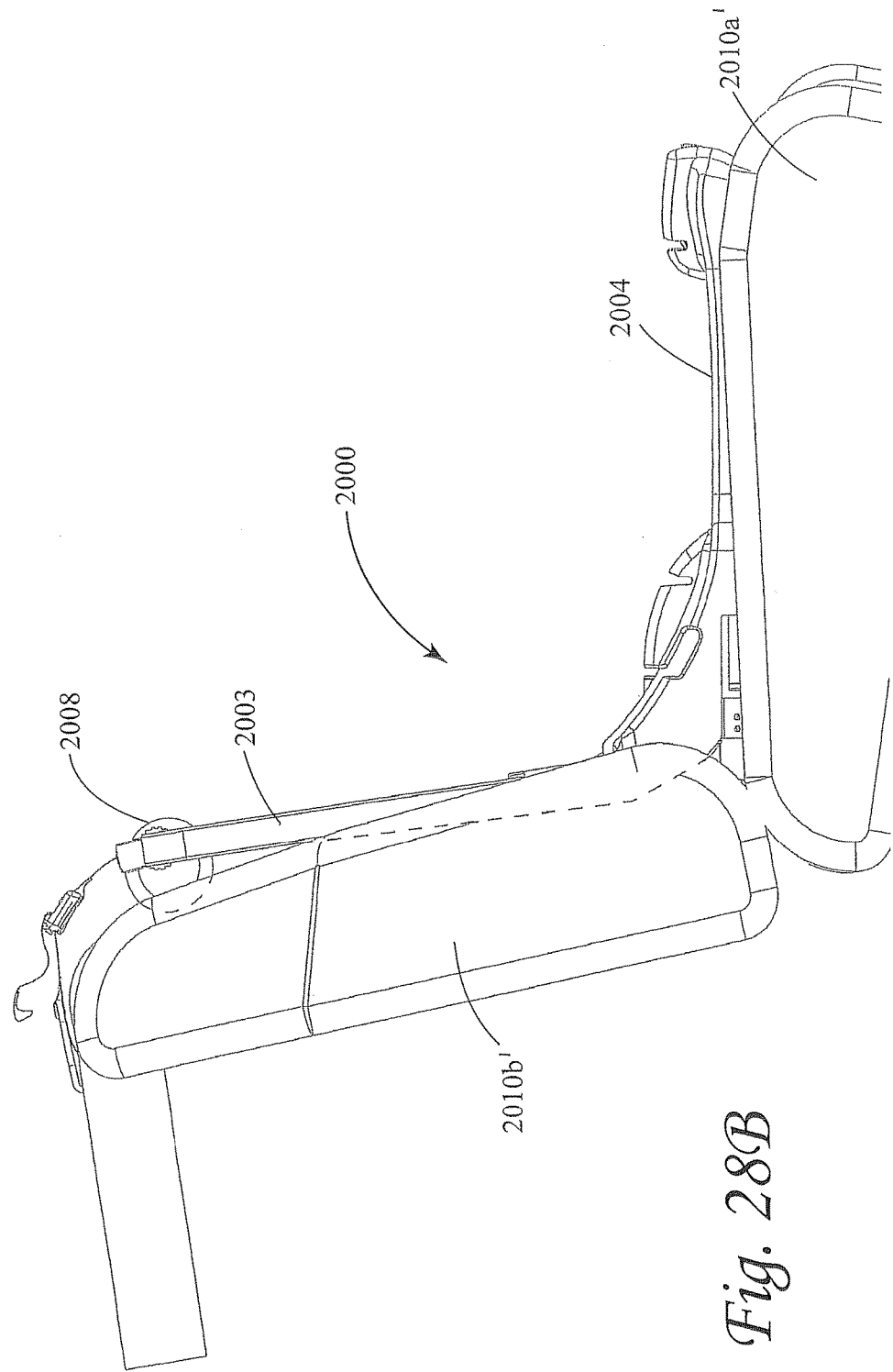

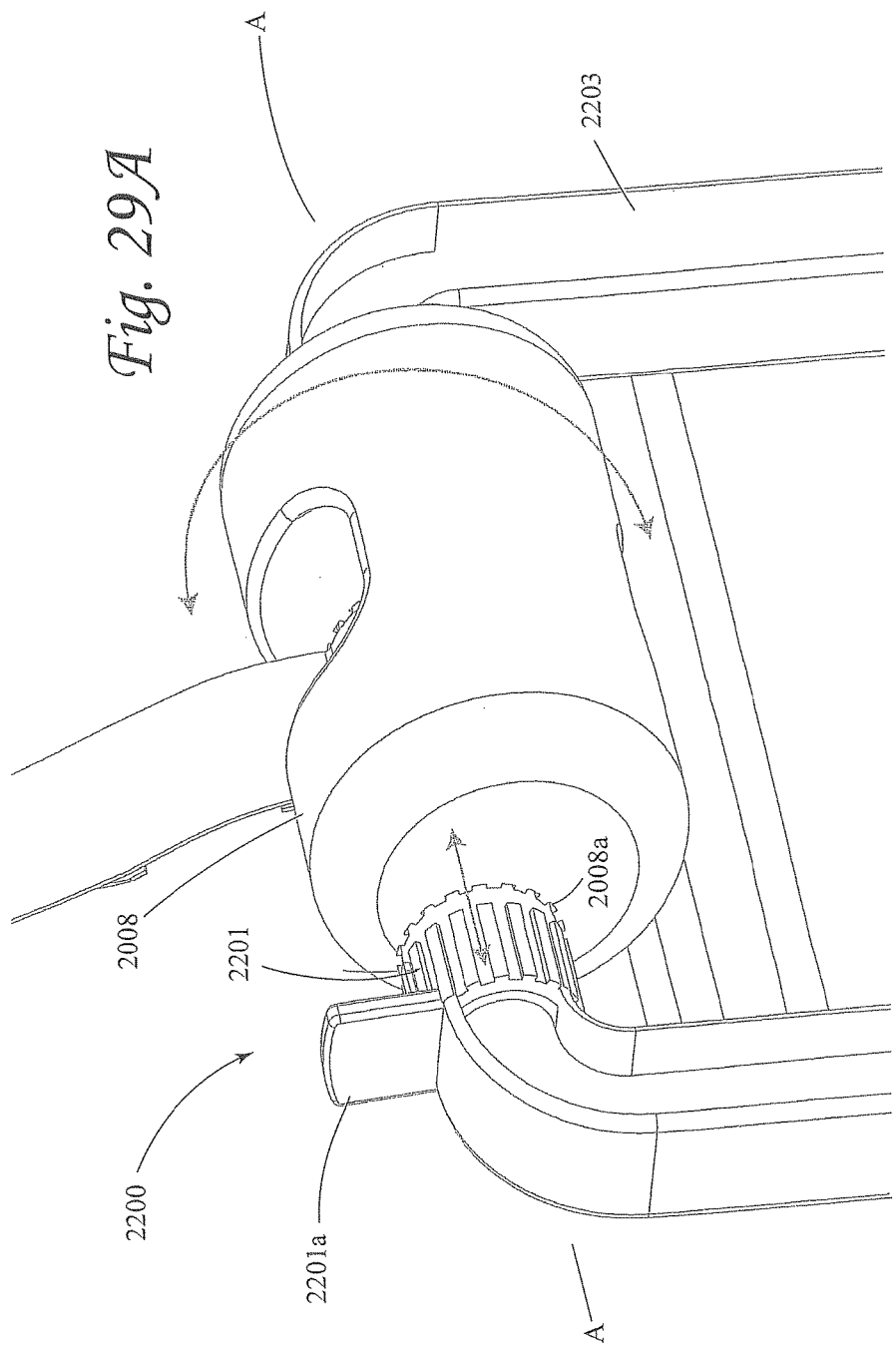

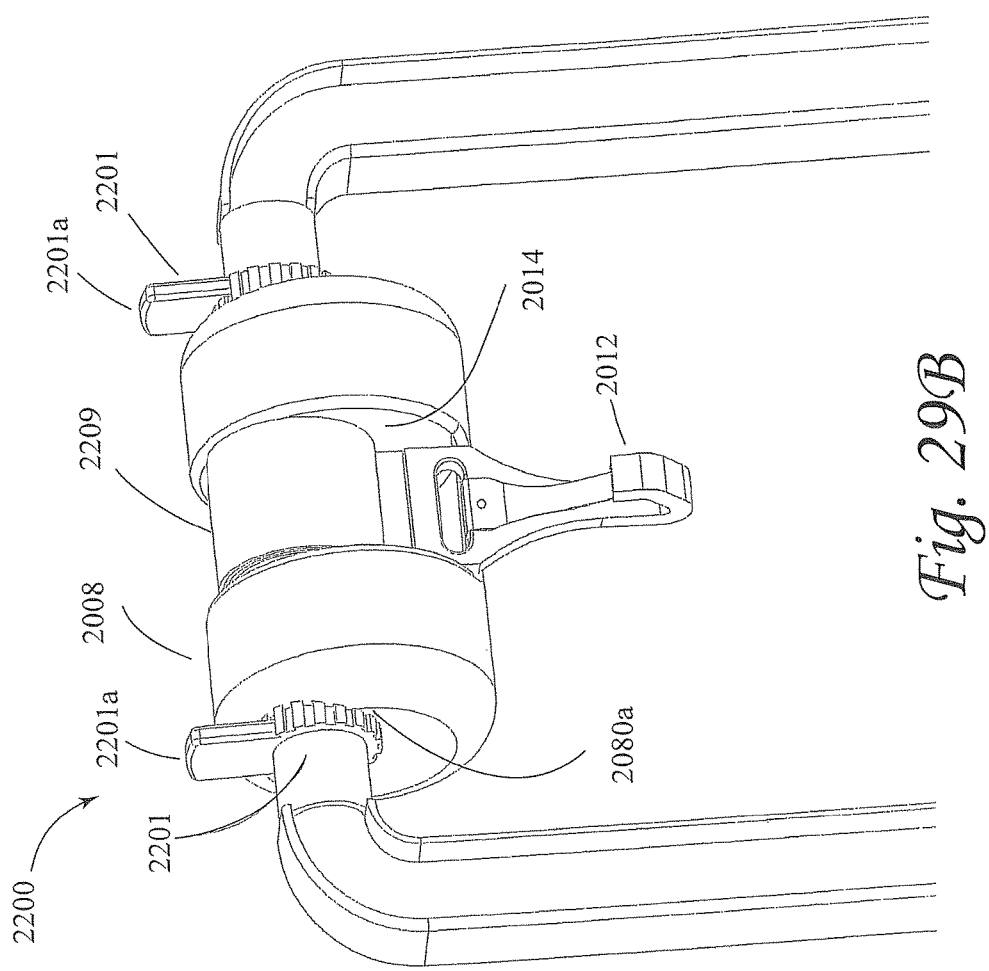

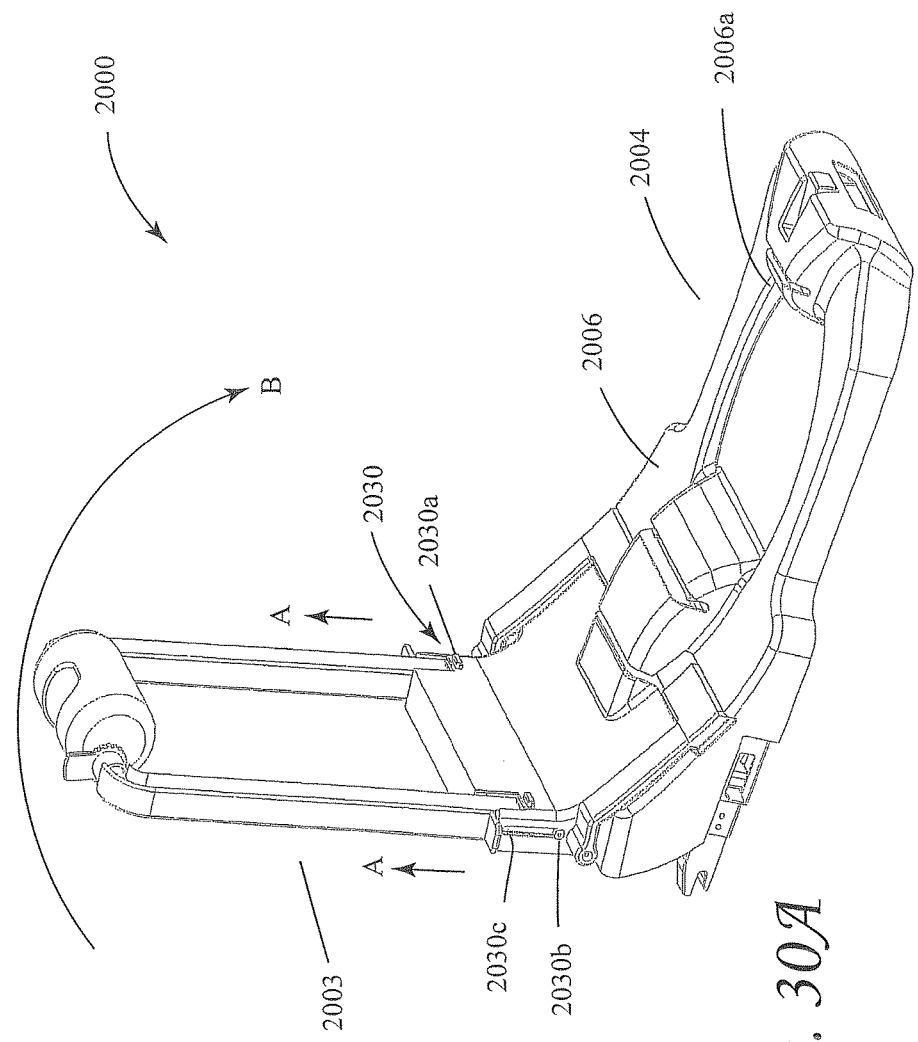

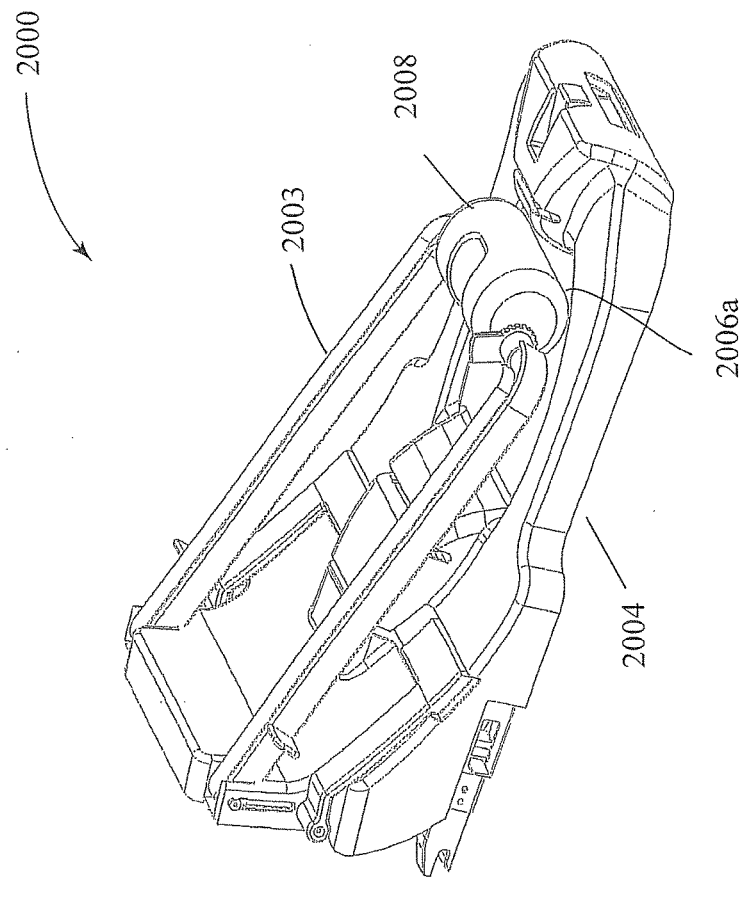

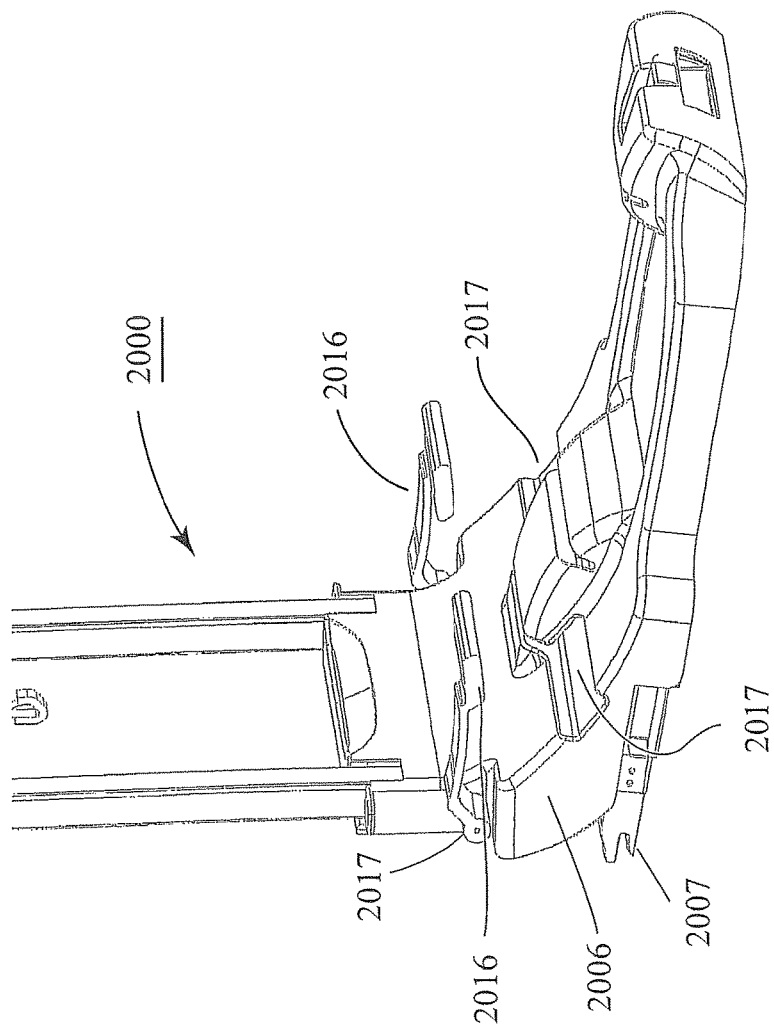

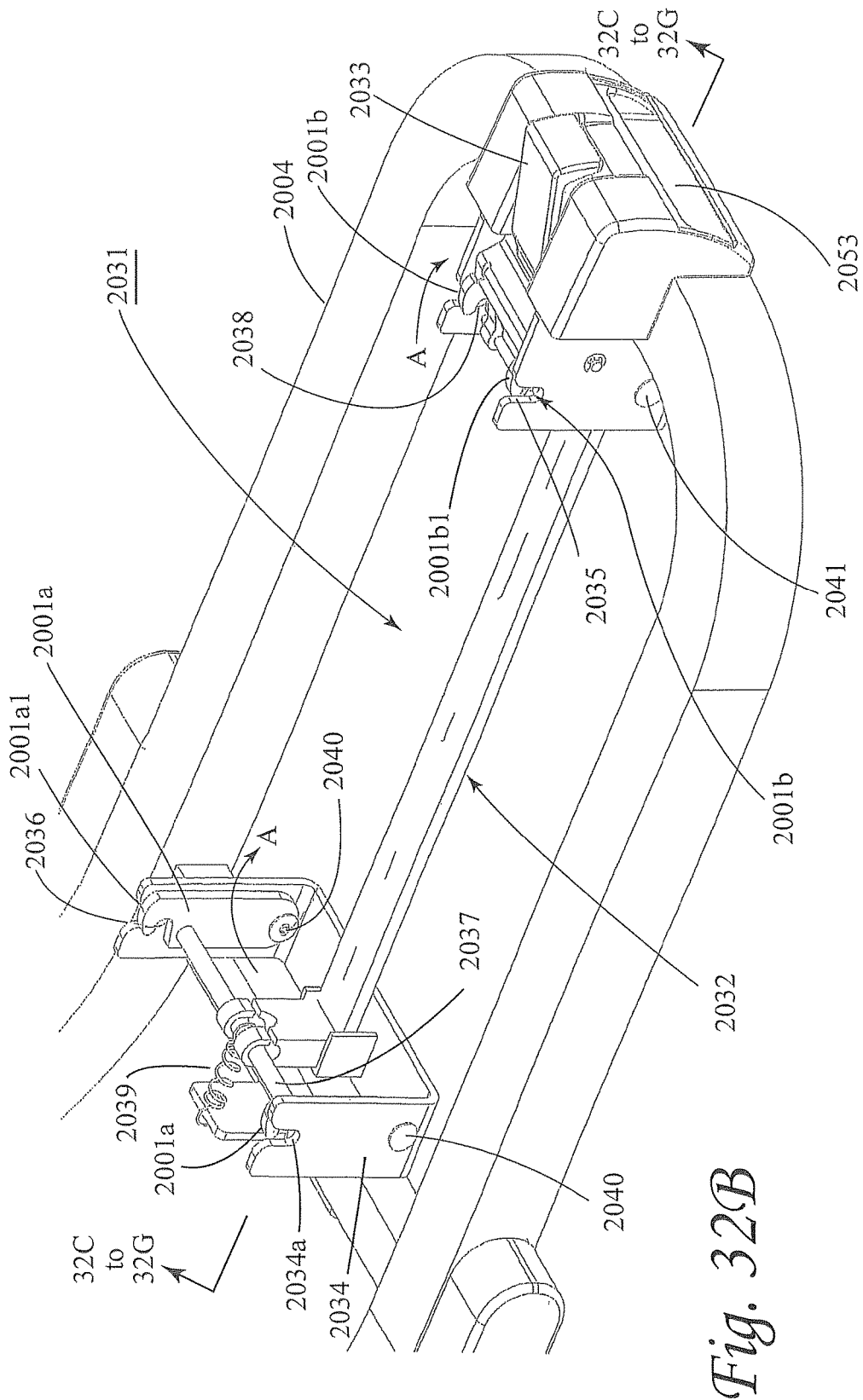

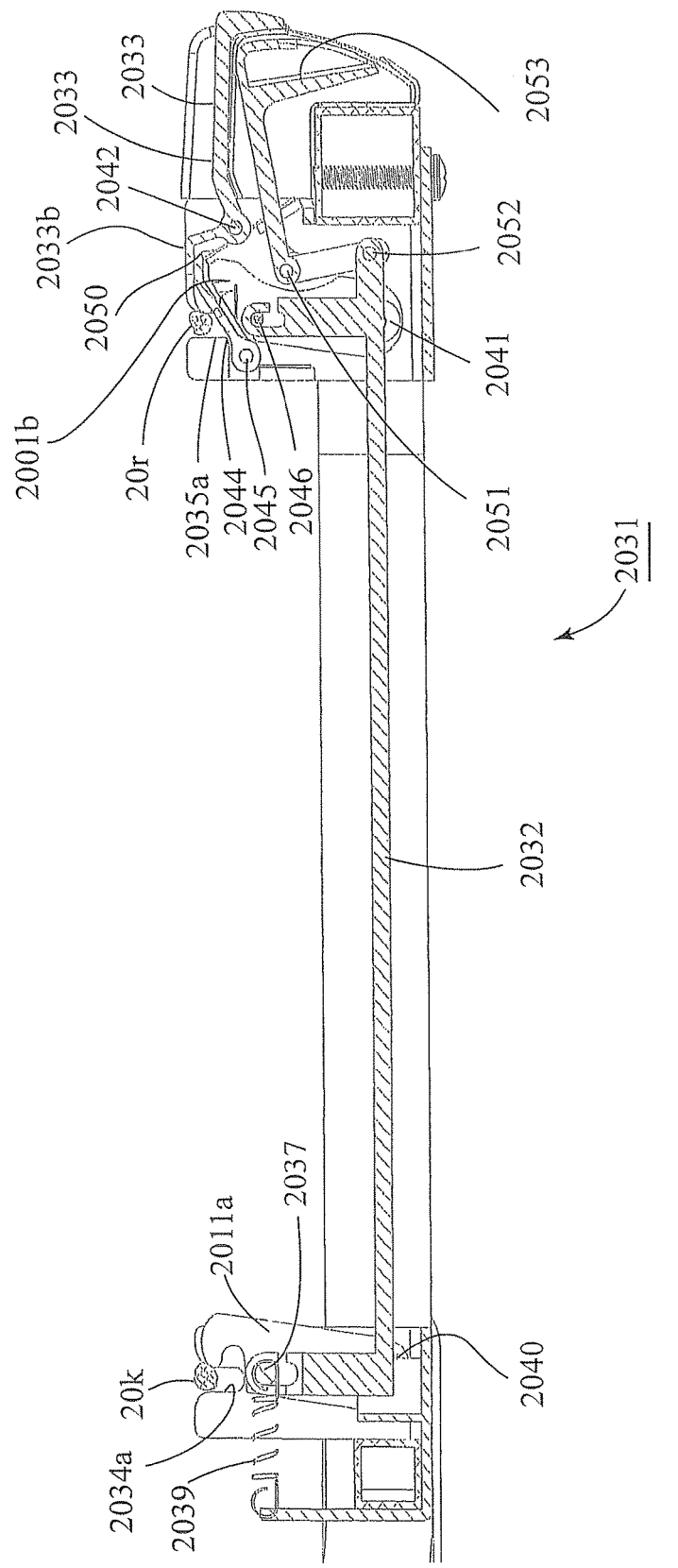

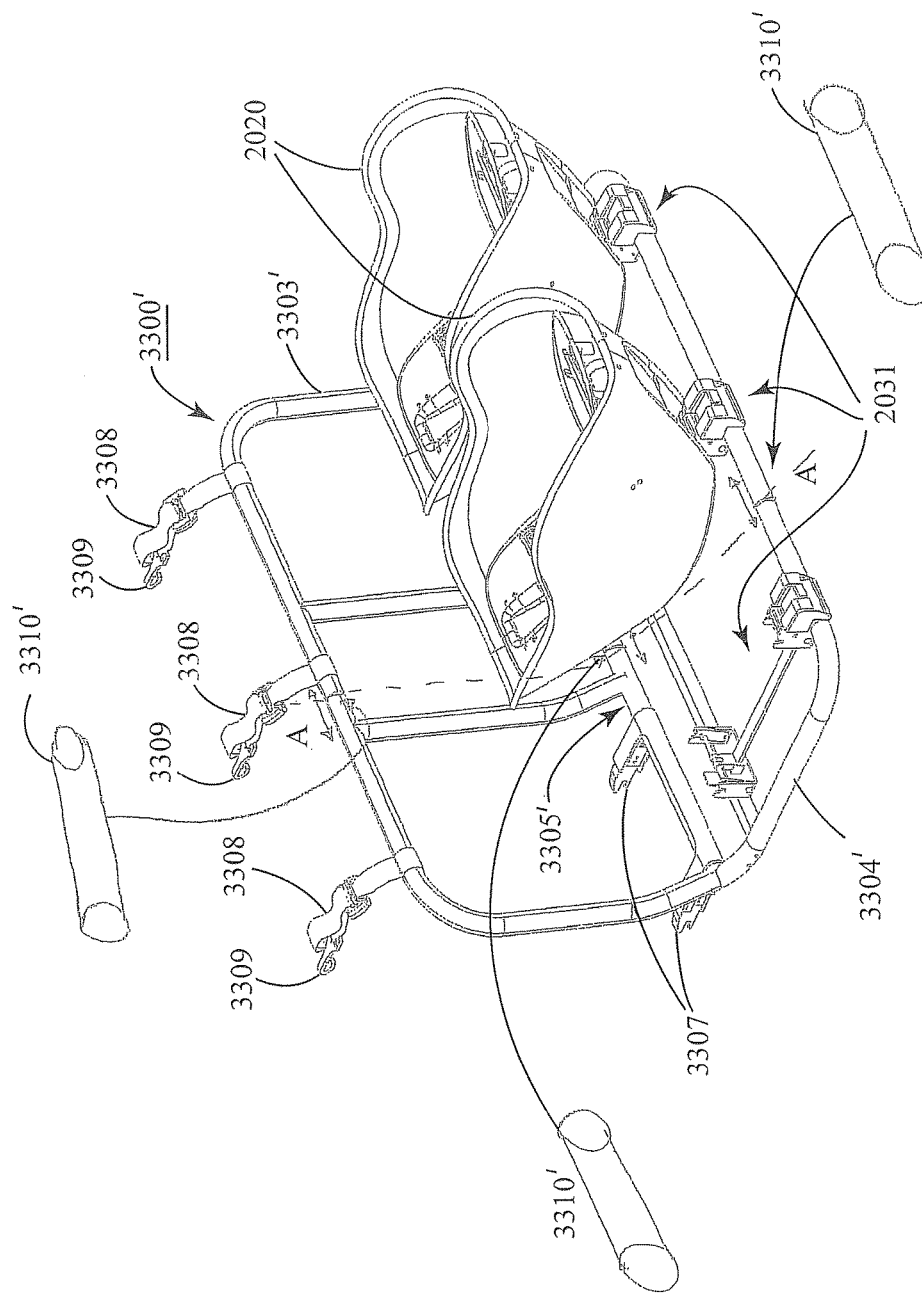

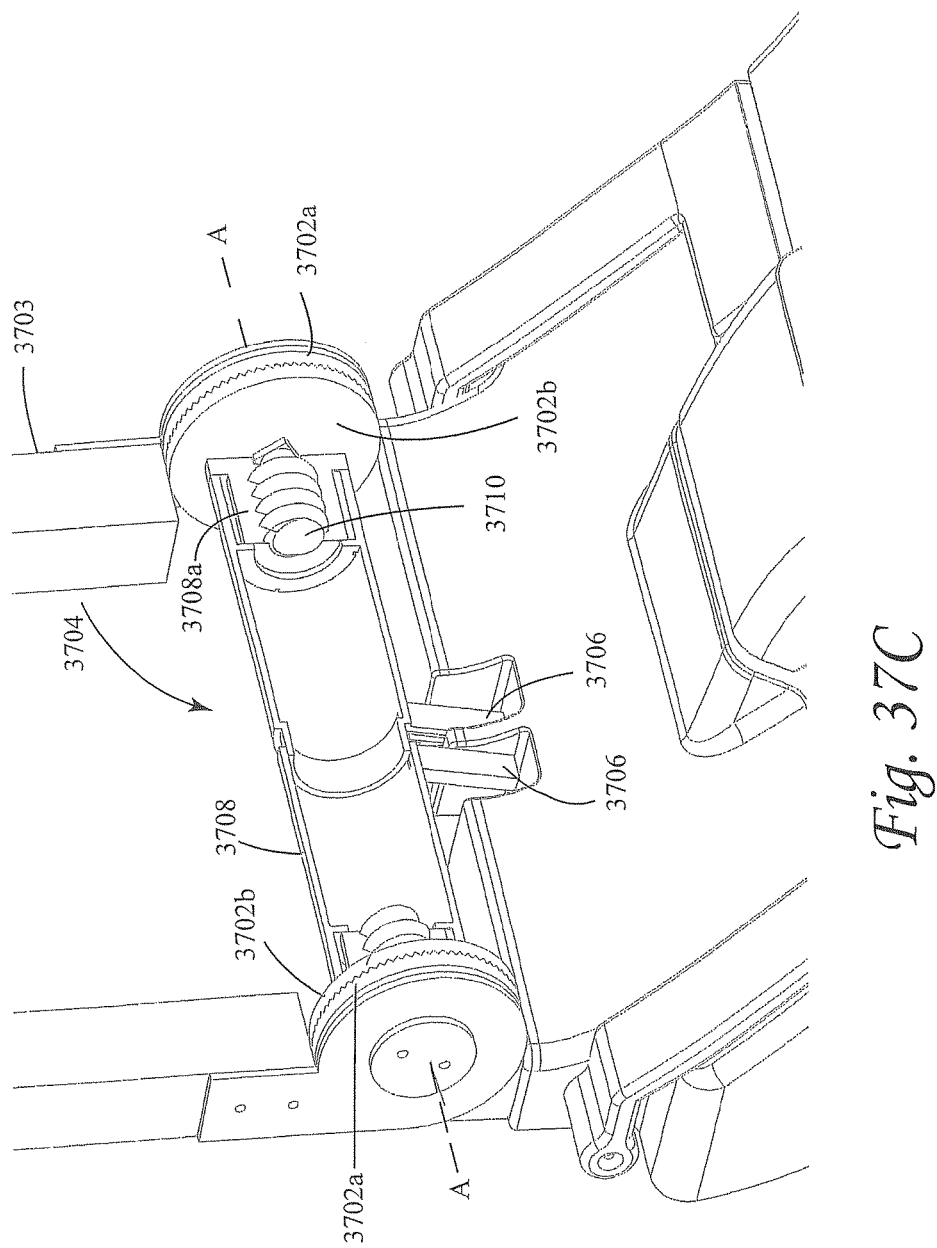

CAR SEAT AND CONNECTION SYSTEM

CROSS REFERENCE TO RELATED APPLICATIONS

This application claims priority to U.S. Provisional Application 62/160,185 (Cohen et al.) filed May 12, 2015, the entire contents of which are incorporated herein. This application is also a continuation-in-part of U.S. patent application Ser. No. 14/838,847 (Cohen et al.) filed Aug. 28, 2015, which claims priority to U.S. Provisional Application No. 62/043,947 (Cohen et al.) filed Aug. 29, 2014. U.S. patent application Ser. No. 14/838,847 is also a continuation-in-part of U.S. patent application Ser. No. 14/197,855 (Cohen et al.) filed Mar. 5, 2014, now U.S. Pat. No. 9,487,110, issued Nov. 8, 2016, and U.S. patent application Ser. No. 14/838,847 is a continuation-in-part of International Patent Application No. PCT/US14/20527 (Cohen et al.) filed Mar. 5, 2014, which is a continuation-in-part of U.S. patent application Ser. No. 13/785,555 (Cohen et al.) filed Mar. 5, 2013, now U.S. Pat. No. 8,911,015, issued Dec. 16, 2014.

BACKGROUND

1. Field

The present disclosure relates to car seats. More particularly, the present disclosure relates to safety car seats. The safety car seats may be for infants or children, although this application is not limited thereto.

2. State of the Art

The most common cause of death for children aged 1-5 in developed countries is by accident, and the leading cause of death by accident is car accidents. When properly installed in passenger cars, child safety seats have been reported to reduce fatal injury by about 71% for children under age one and by about 54% for toddlers aged 1-4. Nonetheless, in the U.S. alone, over 250 children aged 0-4 are fatally injured every year while properly restrained in their car seats.

In addition, to the fatalities, every year, thousands of children who are properly restrained in car seats still sustain incapacitating injuries resulting from car accidents. By far the most common severe injuries are head injuries, including cerebrum injuries (contusions or lacerations), concussions, skull vault and skull base fractures, subarachnoid hemorrhages, and subdural hematomas. Other common severe injuries are thoracic (lung and rib), abdominal (bowel, liver, spleen, kidney), spine, and upper extremity (clavicle, humerus, radius/ulna) and lower extremity (pelvis, femur, tibia/fibula) injuries. The injury outcome in children can be worse than similar injuries sustained by adults, and children who suffer traumatic brain injuries can experience lasting or late-appearing neuropsychological problems. For example, frontal lobe functions develop relatively late in a child's growth, so that injury to the frontal lobes may not become apparent until the child reaches adolescence.

According to the U.S. National Highway Traffic and Safety Administration (NHTSA), children under the age of one should always ride in a rear-facing car seat that has a harness. While it is recommended that rear-facing seats be used as long as possible, it is recognized that children aged 1 and over will wish to face forward. NHTSA recommends that children aged 1-3 (and older if they have not reached a certain height and weight) use a forward-facing car seat with a harness and tether that limits the child's forward movement during a crash.

There are many types of car seats available for purchase. Infant seats recommended for children under age 1 are typically rear-facing. Many include a base that is belted or tethered into the car and a seat that can latch into the base. The seat often includes a handle so that the seat may be carried when it is unlatched from the base (i.e., from the car). A popular car seat option for infants as well as children is a "convertible" car seat that may be oriented in a rear-facing position and then "converted" to a front-facing position. Some convertible car seats may even convert into a booster seat for children weighing up to 100 pounds. Typically the convertible car seats are strapped into the car using the car seat-belt, or are anchored to the car frame directly using a LATCH (Lower anchors and Tethers for children) system. All car seats offer a harness for strapping the child into the seat. The usual harness is a five-point safety harness. The car seats tend to be formed from injection molded plastic, typically at least 5 mm (0.2 in) thick, and the seats (with base in the case of the infant seats) typically weigh 7 kgs (15.4 lbs) or more.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect of the disclosure, a car seat system includes a frame constructed to couple to a vehicle seat, and a car seat constructed to couple to the frame. The frame has a vertical portion that extends upwardly along a vehicle seatback. The vertical portion extends at least half of the height of the vehicle seatback. The frame may be constructed to couple to one or more car seats. At least one of the horizontal and vertical portions may be separable from the frame. Also, the horizontal and vertical portions may be pivotally coupled, so that the frame may be configurable between an open configuration and a closed configuration.

The car seat may include connections on its bottom side for coupling to the frame. The frame may include a latch extending from the horizontal portion to couple to the connections of the car seat. The latch may be coupled to a plurality of handles configured for actuation to selectively open the latch. The handles may be configured for sequential actuation to selectively open the latch. The plurality of handles may be configured to move in a direction substantially transverse to a direction of the latch to selectively open the latch.

The car seat system may include an angle adjustment member coupled to one of the vertical portion or the horizontal portion of the frame. The angle adjustment member may be constructed to adjust an angle between the vertical portion and the vehicle seatback. The adjustment member may be pivotally coupled to one of the horizontal portion or the vertical portion and may be constructed to rotate relative to the horizontal portion or the vertical portion to adjust the angle between the vertical portion and the vehicle seatback. The adjustment member may be configured to rotate eccentrically about a respective member of the horizontal portion or the vertical portion to which the adjustment member is pivotally coupled.

The system may include a tether connector and tether strap extending from said angle adjuster. The angle adjuster may be configured to at least partially store the tether strap in a coiled configuration. The angle adjuster may include a locking or unlocking belt retractor connected to the tether strap.

The car seat system may include a lap belt clamp coupled to the frame. The lap belt clamp may be configured in a locked and an unlocked configuration. The horizontal portion of the frame may define a lap belt pathway for routing a lap belt of a vehicle seatbelt across the horizontal portion. When the lap belt is received in the lap belt pathway, the lap belt clamp is locked and contacts the lap belt to aid in retaining the lap belt in the lap belt pathway.

According to another aspect of the disclosure, a car seat includes an outer protective shell, an inner seat, and a suspension system coupling and permitting relative movement between the inner seat and the outer protective shell, the suspension system suspending the inner seat substantially within the outer protective shell.

The suspension system includes a plurality of deformable metal straps coupling the inner seat to the outer protective shell. The straps may be formed as bands or straps. In their coupled configuration, the straps are curved or bent and are formed to suspend the inner seat from the outer protective shell. The straps may be formed of metals including aluminum and stainless steel.

In one embodiment the car seat may include a plurality of padding elements. The outer protective shell has an inner surface and the plurality of padding elements may be located on the inner surface of the outer protective shell and they may extend from the inner surface of the outer protective shell to the inner seat. At least one of the padding elements may always contact the inner seat.

Also, in one embodiment the inner seat has an outer surface and the plurality of padding elements may be located on the outer surface of the inner seat and they may extend from the outer surface of the inner seat to the inner surface of the outer protective shell. At least one of the padding elements may always contact the outer protective shell.

The car seat system may include at least one tether extending from the vertical portion for coupling to a vehicle anchor, and a plurality of mini-connectors extending from the horizontal portion for coupling to corresponding lower anchors and tethers (LATCH) anchors on the vehicle. One or more of the mini-connectors may be selectively laterally displaceable. The tether may include an adjustable length rigid portion extending from the vertical portion and a flexible portion extending from the rigid portion to a tether connector.

BRIEF DESCRIPTION OF THE DRAWINGS

FIG. 1 is a transparent perspective illustration of an embodiment of a car seat in accordance with an aspect of the disclosure viewed from a front and a side of the car seat.

FIG. 2 is a transparent bottom view of another embodiment of a car seat in accordance with an aspect of the disclosure.

FIG. 3 shows the car seat of FIG. 2, viewed from a bottom, front perspective.

FIG. 4 is a partial view of the car seat of FIG. 2, viewed from a back, top perspective.

FIG. 16A is a chart showing dimensions of the rear seats of some automobiles.

FIG. 16B is a schematic showing rear seat parameters using dimensions from the chart in FIG. 16A.

FIG. 28A is a side elevation view of the car seat mounting frame shown in FIG. 27A attached to a vehicle seat with the angle adjuster in a first position.

FIG. 28B is a side elevation view of the car seat mounting frame shown in FIG. 27A attached to a vehicle seat with the angle adjuster in a second position.

FIG. 29A shows an exploded isometric view of a portion of the car seat mounting frame shown in FIG. 27A showing details of the car seat frame angle adjuster.

FIG. 29B shows the portion of the car seat mounting frame of FIG. 29A and, specifically, a tether strap in a coiled configuration.

FIG. 30A is an isometric view of the car seat mounting frame shown in a first, fully open configuration.

FIG. 30B is an isometric view of the car seat mounting frame shown in a second, closed configuration.

FIG. 31 is an isometric view of the car seat mounting frame showing a lap belt clamp in an open configuration.

FIG. 32B is an exploded view of the latch mechanism shown in FIG. 32A.

FIG. 32G is a section view of the latch mechanism showing the state of the latch mechanism when the car seat is almost fully lifted vertically away from the latch mechanism.

FIG. 33B shows an alternative embodiment of the car seat mounting system of FIG. 33A.

FIG. 37C is a partial cutaway view of the rosette hinge mechanism of the car seat mounting frame of FIG. 37A.

DETAILED DESCRIPTION

Figure 5:
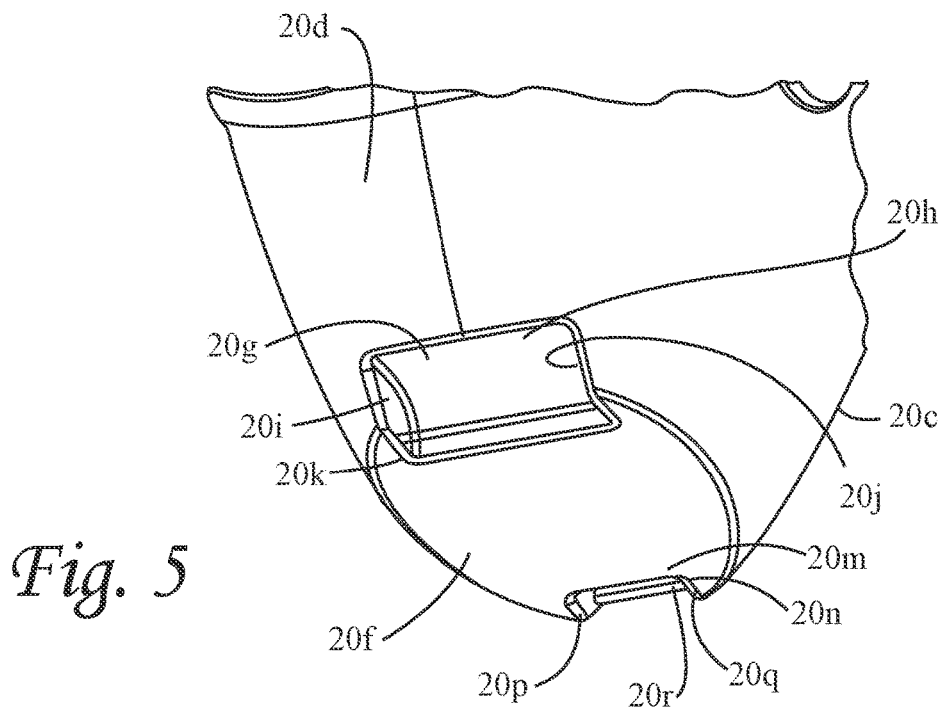
FIG. 5 is a view of the car seat of FIG. 2, viewed from a bottom, front perspective.

One embodiment of a car seat 10 is shown in FIG. 1. The car seat 10 includes an outer protective shell 20, an inner seat 30, and a suspension system 40. The car seat 10 also includes a harness (not shown) attached to the inner seat 30 for securing a child to the inner seat 30. The harness may be of a conventional construction and may extend through and around the inner seat 30 and is not directly attached to the outer protective shell 20.

The inner seat 30 is connected to the protective shell 20 by the suspension system 40 such that the inner seat can move (float) a small amount relative to the protective shell 20 as described below. Thus, the outer shell 20 provides support for the seat 30 (via the suspension system 40) but is not rigidly attached thereto. The outer protective shell 20 is adapted as described below to be coupled to a car seat mounting frame 600 (shown, for example, in FIG. 7, and described in greater detail below) that may itself be coupled to a vehicle seat 700 (e.g., FIG. 7).

In one embodiment, the outer protective shell or frame 20 is made from a strong, light material such as carbon fiber or an aramid fiber such as KEVLAR (a trademark of DuPont, Wilmington, Del.), or any other strong, light material. In one embodiment, the shell 20 is constructed of multiple layers of carbon fiber, aramid fiber or a composite material. In another embodiment, the outer protective shell is formed from two separated layers of carbon fiber, aramid fiber or composite material (as seen, e.g., in FIG. 4) sandwiching a honeycomb, foam, or corrugated material (not shown). In other embodiments, the shell 20 is constructed of one or more of polycarbonate, polypropylene, ABS resin, and fiberglass. One function of the shell 20 is to provide support for the seat 30 via the suspension system 40. Another function of the shell 20 is to provide protection from intrusion by exterior objects.

In one embodiment the shell 20 provides side and back walls 20a-20c and a front wall 20d that connects the side walls 20a, 20b at the front of the car seat. The back wall 20c provides a high back compared to the front wall 20d, which is low. The side walls are contoured to extend from the back to the front. The front, back and side walls provide an upper edge 21 to which or over which a seat cover may be attached as described hereinafter. All walls may be rounded to eliminate edges so there may be no exact delineation of the front, side, and back walls.

Shell 20 also defines a series of attachment points for attaching straps (bands) 40a-40h of the suspension system 40. In the embodiment shown in FIG. 1, eight attachment points 24a-24h are defined on the inner side of the outer shell 20, including two attachment points 24a, 24b towards the top of side walls 20a, 20b, two attachment points 24c, 24d toward the bottom of the side walls 20a, 20b, two attachment points 24e, 24f in the bottom of the front wall 20d of the car seat, and two attachment points 24g, 24h at the top of the back wall 20c. In the embodiment shown in FIG. 1, all of the straps 40a-40h are formed as continuous bands. Each band 40a-40h is attached to a respective one of the eight attachment points 24a-24h. In at least one embodiment, a certain length of each band 40a-40h may be in contact with the attachment points 24a-24h. The bands 40a-40h may be attached to the outer protective shell 20 with fasteners, such as rivets, at the respective attachment points 24a-24h.

Also, the bands 40a-40h are attached to respective attachment points 30a-30h located on the outer surface of the inner seat 30. The bands 40a-40h may be attached to the inner seat 30 with fasteners, such as rivets, at the respective attachment points 30a-30h. Thus, when each band 40a-40h is connected between the inner seat 30 and the outer shell 20, each band 40a-40h is connected at two locations: an attachment point on the inner seat 30; and an attachment point on the outer protective shell 20. The continuous banded configuration of each band 40a-40h may allow each band to act like a spring. In one embodiment the bands 40a-40h may be formed of metals including aluminum and stainless steel. In one embodiment, one or more of the bands 40a-40h may be formed one or more of plastic, carbon fiber, and composite.

The outer dimensions of the shell 20 may vary widely. The shell 20 may be between 40 and 70 cm wide, or even narrower or wider, and between 20 and 60 cm deep, or even shallower or deeper, and between 50 and 80 cm high, or even shorter or taller. In one exemplary embodiment the outer dimensions of the shell is 50 cm wide (plus or minus 5 cm), 28 cm deep (plus or minus 3 cm), and 68 cm high (plus or minus 7 cm).

The inner seat 30 is scooped in shape with a relatively high back, a deep seat area (for the buttocks), and a slightly rising surface for the thighs and legs. In one embodiment, the inner seat 30 is a protective seat made from a multi-layered construction. In one embodiment the inner seat includes a flexible hard outer shell layer, a cushioning spacer layer, and uniform foam layer, and an attached fabric or leather layer. The cushioning spacer layer neither covers the entire inside of the hard outer shell layer, nor the entire outside of the uniform foam layer. The fabric or leather layer can extend beyond the inner seat and attaches to the edge 21 of the shell 20 but does not inhibit seat 30 from moving relative to the shell 20. In another embodiment the multi-layered construction of the inner seat includes (from outside to inside) a hard outer shell layer, a cushioning spacer layer, and a uniform foam layer. An optional plastic, leather, or fabric layer (not shown) may be provided over the foam layer. A separate removable seat cover can be provided that extends over the seat 30 and attaches to the edge 21 of the shell 20. Again, the separate removable seat cover would not inhibit seat 30 from moving relative to the shell 20. The inner seat construction may be arranged to redirect energy transmitted from the outer shell along a circuitous path so as to absorb the energy.

All dimensions of the inner seat 30 are generally chosen to be smaller than the dimensions of the shell 20. Thus, inner seat 30 is suspended substantially within the shell 20 and generally protected by the shell 20.

The construction of the inner seat 30 and the outer shell 20 may be the same as described in U.S. patent application Ser. No. 13/785,555, filed Mar. 5, 2013, the entire contents of which are incorporated by reference as if set forth herein in their entirety.

The suspension system 40 functions to suspend the inner seat 30 relative to the outer shell 20 and to thereby act as a shock absorber/isolator between the shell 20 and the seat 30. In one embodiment, the suspension system 40 is an eight point suspension system with eight straps 40a-40h. Some or all of the straps 40a-40h may be the same length or size.

The embodiment of the car seat 10 described with reference FIG. 1 provides a highly protective, safe, and strong car seat system. In particular, because of the suspension system 40, in case the car in which the car seat 10 is anchored is in an accident that causes sudden acceleration and/or deceleration of the car, force that is applied to the shell 20 which is coupled to the car is not completely transferred to the inner seat 30 and is therefore not applied to the occupant of the seat 10. More particularly, in the case of an accident, regardless of the direction in which the seat 10 is facing and regardless of whether the result is a sudden acceleration and/or deceleration, the inner seat 30 may move inside the shell, and the suspension system 40 may absorb some, much, or all of the energy. The inner seat 30 will swing inside the shell 20 to the extent allowed by the deformation of the straps 40a-40h of the suspension system 40 (it being appreciated that the fabric or leather covering will easily comply). Thus, if the impact is severe enough, the energy imparted to the straps 40a-40h may cause the straps to elastically and/or permanently deform, in which case the inner seat 30 may translate in addition to swing. More specifically, during a collision, the inner seat 30 can push one or more of the straps 40a-40h against the outer shell 20 so as to bring the attachment points 24a-24h and 30a-30h towards each other. Also, the inner seat 30 can pull on the straps 40a-40h so as to move the attachments points 24a-24h away from each other. In either case, the straps 40a-40h may act like springs that may absorb energy by deforming in response to forces imparted by relative movement between the inner seat 30 and the outer protective shell 20. Moreover, the energy imparted to the straps 40a-40h can be stored as potential energy during an impact and, if the straps are not permanently deformed, the straps 40a-40h can convert that potential energy into kinetic energy so that the straps 40a-40h recoil towards their undeformed, initial position shown in FIG. 1.

Some, most, or all of the energy that is transferred from the shell 20 to the inner seat 30 will be absorbed by the seat 10 itself rather than transferred to the occupant of the seat. Furthermore, should the accident cause dislocation of the interior of the car or should an object hit the shell of the car seat, the shell 20 is of extremely high strength and will remain structurally intact in almost all circumstances. Thus, the occupant of the car seat 10 will not be crushed and will be protected by the foam padding of the seat 10. Further yet, it should be appreciated that the described car seat system will be light in weight (e.g., under 4 kg; and possibly around 3 kg).

Figure 6:
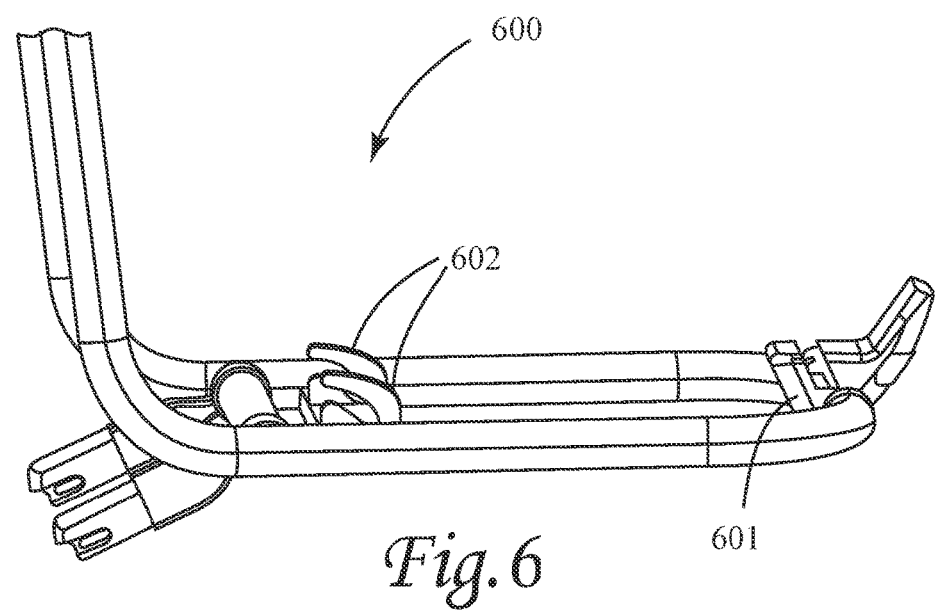
FIG. 6 is a view of an embodiment of a car seat mounting frame in accordance with an aspect of the disclosure.

FIG. 5 shows a view of the car seat 10 from its front side 20d and a bottom side 20f. A recessed rounded surface 20g that extends laterally between sides 20i to 20j is formed in the bottom side 20f of the outer protective shell 20. Surface 20g and sides 20i and 20j define a front recess 20h that is formed substantially at a corner of the front surface 20d and the outer bottom surface 20f of the outer shell 20. Thus, the recessed rounded surface 20g extends from the front wall 20d to the bottom side 20f. Also, a front bar 20k extends across the front recess 20h between the sides 20i and 20j. As will be described in greater detail below, the front bar 20k is constructed to engage hooks 602 of a car seat mounting frame 600 (FIG. 6).

Figure 7:
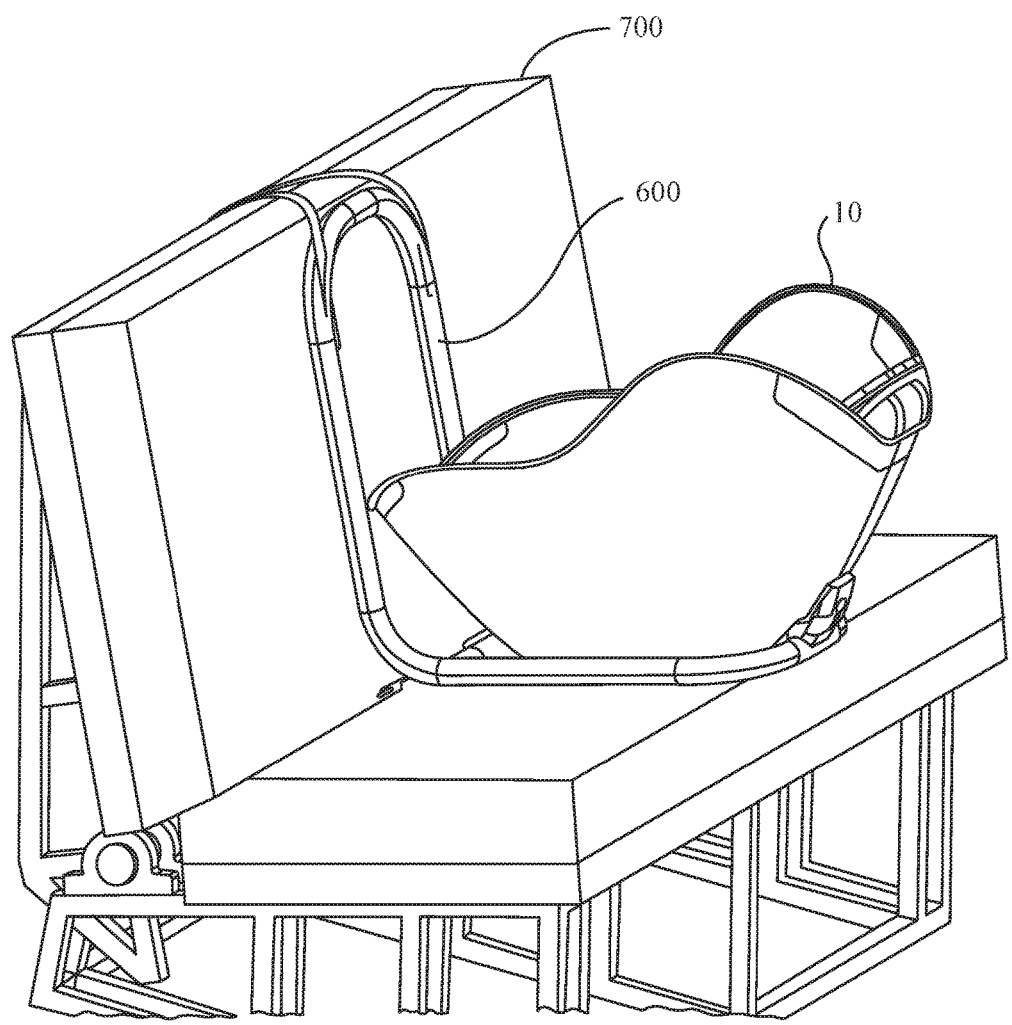
FIG. 7 shows a car seat system including a car seat frame and a car seat coupled to the car seat frame sitting on a vehicle seat.

Also formed in the bottom side 20f of the outer shell 20, opposite the front recess 20h, is a recessed rounded surface 20m that extends from sides 20p to 20q. The surface 20m and sides 20p and 20q define a rear recess 20n that is formed substantially at the corner of the rear wall 20c of the outer shell 20 and the bottom side 20f. Also, a rear bar 20r extends across the rear recess 20n between sides 20p and 20q. As will be described in greater detail below, the rear bar 20r is constructed to couple to a latch 601 of a car seat mounting frame 600 shown in FIG. 6. As shown in FIG. 7, and as will be described in greater detail below, the car seat 10 is constructed to be coupled to the car seat frame 600, thus providing an indirect connection system for coupling the car seat 10 to a vehicle.

Also, to comply with U.S. federal regulations requiring that the car seat 10 be configured for direct connection (without a frame such as frame 600) to a motor vehicle seat and an airplane seat, the car seat 10 may include lap belt routing clips (not shown) located on upper edges of the sides 20a and 20b of the outer shell 20, and a shoulder belt routing clip (not shown) located on an outer side of the rear wall 20c of the outer shell 20. The lap belt routing clips are configured to route a lap belt portion of a motor vehicle three-point seatbelt or an airplane lap belt across the car seat 10 and the shoulder belt clip is configured to route a shoulder belt portion of a motor vehicle three-point seatbelt. In the case of an airplane, only a lap belt is generally provided. Thus, where no shoulder belt is provided, the afore-mentioned lap belt shoulder clips are not used for connecting the car seat 10 to an airplane seat.

FIGS. 2 to 4 show an alternate embodiment of a car seat 110 that is similar to car seat 10 of FIG. 1, with similar elements numbered similarly but increased by "100".

Car seat 110 includes an outer protective shell 120, an inner seat 130, a suspension system 140. The car seat 110 also includes a harness (not shown) attached to the inner seat 130 for securing a child to the inner seat 130. The harness may be of a conventional construction and may extend through and around the inner seat 130 and is not attached to the outer protective shell 120. The protective shell 20 is adapted to be coupled to a car seat mounting frame, such as frame 600 (FIG. 6). The inner seat 130 is connected to the protective shell 120 by the suspension system 140 such that the inner seat 130 can move (float) a small amount relative to the protective shell 120 as described below. Thus, the outer shell 120 provides support for the seat 130 (via the suspension system 140) but is not rigidly attached thereto.

In one embodiment the shell 120 provides side and back walls 120a-120c and a front wall 120d that connects the side walls 120a, 120b at the front of the car seat 110. The back wall 120c provides a high back compared to the front wall 120d, which is low. The side walls are contoured to extend from the back to the front. The front, back and side walls provide an upper edge 121 to which or over which a seat cover may be attached as described hereinafter. All walls may be rounded to eliminate edges so there may be no exact delineation of the front, side, and back walls.

Shell 120 also defines a series of attachment points 124a-124h for attaching straps 140a-140h of the suspension system 140. In the embodiment shown, eight attachment points 124a-124h are defined on the inner side of the outer shell 120, including two attachment points 124a, 124b towards the top of side walls 120a, 120b, two attachment points 124c, 124d toward the bottom of the side walls 120a, 120b, two attachment points 124e, 124f in the bottom of the front wall 120d of the car seat, and two attachment points 124g, 124h at the top of the back wall 120c.

In the embodiment shown in FIGS. 2 to 4, straps 140a-140d are formed as discontinuous strips and straps 140e-140h are formed as continuous bands. In one embodiment the straps 140a-140h may be formed of metals including aluminum and stainless steel. In one embodiment, one or more of the straps 140a-140h may be formed one or more of plastic, carbon fiber, and composite. Each band 140e-140h is attached to a respective one of the attachment points 124e-124h and each strap 140a-140d has a first end attached to the outer protective shell at corresponding attachment points 124a-124d. In at least one embodiment, a certain length of each band 140e-140h may be in contact with the attachment points 124e-124h. The straps 140a-140h may be attached to the outer protective shell 120 with fasteners, such as rivets.

Also, the straps 140a-140h are attached to respective attachment points 130a-130h located on the outer surface of the inner seat 130. The straps 140a-140h may be attached to the inner seat 130 with fasteners, such as rivets, at the attachment points 130a-130h. Specifically, each band 140e-140h is attached to a respective one of the attachment points 130e-130h and each strap 140a-140d has a second end attached at corresponding attachment points 130a-130d. In at least one embodiment, a certain length of each band 140e-140h may be in contact with the attachment points 130e-130h. Thus, when each strap 140a-140h is connected between the inner seat 130 and the outer shell 120, each strap 140a-140h is connected at two locations, one attachment point on the inner seat 130 and one attachment point on the outer protective shell 120.

The inner seat 130 may have the same construction as that of the inner seat 30, described above. Also, the outer protective shell 120 may have the same construction as that of the outer protective shell 20, described above.

FIG. 2 also shows a view of the bottom side 20f of car seat 110. The outer protective shell 120 has, formed in its bottom side 120f, a recessed rounded surface 120g that extends laterally between sides 120i to 120j. Surface 120g and sides 120i and 120j define a front recess 120h that is formed substantially at a corner of the front surface 120d and the outer bottom surface 120f of the outer shell 120. Thus, the recessed rounded surface 120g extends from the front wall 120d to the bottom side 120f. Also, a front bar 120k extends across the front recess 120h between the sides 120i and 120j. As will be described in greater detail hereinbelow, the front bar 120k is constructed to engage hooks 602 of a car seat mounting frame 600 (FIG. 6).

Also formed in the bottom side 120f of the outer shell 120, opposite the front groove 120h, is a recessed rounded surface 120m that extends from sides 120p to 120q. The surface 120m and sides 120p and 120q define a rear recess 120n that is formed substantially at the corner of the rear wall 120c of the outer shell 120 and the bottom side 120f. Also, a rear bar 120r extends across the rear recess 120n between sides 120p and 120q. As will be described in greater detail below, the rear bar 120r is constructed to couple to a latch 601 of a car seat mounting frame 600 shown in FIG. 6. As shown in FIG. 7, and as will be described in greater detail below, the car seat 10 is constructed to be coupled to the car seat frame 600, thus providing an indirect connection system for coupling the car seat 110 to a vehicle.

Figure 8:
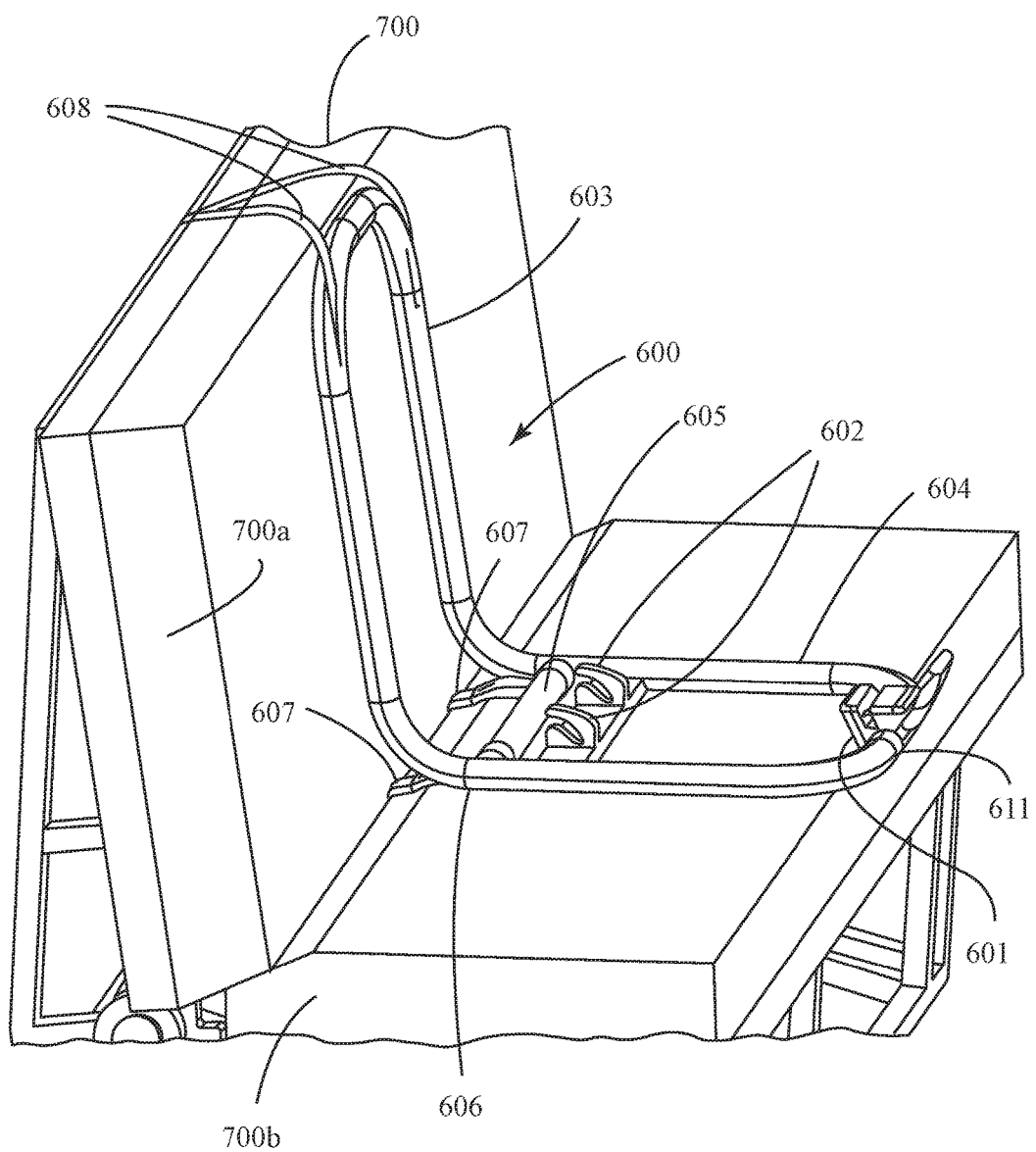
FIG. 8 shows the car seat frame of FIG. 7 without the car seat of FIG. 7 and being coupled to a vehicle seat.

FIG. 8 shows the car seat mounting base 600, to which either of the car seats 10 and 110 can be removably connected in the same manner. For simplicity of discussion, only car seat 10 will be mentioned with reference to the mounting frame 600. However, it will be appreciated that similar elements of car seat 110 numbered similarly to car seat 10 interact with the frame 600 in the same way as those elements of car seat 10.

FIG. 8 shows the frame 600 of FIGS. 6 and 7 in greater detail. The frame 600, includes a substantially vertical (within about 25 degrees of vertical) portion 603 and a substantially horizontal (within about 25 degrees of horizontal) portion 604, which extend from one another at a fixed angle. In one embodiment, the angle is approximately 97 degrees (it being noted that the term "approximately" as used herein in the specification and claims with respect to angles includes plus or minus 3 degrees). In the embodiment shown in FIGS. 6 to 8 the vertical portion 603 and the horizontal portion 604 are both generally u-shaped members. Of course, it will be appreciated that in other embodiments of the frame the horizontal and vertical portions may have other forms other than u-shaped. For example, the vertical and horizontal portions 603 and 604 may be generally planar.

The frame 600 may be formed of metal, such as aluminum. Of course, in other embodiment, the frame may be formed of other metals, such as titanium, or non-metals, such as carbon fiber and plastic. Also, the horizontal and vertical portions 604 and 603 may be hollow or may be solid. For example, in one embodiment, the horizontal and vertical portions 604 and 603 are formed of tubular aluminum having a wall thickness of about 2 mm and an outer diameter of about 31.75 mm. It should be appreciated that for purposes herein, the term "tubular" does not require that a cross-section be round, as the tubular element may take any of many shapes.

Figure 6A:
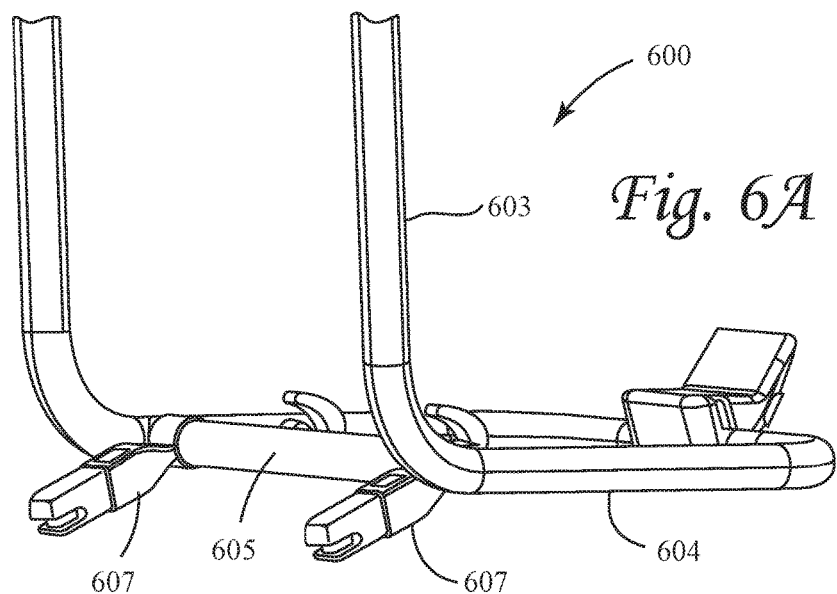
FIGS. 6A to 6C show a partial view of the frame of FIG. 6 with connectors rotated into various positions about a cross bar.
Figure 6B:
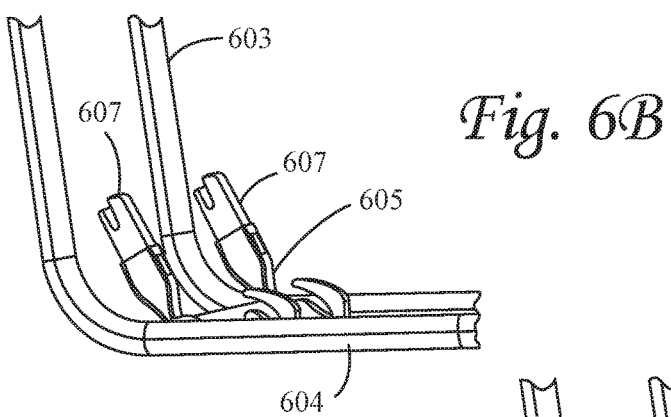
Figure 6C:
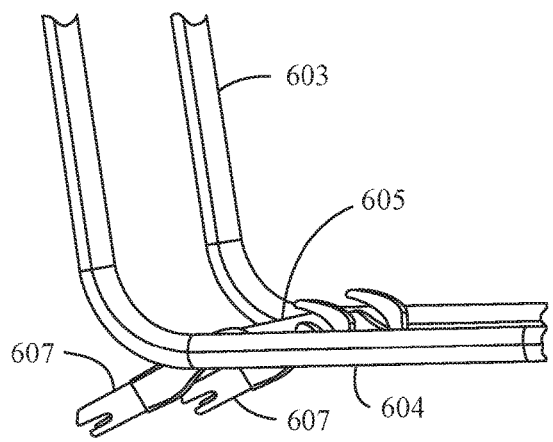

The horizontal portion 604 has a cross bar 605 at a proximal end 606 of the horizontal portion 604. A pair of connectors 607, such as mini-connectors, extends from the cross bar 605. The connectors 607 are free to rotate with the cross bar 605, as shown, for example, in FIGS. 6A to 6C. The connectors 607 are constructed to couple to LATCH anchors of the vehicle seat 700, as shown in FIG. 8. In one embodiment, the vertical and horizontal portions 603 and 604, and cross bar 605 are formed of a metal, such as aluminum, and may be solid or tubular in form.

The vertical portion 603 of the frame extends to a height that is more than half the height of the seatback 700a. In at least one embodiment, the vertical portion 603 extends substantially (e.g., more than about 75%) the entire length of seatback 700a. Without being bound by theory, it is posited that the extension of the vertical portion 603 along substantially the entire length of the seatback 700a contributes to energy absorption by the car seat frame 600 during a vehicle impact. The energy absorption by the car seat frame 600 can reduce the energy imparted to the car seat 10 and, consequently, to a child seated in the car seat. Thus, it is believed that the height of the vertical portion 603 improves the isolation of the car seat 10 from the vehicle, which can thereby reduce energy transfer to the car seat 10 during vehicle impact.

Also, the vertical portion 603 of the frame 600 extends upwardly substantially along the seatback 700a. In this regard, it will be appreciated that the vertical portion 603 extends upwardly substantially along the seatback 700a when it extends flush with the seatback 700a (i.e., at angle of 0 degrees with respect to the seatback 700a) or at a non-zero angle of up to 25 degrees with respect to the seatback 700a.

Figure 9:
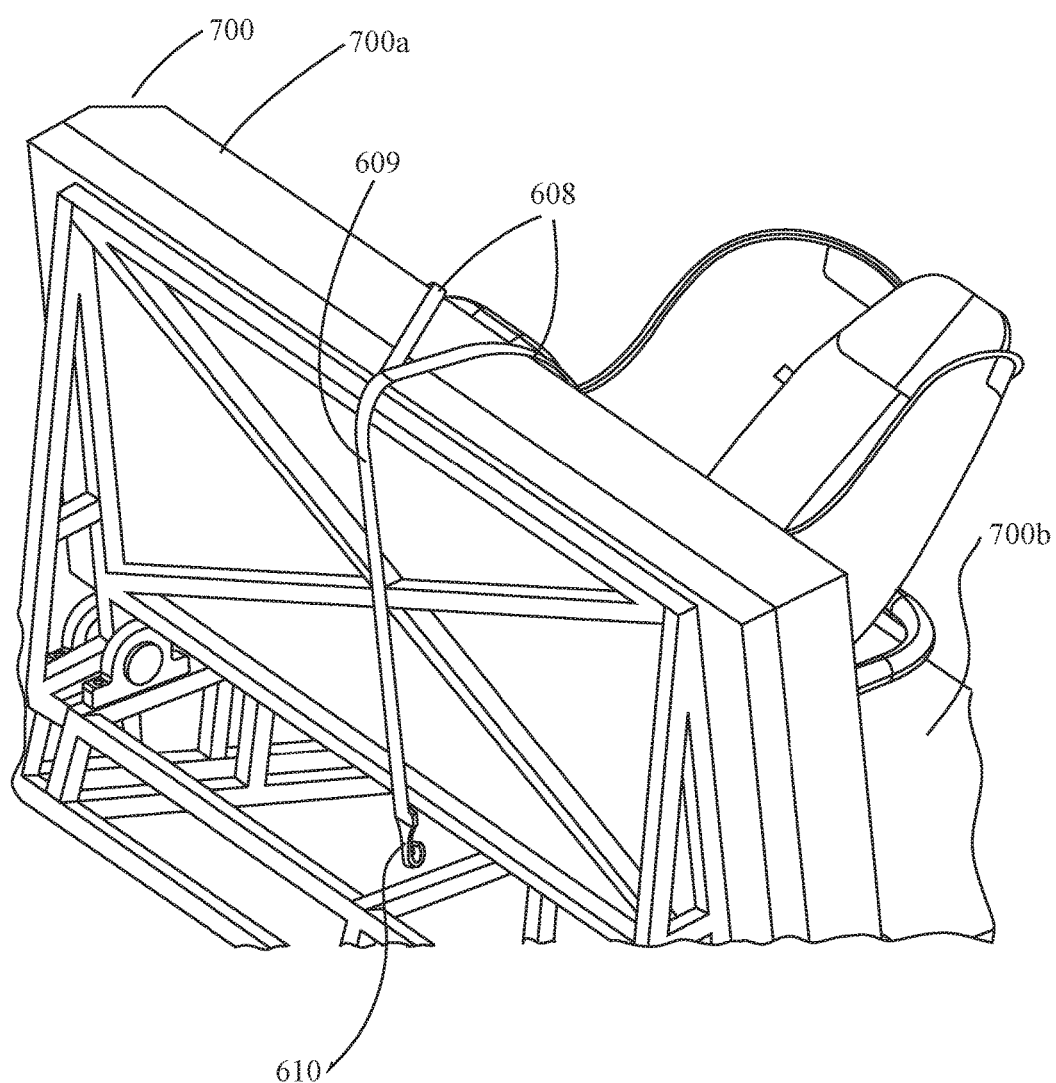
FIG. 9 shows the car seat frame and car seat of FIG. 8 viewed from a reverse orientation from that shown in FIG. 8.

At least one tether 608 extends from the vertical portion 603 to a seatback anchor (not shown). The seatback anchor may be located near the top of the seatback 700a (e.g., near the headrest), on the back of the seatback 700a itself, or behind the seatback 700a on a frame member of the seat or vehicle below the seatback, such as shown in FIG. 9. As shown in FIGS. 8 and 9, two tether straps 608 extend upward from the vertical portion 603 of the frame and curve around the top of the seatback 700a. The two tether straps 608 are joined together and connect to a third strap 609 that terminates with a connector 610 that is constructed to connect to an anchor on the seat 700 or, possibly, an anchor on the floor of the vehicle interior. The separation of the two tether straps 608 allows them to fit around a vehicle headrest (not shown) that may extend from the top of the seatback 700a behind the vertical portion 603 of the frame 600, although such a headrest is not shown in FIGS. 8 and 9 for purposes of ease of illustration.

The frame 600 has mounting hooks 602 mounted between sides of the horizontal portion 604. The mounting hooks 602 are disposed between the cross bar 605 and the latch 601, which is at a distal end 611 of the horizontal portion 604. The mounting hooks 602 and the cross bar 605 are located relatively close together such that both will fit within the front groove 20h on the bottom side 20f of the car seat 10 when the frame 600 and car seat 10 are coupled together, as shown in FIG. 7, and as will be described in greater detail hereinbelow.

Figure 10:
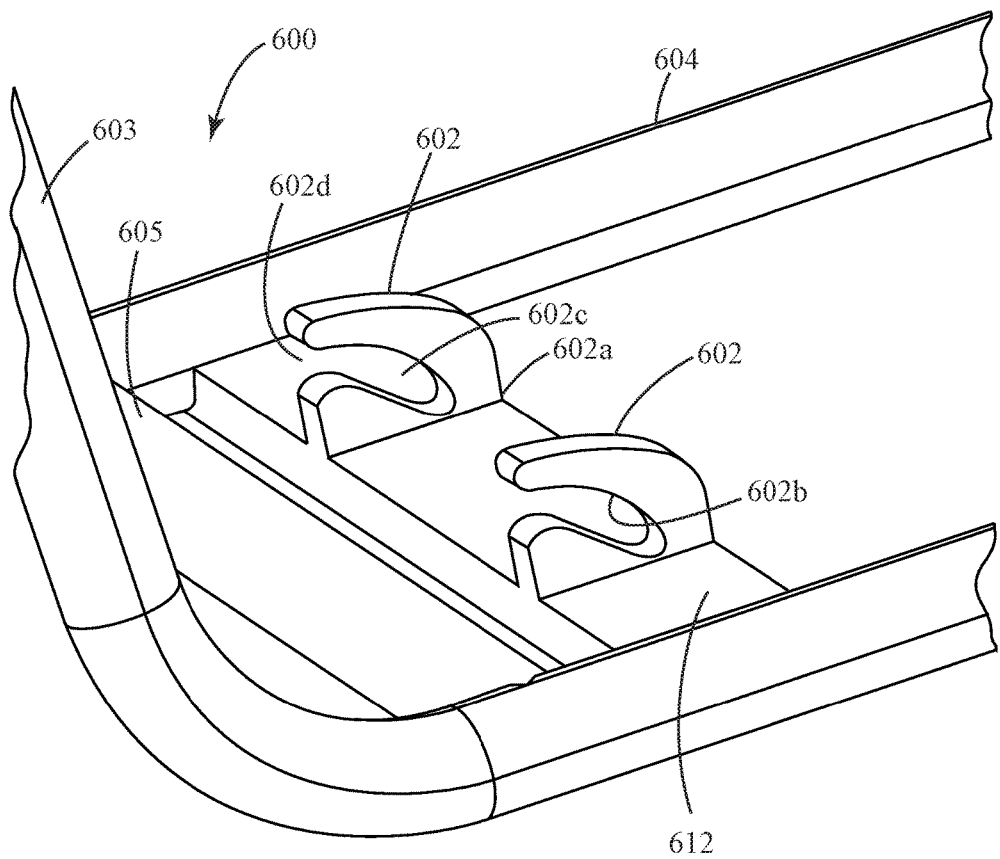
FIG. 10 is a perspective view of hook section of the frame of FIG. 7.

FIG. 10 illustrates further details of the hooks 602. The hooks 602 have a base 602a that is connected to a cross plate 612 that extends between sides of the horizontal portion 604 of the frame 600. Each hook 602 extends from its base 602a in a direction towards the cross bar 605. Each hook has an inner surface 602b that defines a slot 602c that has a proximal, open end 602d opposite the base 602a. The inner surface 602b curves downwardly and in a distal direction from the proximal end of the slot 602c. The slot 602c is constructed to align with and receive the front bar 20k when the car seat 10 is being coupled to the frame 600. For example, during a coupling procedure, the front rod 20k is aligned with the proximal open end 602d and then the car seat 10 is moved distally and downwardly toward the horizontal portion 604 of the frame 600, guided by the inner surface 602b. As the front rod 20k slides distally and downwardly in the slot 602c, the front recess 20h on the bottom 20f of the car seat 10 aligns with the cross bar 605 until the surface 20g is seated against or is over the cross bar 605.

Figure 11A:
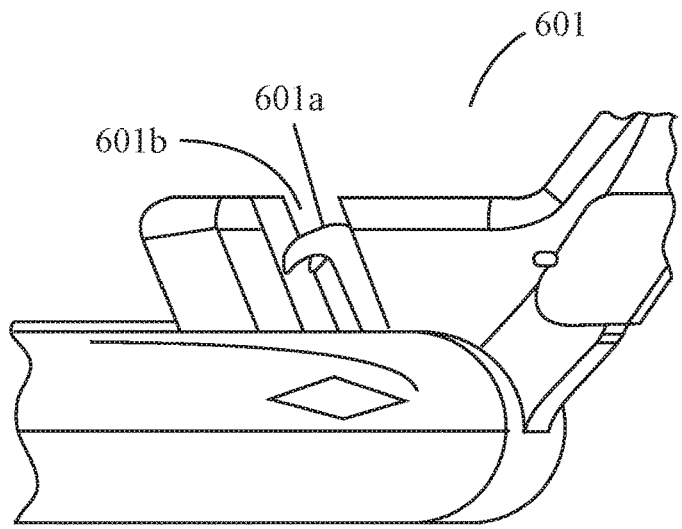
FIGS. 11A and 11B illustrate details of a latch of the frame shown in FIG. 7.
Figure 11B:
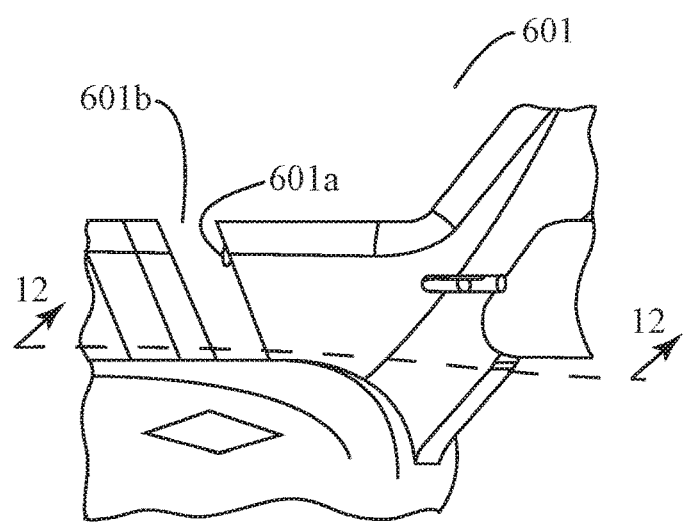

FIGS. 11A and 11B illustrates further details of the frame 600 and latch mechanism 601. The latch 601 has internal hooks 601a that can move within a slotted passageway 601b. The hooks 601a are constructed to be biased (e.g., by a spring, not shown) in a position that blocks or otherwise closes the passageway 601b, as shown in FIG. 11A. The hooks 601a can be operatively displaced out of their blocking or closed position, as shown in FIG. 11B, to open the passageway 601b for insertion or removal of the rear rod 20r of the car seat 10, as will be described in greater detail below.

Figure 12:
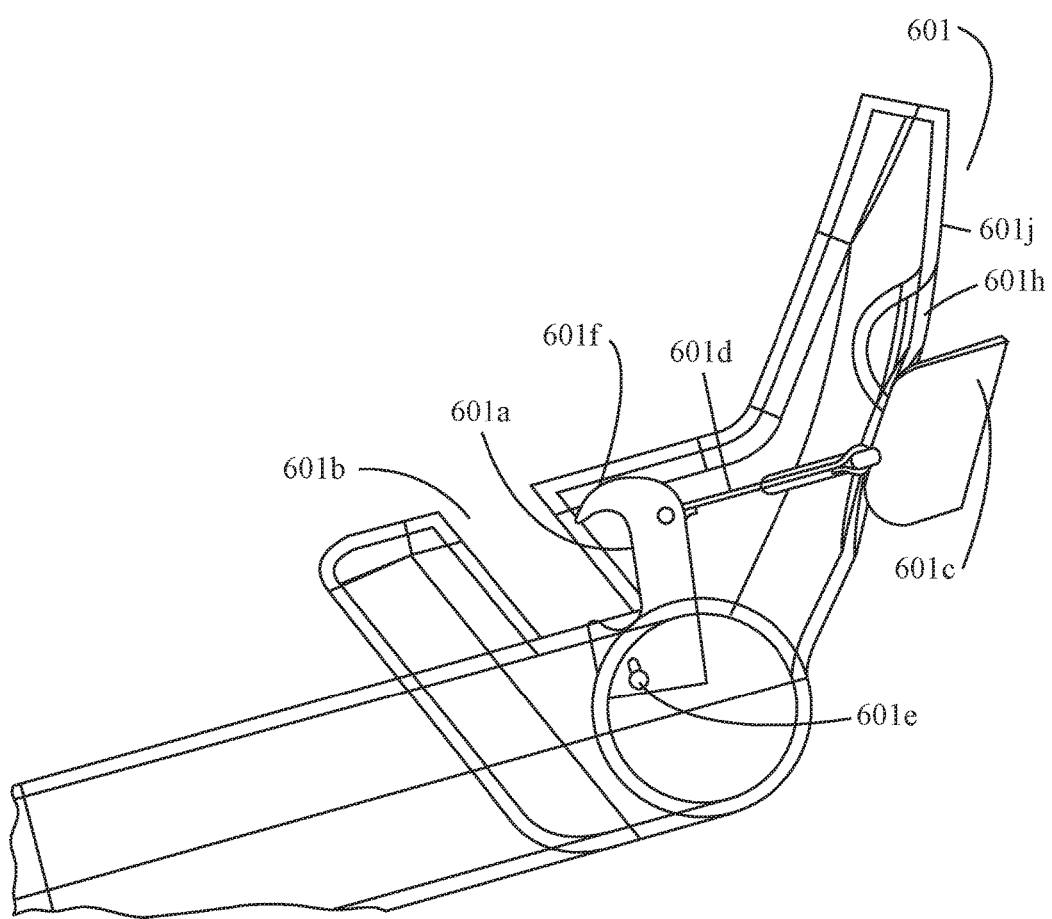
FIG. 12 shows a latch in an open position.

FIG. 12 shows a section view of the latch 601 along section 12-12 in FIG. 11. As shown in FIG. 12, the latch 601 includes a handle 601c that is coupled to the hooks 601a by a linkage 601d. The hooks 601a are hingedly coupled to the latch 601 at a pivot 601e. In FIG. 12 the handle 601c is pulled distally to rotate the hooks 601a about the pivot 601e to open the passageway 601b. A distal surface 601j of the latch 601 may be recessed adjacent to the handle 601c to provide access to a proximal facing surface of the handle 601c. As previously mentioned, the hooks 601a may be biased by a spring or other biasing means so that when the handle 601c is released, the hooks 601a may return to their closed position shown in FIG. 13A.

Figure 13A:
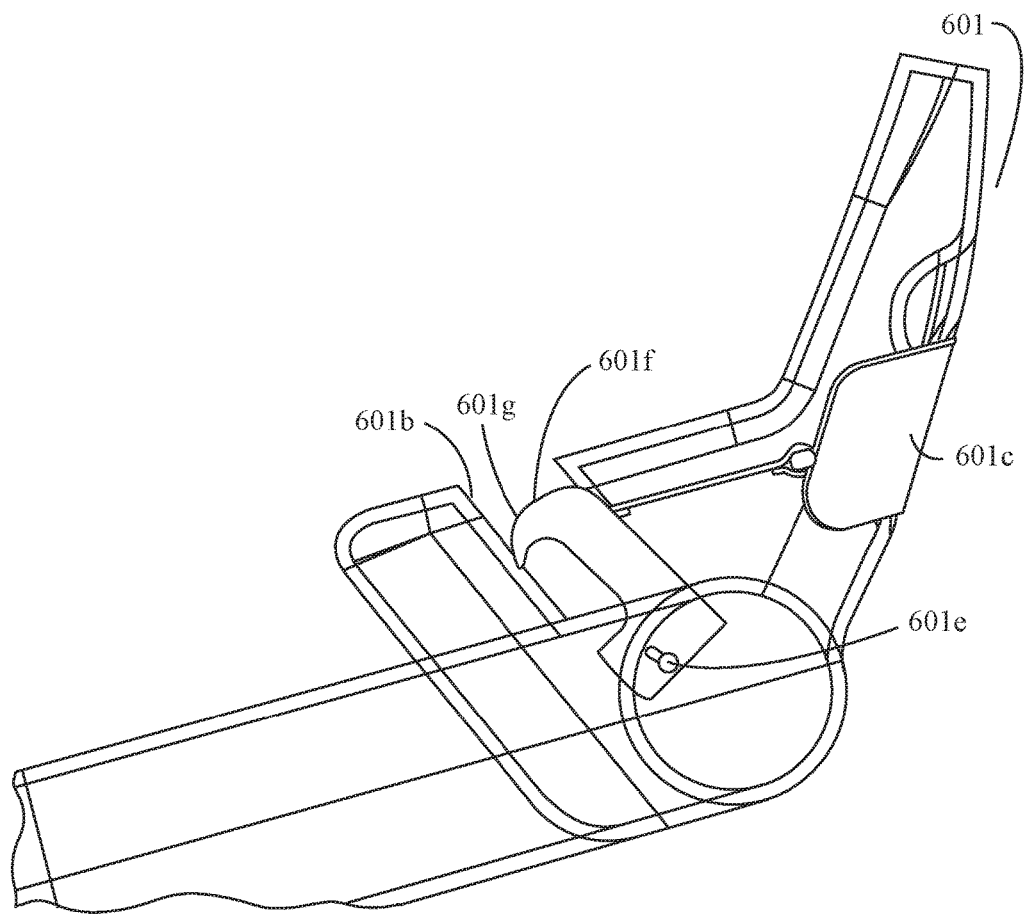
FIG. 13A shows a latch in a closed position.

In addition to moving the hooks 601a with the handle 601c, the hooks 601a can also be temporarily moved from the closed position to the open position by being pushed on by the rear bar 20r of the car seat 10 when the car seat 10 is connected to the frame 600. For example, as shown in FIG. 13A, the hooks 601a have a curved or angled outer surface 601f at an end 601g of the hook 601a. The angled outer surface 601f extends downwardly and proximally in the passageway 601b. The angled outer surface 601f is a bearing surface on which the rear bar 20r can act, as shown in FIG. 13B.

Figure 13B:
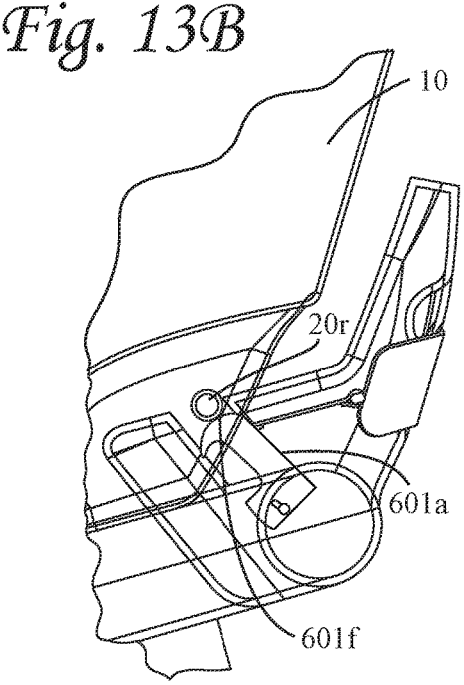
FIG. 13B shows the latch in FIG. 13A with a car seat positioned over the latch.
Figure 13C:
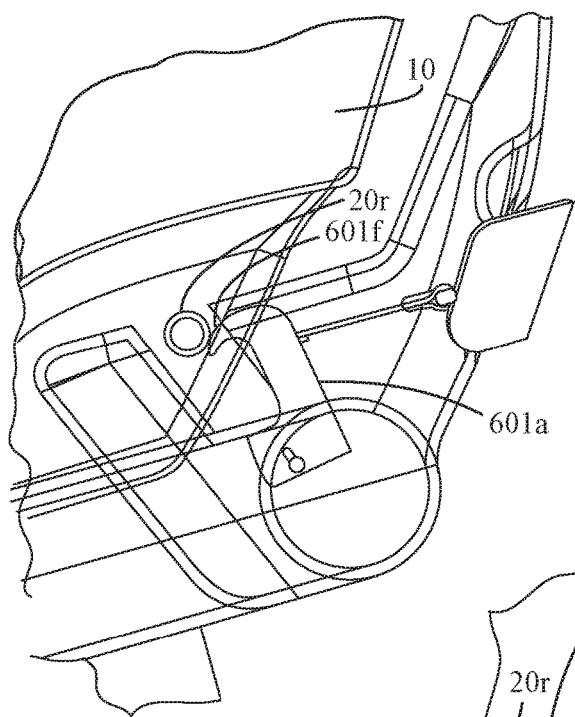
FIG. 13C shows the latch of FIG. 13A opening to couple to the car seat.
Figure 13D:
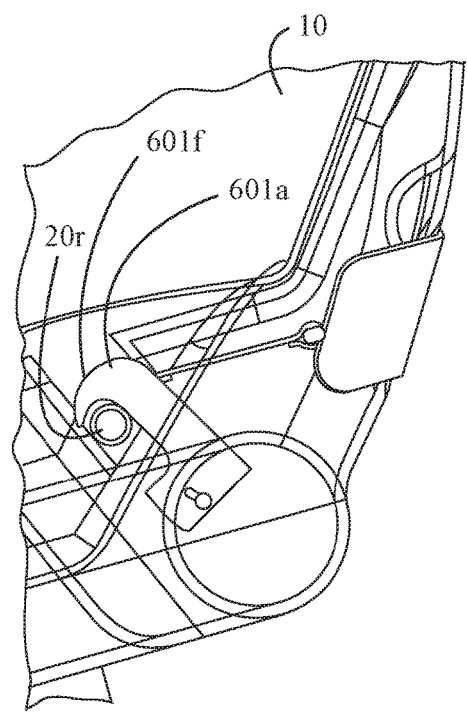
FIG. 13D shows the latch of FIG. 13A closed and coupled to the car seat.

Specifically, during a coupling procedure to couple the car seat 10 to the frame 600, the rear bar 20r can be aligned with the passageway 601b, as shown in FIG. 13B, and can be pushed down on the curved surface 601f. The pushing of the rear bar 20r on the angled outer surface 601f causes the rear bar 601b to rotate towards the open position, as shown in FIG. 13C. As the rear bar 20r is pushed further downward, it passes the angled outer surface 601f so that the biasing force acting on the hooks 601a cause the hooks 601a to return to their closed position, thereby locking the rear bar 20r to the latch 601, as shown in FIG. 13D. The car seat 10 can be uncoupled from the frame 600 by pulling distally on the handle 601c to displace the hooks 601a to the open position while the car seat 10 is moved upwardly and proximally so that the front rod 20*k* is slid out of slot 602*c* while the rear rod 20*r* is slid out of passageway 601*b*.

Figure 14:
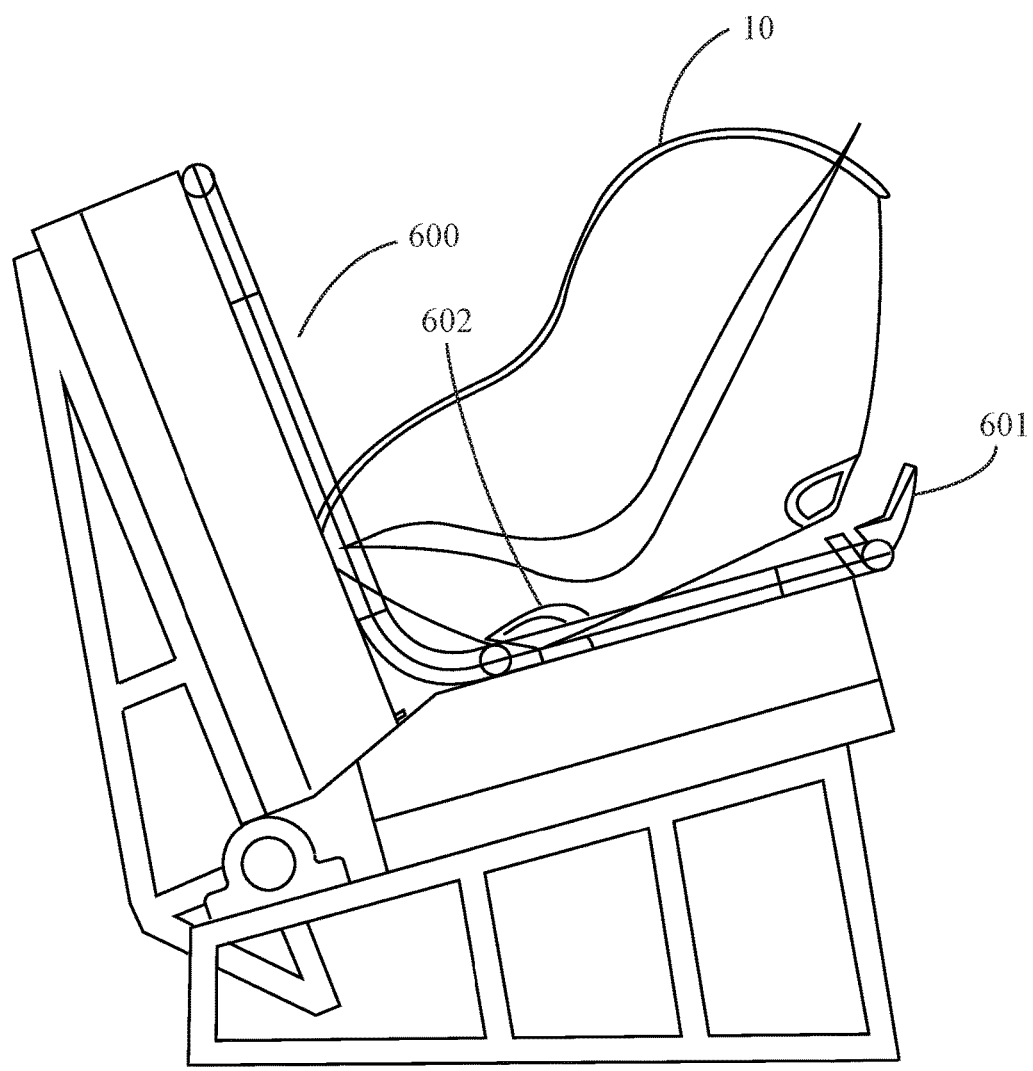
FIG. 14 shows a car seat partially coupled to a car seat frame.
Figure 15:
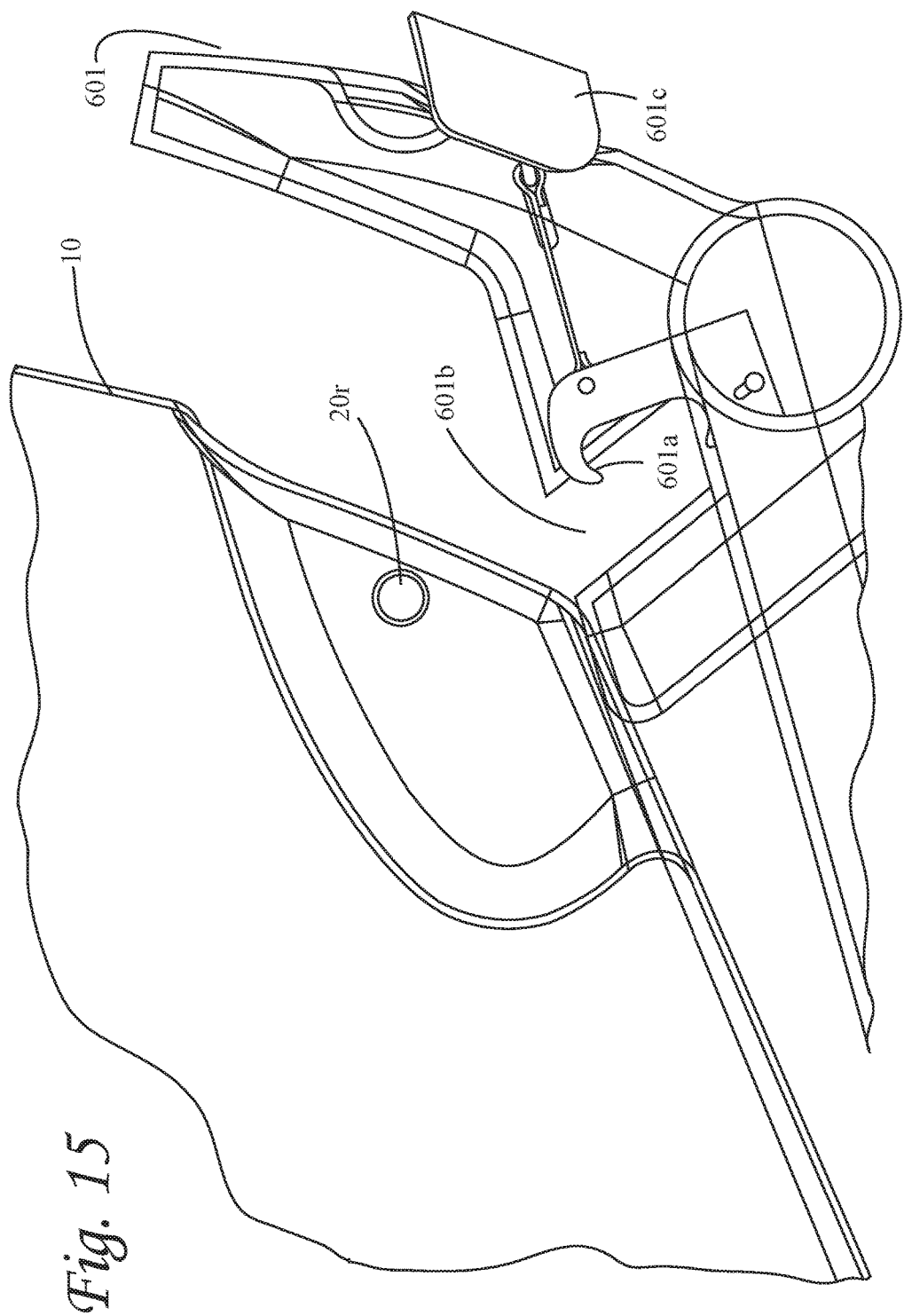
FIG. 15 shows a partial view of the car seat and frame shown in FIG. 14 during a disconnection procedure.

The car seat 10 and the frame 600 provide for a relatively quick and easy way to connect and disconnect the car seat to a vehicle. Before connecting the car seat 10 to the frame, a user first connects the frame 600 to the vehicle seat 700 as described above. During connection of the seat 10 to the frame 600, a user positions the car seat 10 over the frame 600 as shown in FIG. 14. The user first aligns and engages the front bar 20*k* with the opening 602*d* of the slot 602*c* of the hooks 602 and pulls the seat 10 slightly in the distal direction to align the rear bar 20*r* with the passageway 601*b* of the latch 601. The user then slides the car seat 10 further distally and pushes downwardly so that the front bar 20*k* slides down slot 602*c* on surface 602*b* while the rear bar 20*r* pushes on hooks 601*a* to open the hooks, as discussed above. When the rear bar 20*r* is moved further downward, the hooks 601*a* close, as discussed above, thereby locking the car seat 10 to the frame 600. The car seat 10 can be easily disconnected from the frame 600 by pulling distally on the handle 601*c* while displacing the car seat 10 proximally and upwardly and reversing the travel direction of the car seat 10 during its attachment to the frame 600, as shown in FIG. 15. Once the front rod 20*k* passes the open end 602*d* of slot 602*c*, the car seat 10 can be lifted straight up and taken out of the vehicle.

Figure 17:
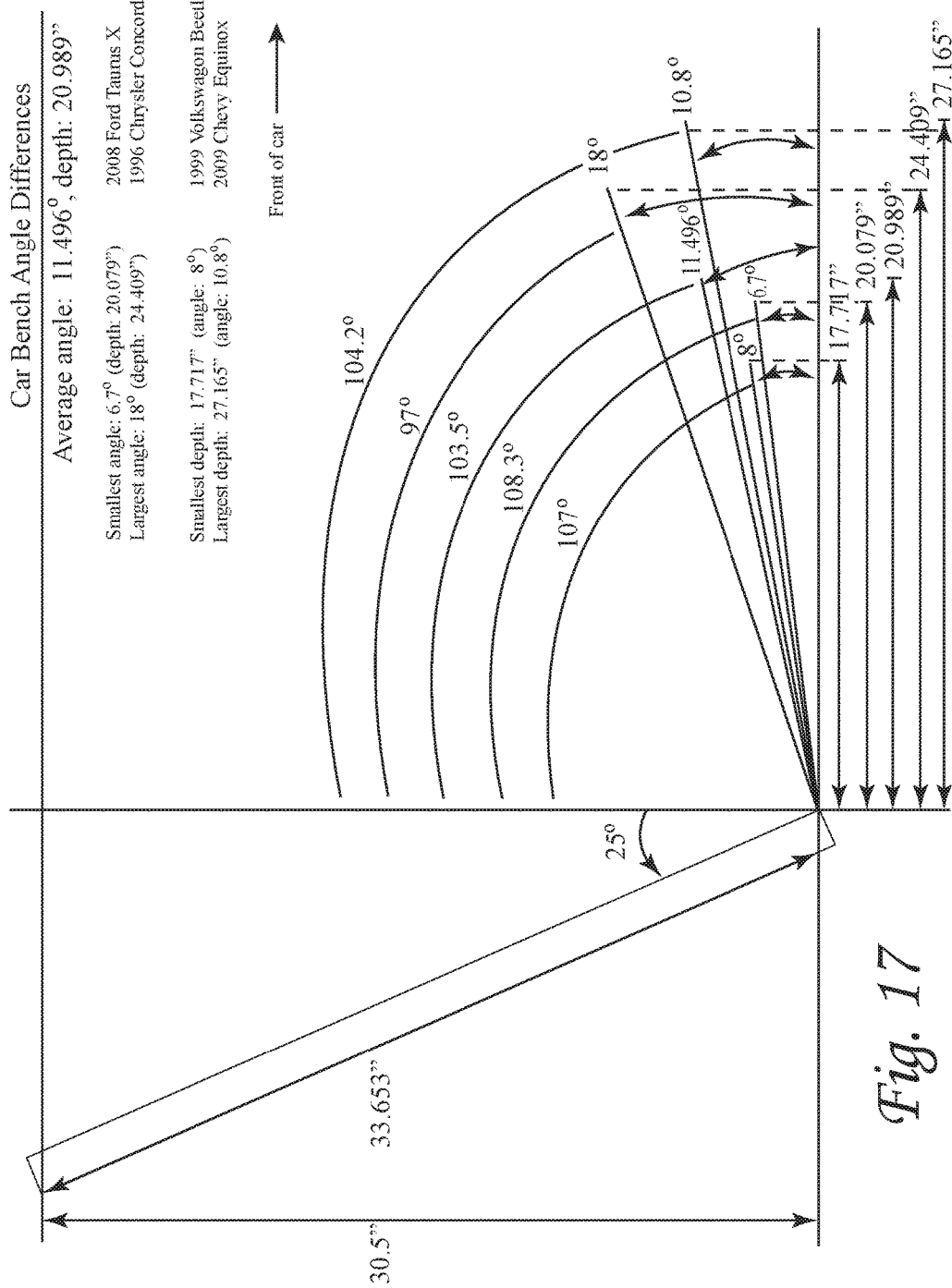
FIG. 17 shows the minimum and maximum values of the dimensions shown in the chart of FIG. 16A.

It will be appreciated that various vehicles may have varied seat dimensions and angles between the seatback and the seat. For example, FIG. 16A shows various automobile rear seat dimensions for a sample of automobiles. As seen in FIG. 16B, for the sample of automobiles listed in FIG. 16A, the angle between the seatback and the seat averages about 103.5 degrees and the average seatback height, h, is 33.653 inches. FIG. 17 further illustrates the vehicle data in the table in FIG. 16 and shows minimums and maximums for the seat angle and seat depth. For example, the seat angle ranges between 6.7 degrees to 18 degrees and the seat depth ranges from 17.717 inches to 27.165 inches. The data show that the maximum seatback recline angle is 25 degrees. Therefore, for the vehicles listed in FIG. 16, the maximum angle between the seatback and the bench is 108.3 degrees and the minimum angle between the seatback and the bench is 97 degrees. As noted above, in one embodiment, the fixed angle between the vertical portion 603 and the horizontal portion 604 of the frame 600 is approximately 97 degrees. Thus, for at least that embodiment of the frame 600, the frame 600 will have the minimum angle to fit between the seatback and the seat of all of the vehicles in the list in FIG. 16B.

It will be appreciated, however, that for vehicle seat configurations where the an angle between the seat and seatback is greater than approximately 97 degrees, setting the frame 600 with the horizontal member 604 on the seat 700*b* will result in the vertical portion 603 not extending flush with the seatback 700*a*. Instead, the vertical portion 603 will extend at an angle with respect with the seatback 700*a* leaving a gap therebetween. This gap can be undesirable because it may reduce the isolation between the car seat 10 and the vehicle when the car seat 10 is connected to the frame 600. Without being bound by theory, it is possible that maintaining the vertical portion 603 flush to the seatback 700*a* can significantly enhance the isolation between the seat 10 and the vehicle. For example, spacing the vertical portion 603 from the seatback 700*a* provides the frame 600 a range of rotational motion about the connectors 607 that would allow the car seat to accelerate unimpeded for a certain amount of time before contacting the vehicle seatback 700*a*. However, maintaining the vertical portion 603 in contact with the seatback eliminates the range of motion.

Figure 18:
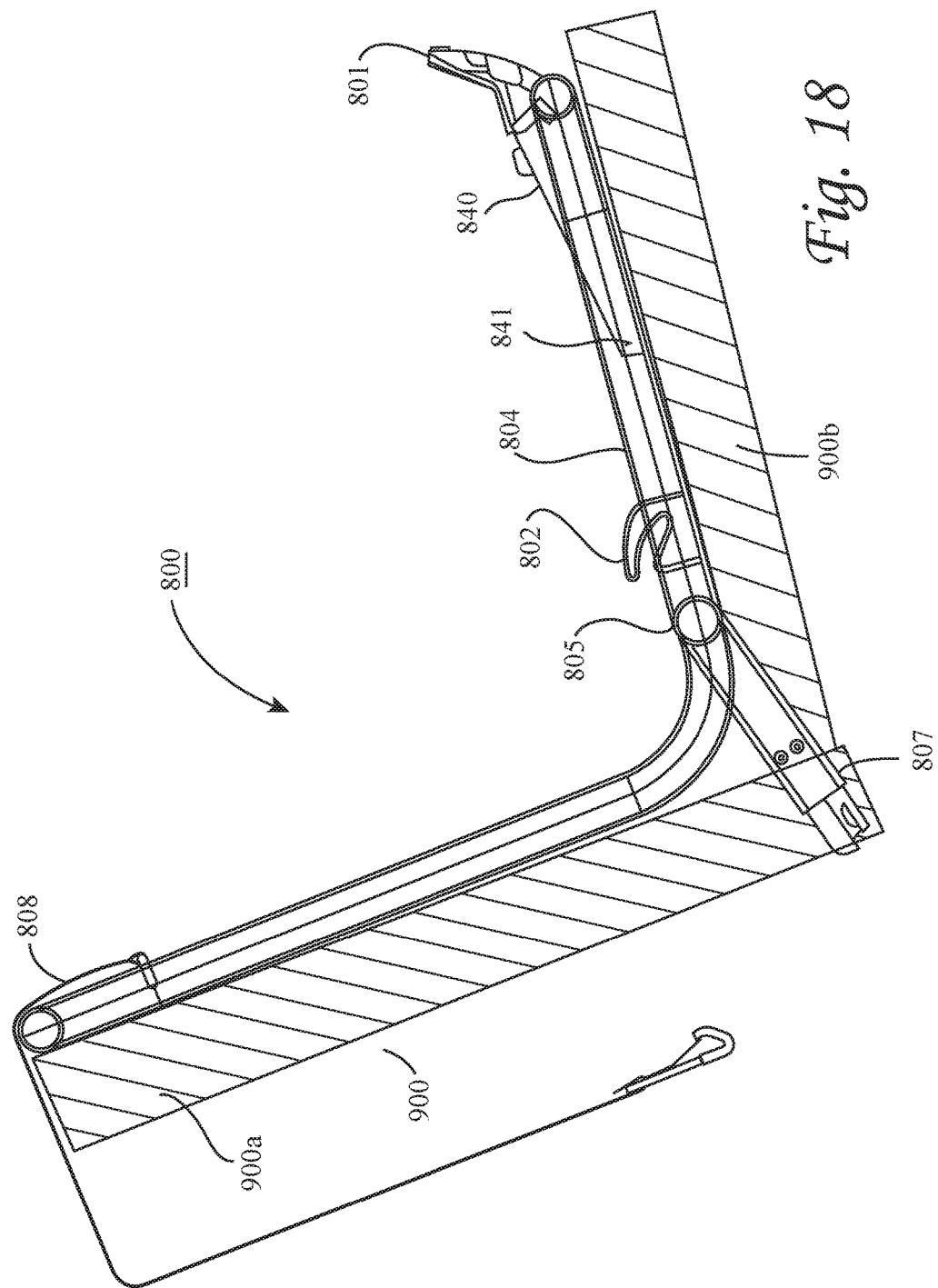
FIG. 18 shows another embodiment of a car seat mounting frame with an angle adjuster.

To provide frame adjustment for varied vehicle seat angles, an alternative embodiment of a frame 800 is provided. FIG. 18 shows frame 800, which is similar to frame 600 of FIG. 8, with similar elements numbered similarly, but increased by "200". The frame 800 includes a vertical portion 803 and a horizontal portion 804 extending at a fixed angle with respect to the vertical portion. In the embodiment shown in FIG. 18, the fixed angle is approximately 97 degrees. The frame 800 is shown seated against a vehicle seat 900 whose seatback 900*a* and seat 900*b* are angled at approximately 97 degrees with one another. Accordingly, the horizontal portion 804 and the vertical portion 803 extend flush, respectively, with the seat 900*b* and the seatback 900*a*.

The frame 800 also includes an adjustment member 840 that is coupled to the horizontal portion 804. The adjustment member 840 is pivotally connected to the horizontal portion 804 about a axle 841. The adjustment member 840 may swing through the horizontal portion 804 of the frame 800 so that an upper side of the adjustment member 840 may be disposed above the horizontal portion 804 when a lower side of the adjustment member 840 is flush with the seat 900, as is shown in FIG. 18. In one embodiment, the adjustment member 840 is biased to rotate downward away from the horizontal portion 804 of the frame 800. For example, a spring may be used to bias the adjustment member 840. Also, in another embodiment, the adjustment member 840 can be manually set in one rotated position about axle 841 relative to the horizontal portion 804 and fixed in that position, such as with fasteners and the like.

Figure 19:
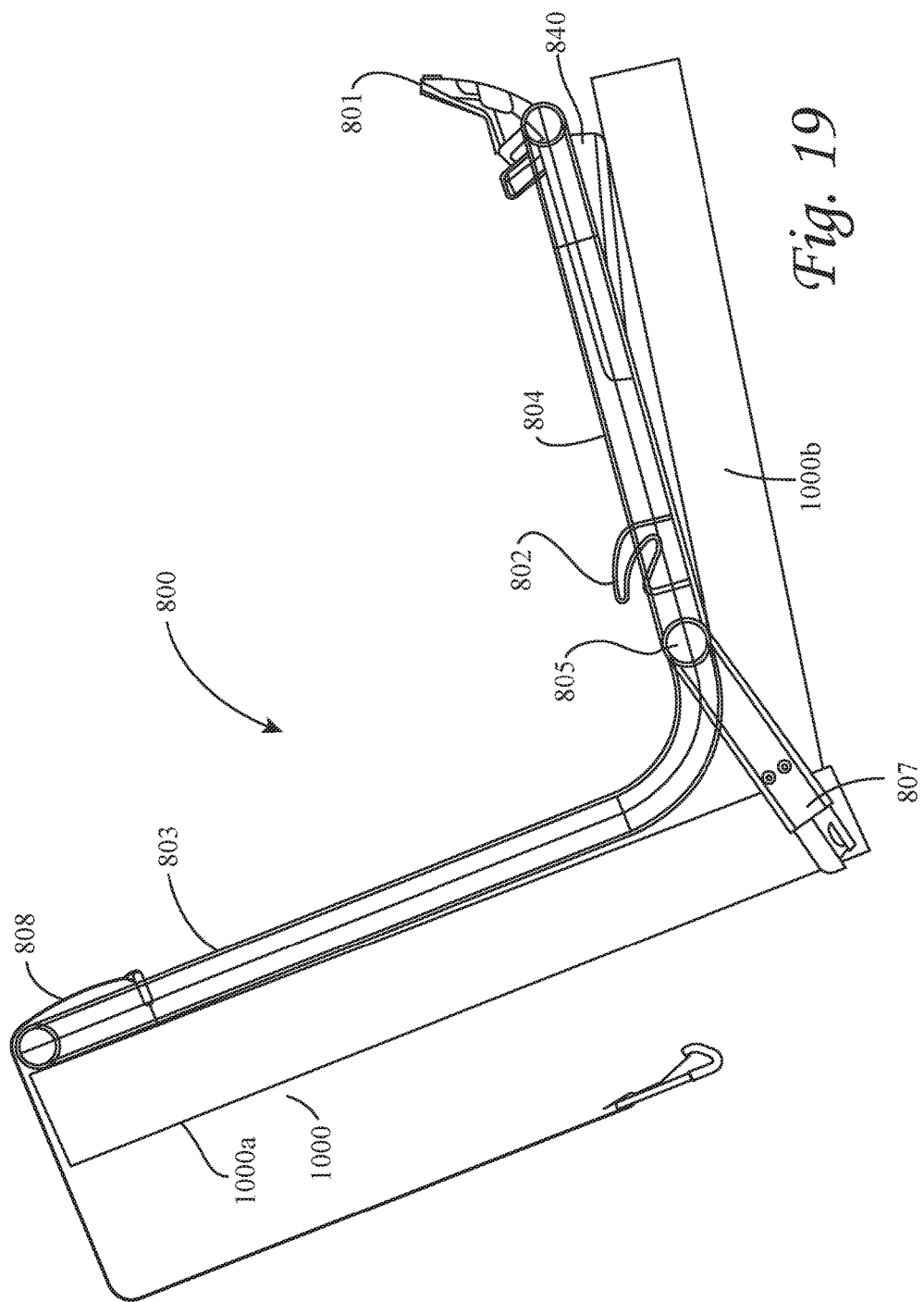
FIG. 19 shows the car seat mounting frame of FIG. 18 in an adjusted position.

FIG. 19 shows the frame 800 of FIG. 18 seated against a seat 1000 having a seatback 1000*a* and a seat 1000*b* that are angled at an angle that is greater than 97 degrees. As noted above, the frame 800 has an angle of 97 degrees between the horizontal and vertical portions 804 and 803. Therefore, without any adjustment of the angle of the frame 800 with respect to the seat 1000, if the horizontal portion 804 was positioned flush with the seat 1000*b* in FIG. 19, there would be a gap between the vertical portion 803 and the seatback 1000*a*. To eliminate that gap, the adjustment member 840 is rotated downwardly about axle 841 sufficiently to contact the seat 1000*b* and rotate the entire frame 800 so that the vertical portion 803 lies flush against the seatback 1000*a*.

Figure 20:
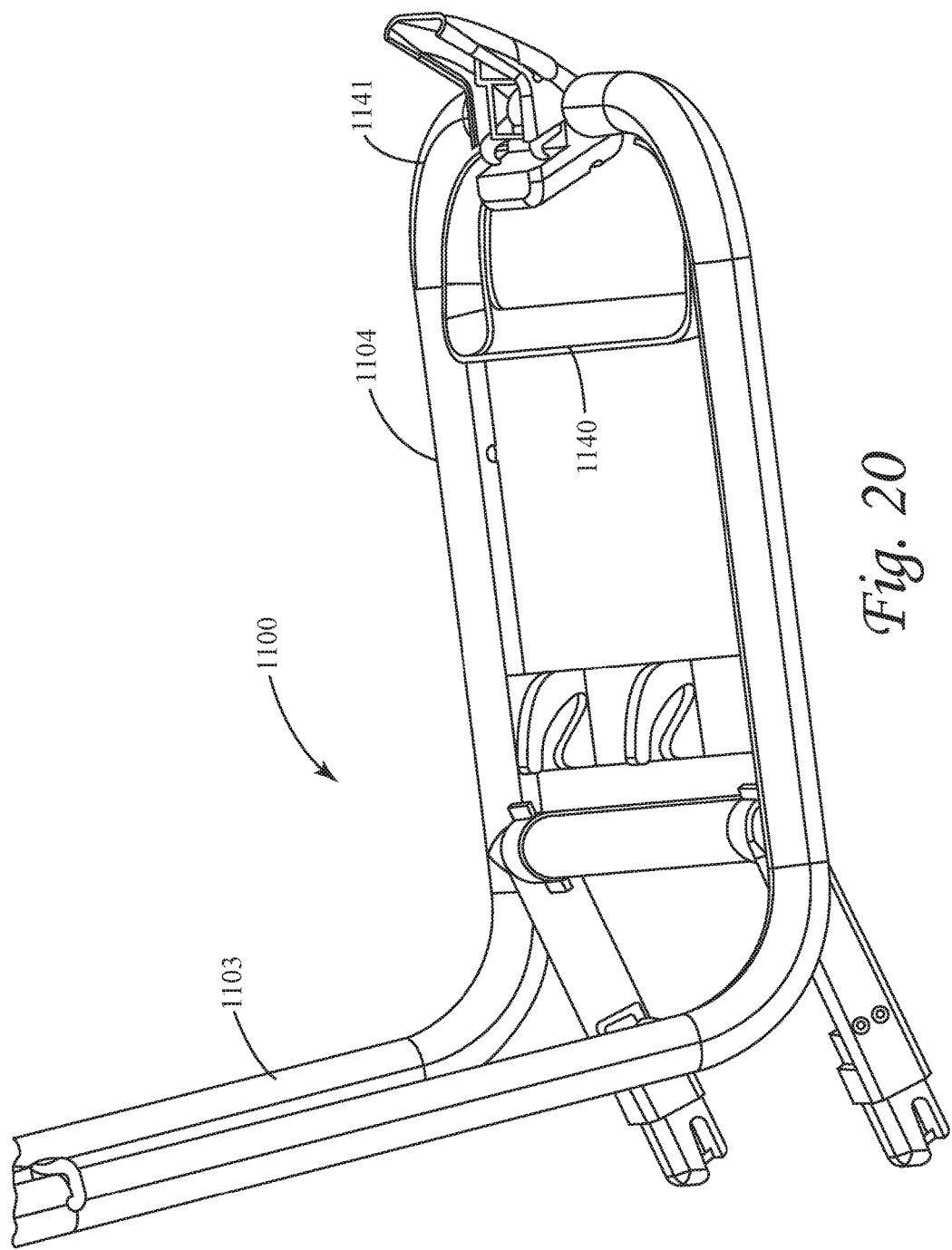
FIG. 20 shows another embodiment of a car seat mounting frame with an adjustment member.

FIG. 20 shows another embodiment of a frame 1100, which is similar to frame 600 of FIG. 8, with similar elements numbered similarly but increased by "500". The frame 1100 includes a vertical portion 1103 and a horizontal portion 1104 extending at a fixed angle with respect to the vertical portion. In the embodiment shown in FIG. 20, the fixed angle is approximately 97 degrees.

The frame 1100 also includes an adjustment member 1140 that is coupled to the horizontal portion 1104. The adjustment member 1140 is pivotally connected to the horizontal portion 1104 about a pivot 1141. The adjustment member 1140 may swing down from the horizontal portion 1104 of the frame 1100 to adjust the angle between the vertical portion 1103 and a seatback of a vehicle. The adjustment member 1140 may biased to rotate downward away from the horizontal portion 1104 of the frame 1100. For example, a spring may be used to bias the adjustment member 1140. Also, the adjustment member 1140 may be manually set in one position relative to the horizontal portion 1104 and fixed in that position, such as with fasteners and the like.

Figure 21:
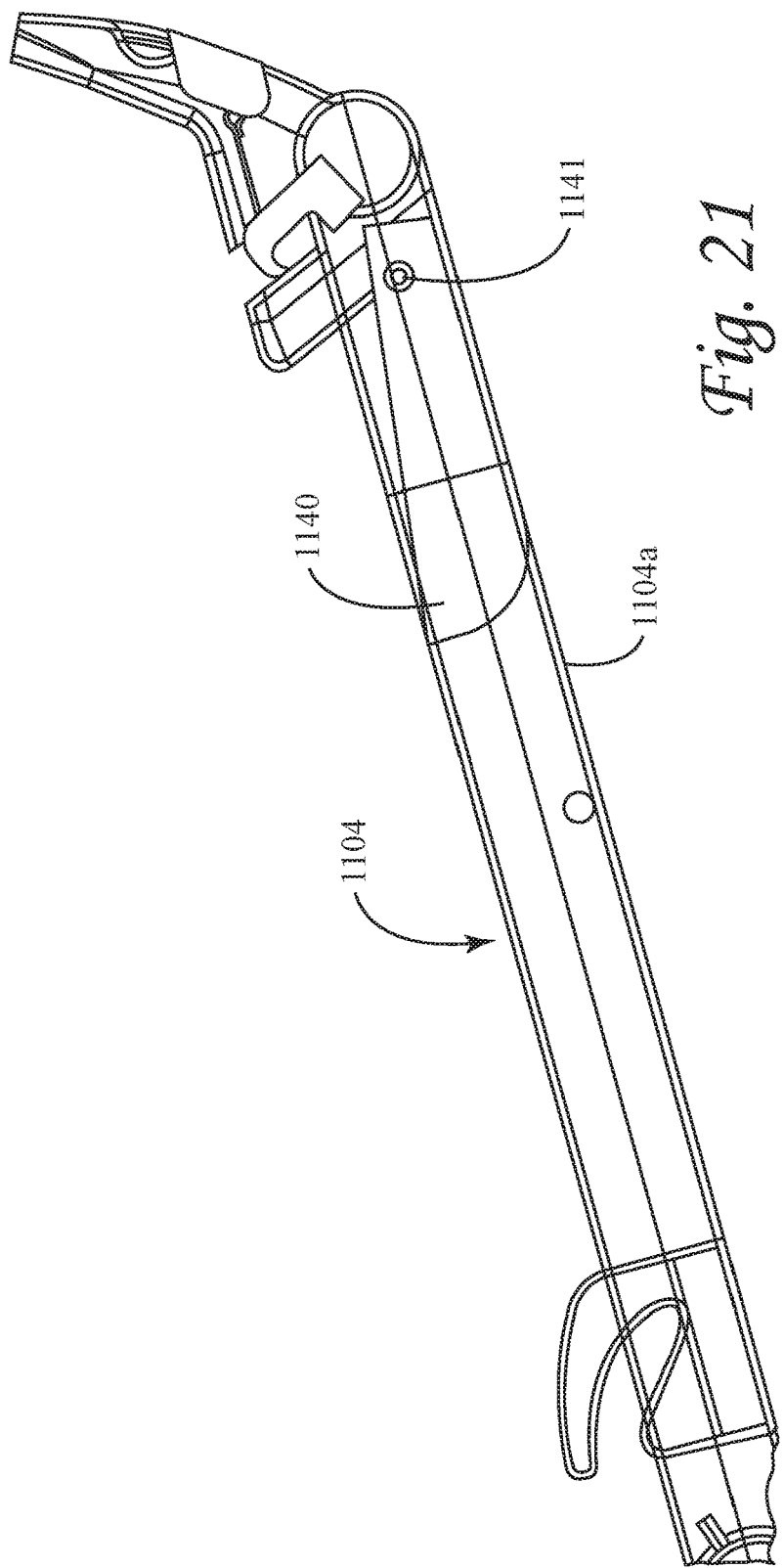
FIG. 21 shows the car seat mounting frame of FIG. 20 with the adjustment member in a non-deployed position.

As shown in FIG. 21, in an undeployed position the adjustment member 1141 may be completely concealed by the horizontal portion 1104 of the frame 1100. For example, in a case where the angle between the horizontal portion 1104 and the vertical portion 1103 of the frame 1100 is the same as the angle between the seatback and seat of a vehicle, no angle adjustment is needed and, therefore, the adjustment member 1140 remains concealed in its non-deployed position, shown in FIGS. 20 and 21. It will be appreciated that in the undeployed position, the adjustment member 1140 does not extend from a lower side 1104a of the horizontal portion 1104 of the frame 1100, so as not to alter the orientation of the frame 1100 with respect to the seat on which the frame is seated.

Figure 22:
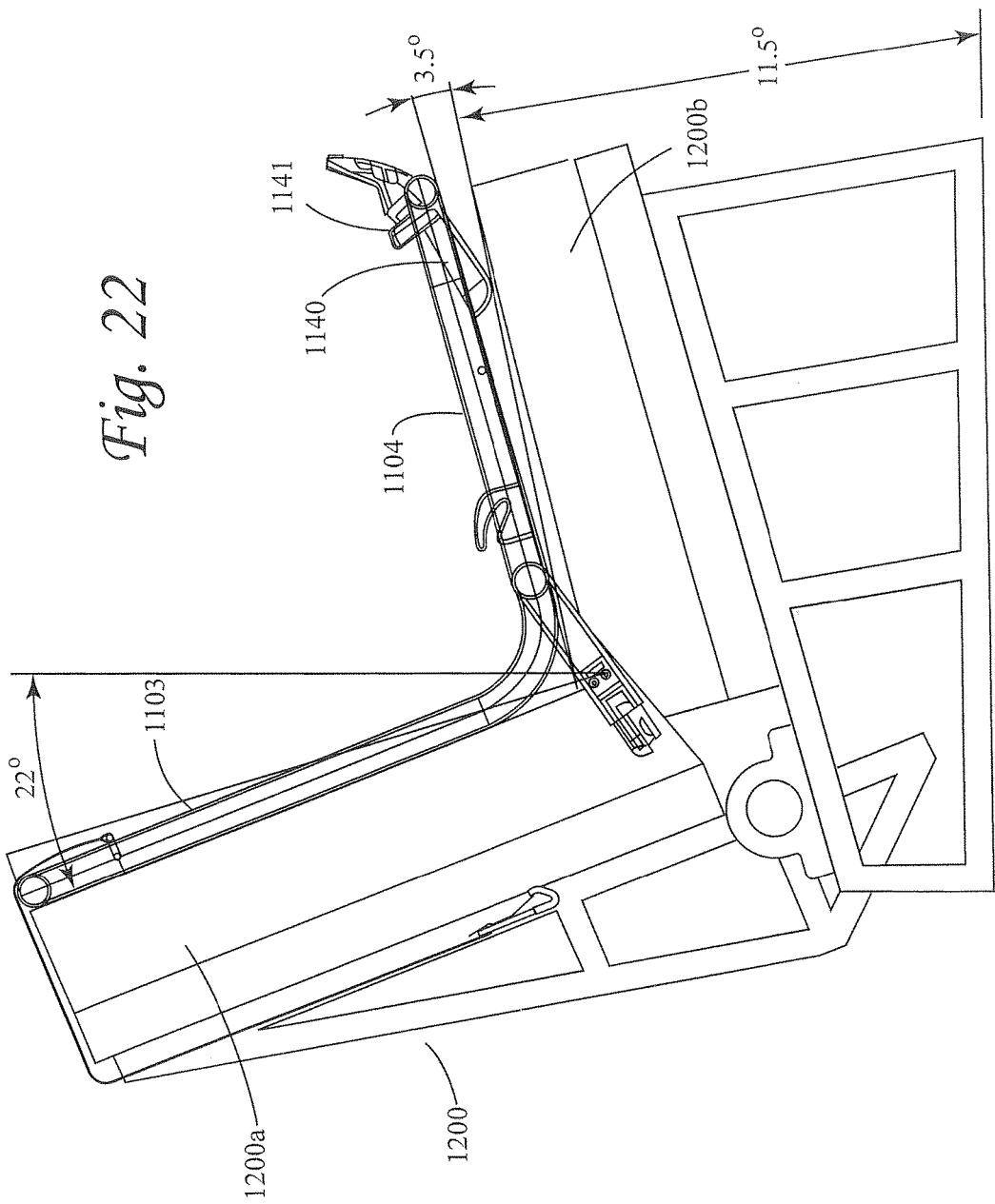
FIG. 22 shows the car seat mounting frame of FIG. 20 with the adjustment member in one deployed position.
Figure 23:
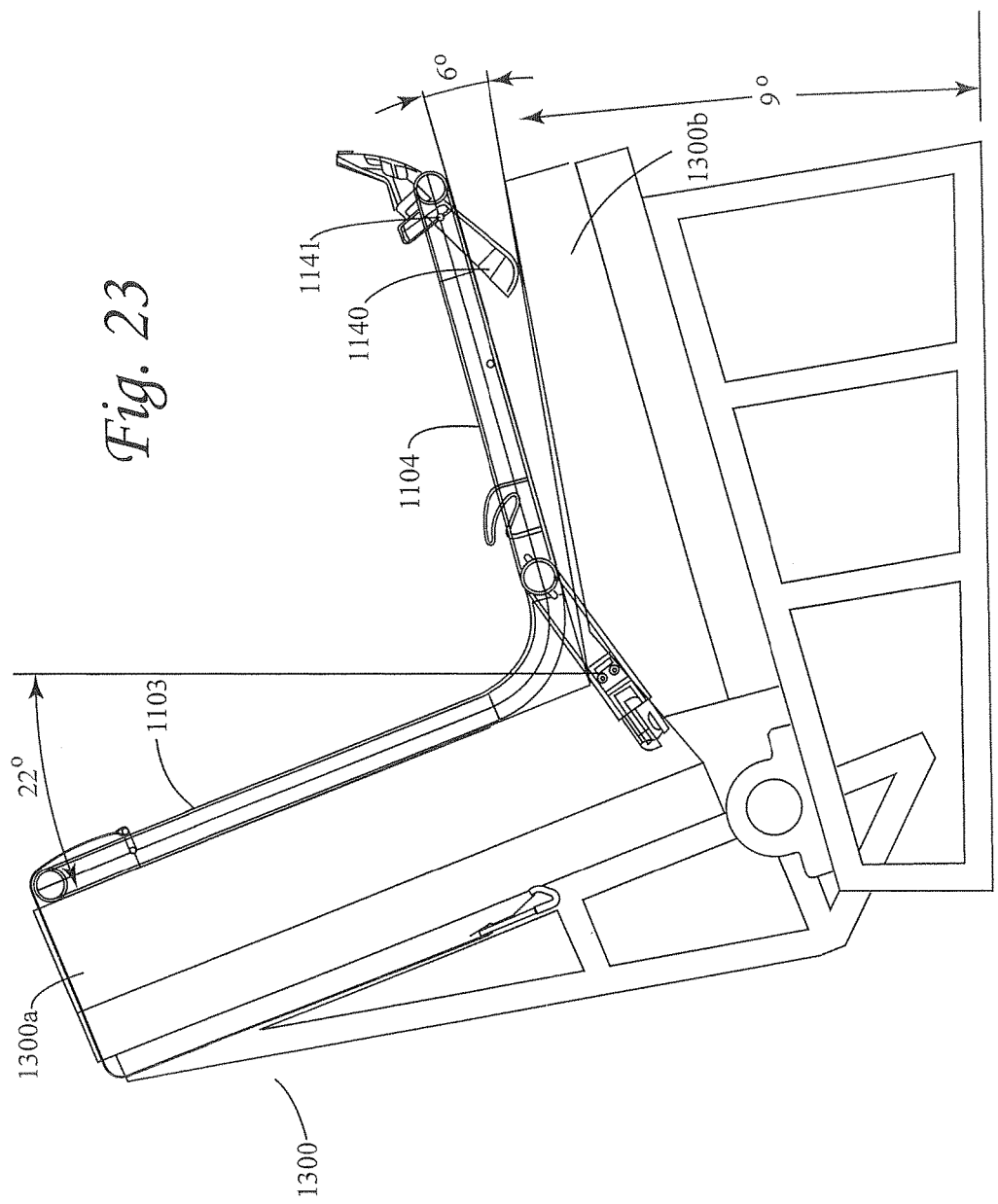
FIG. 23 shows the car seat mounting frame of FIG. 20 with the adjustment member in another deployed position.
Figure 24:
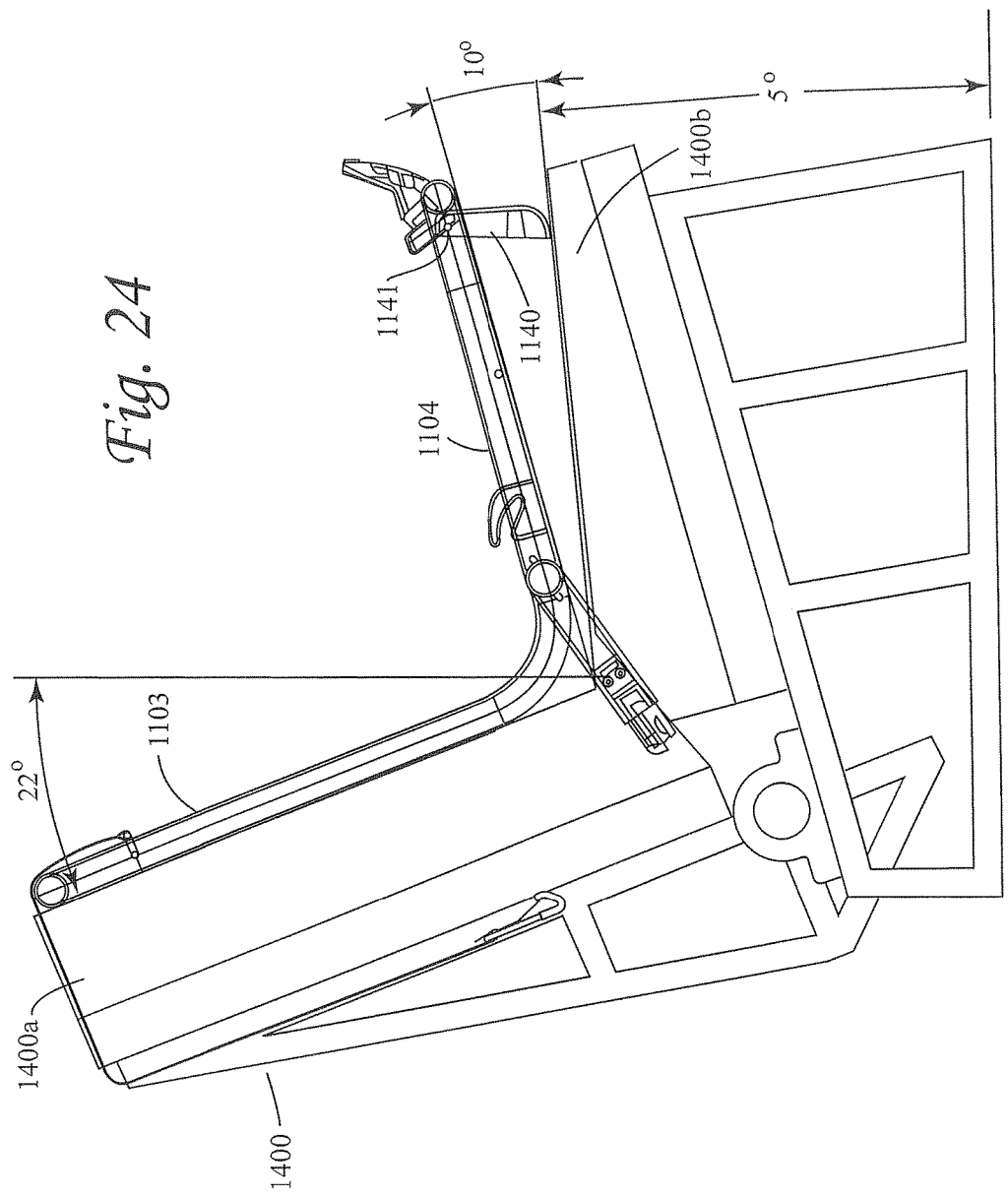
FIG. 24 shows the car seat mounting frame of FIG. 20 with the adjustment member in another deployed position.

FIGS. 22 to 24 illustrate adjustment of the frame 1100 in three different vehicle seats in which the angles between the seatback and the seat vary and are all greater than the angle between the horizontal portion 1104 and the vertical portion 1103, which is 97 degrees.

In FIG. 22, the angle between a seatback 1200a and a seat 1200b of a vehicle seat 1200 is 100.5 degrees. To adjust for the larger angle of the vehicle seat, the adjustment member 1141 is rotated downwardly from the horizontal portion 1104 about pivot 1141 until the vertical portion 1103 is flush with the seatback 1200a. In FIG. 22, the adjustment member 1140 rotates the vertical portion 1103 3.5 degrees in the counterclockwise direction so that the vertical portion 1103 is flush with the seatback 1200a.

In FIG. 23, the angle between a seatback 1300a and a seat 1300b of a vehicle seat 1300 is 103 degrees. To adjust for the larger angle of the vehicle seat 1300, the adjustment member 1141 is rotated downwardly from the horizontal portion 1104 about pivot 1141 until the vertical portion 1103 is flush with the seatback 1300a. In FIG. 23, the adjustment member 1140 rotates the vertical portion 1103 6 degrees in the counterclockwise direction so that the vertical portion 1103 is flush with the seatback 1300a.

In FIG. 24, the angle between a seatback 1400a and a seat 1400b of a vehicle seat 1400 is 107 degrees. To adjust for the larger angle of the vehicle seat 1400, the adjustment member 1141 is rotated downwardly from the horizontal portion 1104 about pivot 1141 until the vertical portion 1103 is flush with the seatback 1400a. In FIG. 24, the adjustment member 1140 rotates the vertical portion 1103 10 degrees in the counterclockwise direction so that the vertical portion 1103 is flush with the seatback 1400a.

While the adjustment member 840 of frame 800 and adjustment member 1140 of frame 1100 have been described as being coupled, respectively, to the horizontal portions 804 and 1104 and deployed therefrom, it will be appreciated that such adjustment members 840 and 1140 may alternatively be coupled to and deployed from the vertical portions 803 and 1103, respectively, of frames 800 and 1100.

Figure 25:
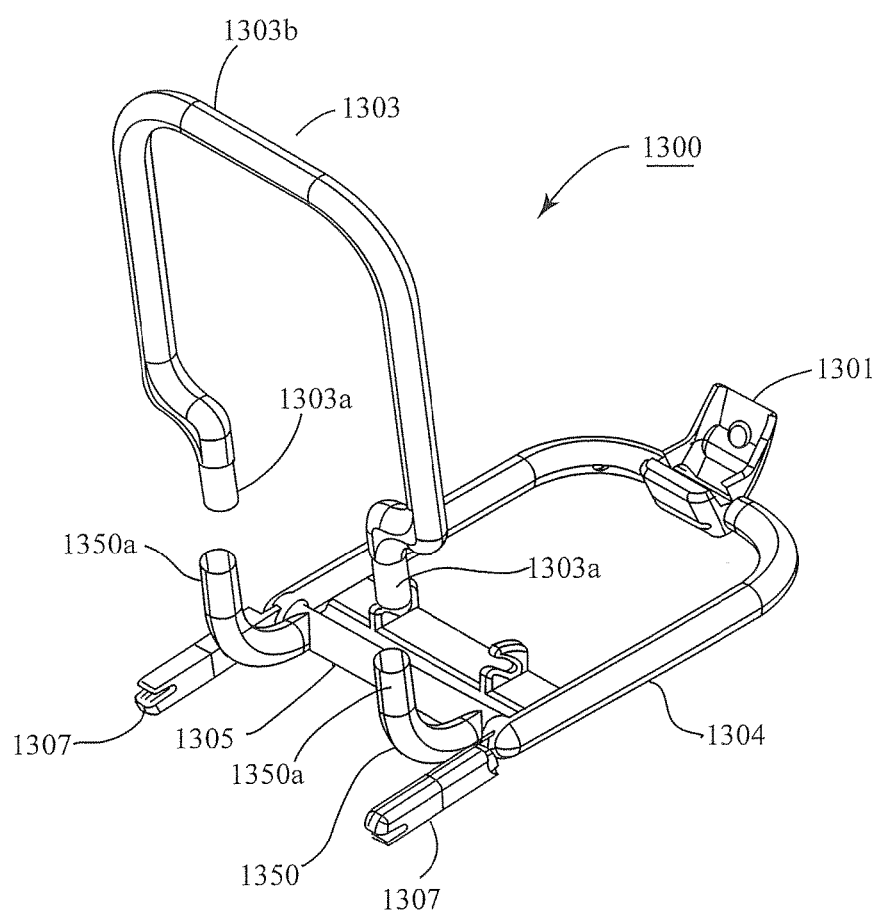
FIG. 25 shows an assembly view of another embodiment of a car seat mounting frame.

FIG. 25 shows another embodiment of a frame 1300, which is similar to frame 600 of FIG. 8, with similar elements numbered similarly but increased by "700". The frame 1300 includes a vertical portion 1303 and a horizontal portion 1304 extending at a fixed angle with respect to the vertical portion 1303. In the embodiment shown in FIG. 25, the fixed angle is approximately 97 degrees. The frame 1300 also has a latch 1301 for coupling to a car seat like car seats 10 and 110, and has mini-connectors 1307 for connecting to LATCH vehicle anchors, as described above.

The vertical portion 1303 is separable from the frame 1300, as shown in FIG. 25. As shown in FIG. 25, the vertical portion 1303 is formed as a generally u-shaped member having free ends 1303a that are tubular. The vertical portion extends from the free ends 1303a to a distal end 1303b. The ends 1303a are slightly tapered to fit snugly within slightly larger, open tubular ends 1350a of a corner portion 1350 of the frame 1300. The corner portion 1350 extends from a cross bar 1305 that extends across sides of the horizontal portion 1304 at a proximal end thereof, and which is arranged generally as a u-shaped member. The vertical portion 1303 and/or the corner portion 1350 may incorporate a locking feature to retain the vertical portion 1303 and the corner portion 1350 together when the vertical portion 1303 and corner portion 1350 are joined together. For example, one or more spring-biased pins between the ends 1303a and 1350a may be used to lock the vertical portion 1303 with the corner portion 1350 and the pins may be used (such as by pushing them against the spring force) to unlock those portions when a user wishes to separate them, such as for storage of the frame 1300.

Figure 26A:
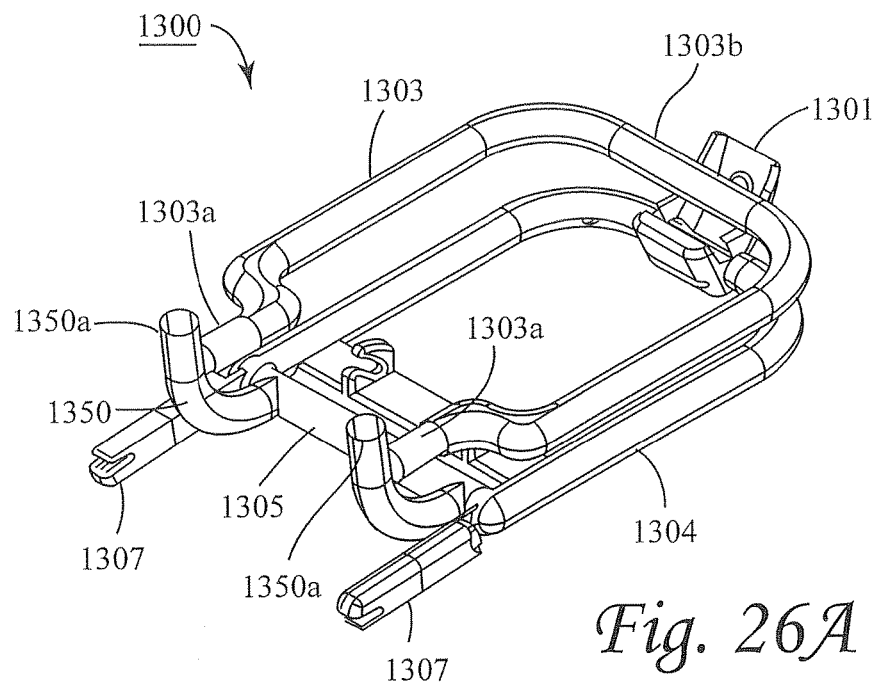
FIG. 26A shows the car seat mounting frame of FIG. 25 in a first stowed configuration.
Figure 26B:
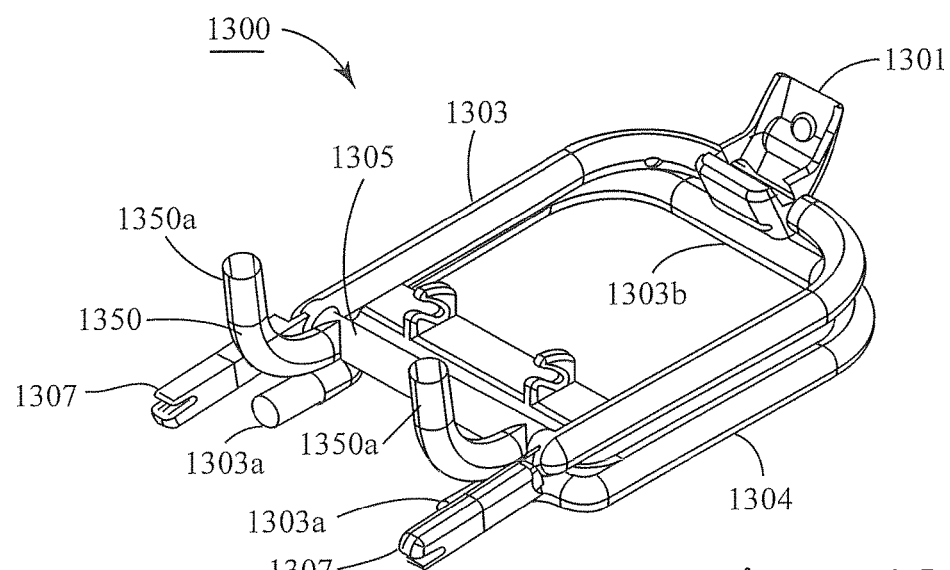
FIG. 26B shows the car seat mounting frame of FIG. 25 in a second stowed configuration.

In that regard, FIGS. 26A and 26B show the frame 1300 in two respective stowed configurations for travel or storage. In FIG. 26A, the vertical portion 1303 is stowed in a first configuration above the horizontal portion 1304. When in the first stowed configuration, the ends 1303a are adjacent to ends 1350a while distal end 1303b is adjacent to a top side of the latch 1301. In FIG. 26B, the vertical portion 1303 is stowed in a second configuration below the horizontal portion 1304. When in the second stowed configuration, the end portions 1303a are adjacent to connectors 1307 while distal end 1303b is adjacent to a bottom side of the latch 1301.

It will be appreciated that in at least one other embodiment, other portions of the frame 1300 may be separable in addition to, or instead of the vertical portion 1303. For example, the horizontal portion 1304 may be separable from the cross bar 1305.

Figure 27A:
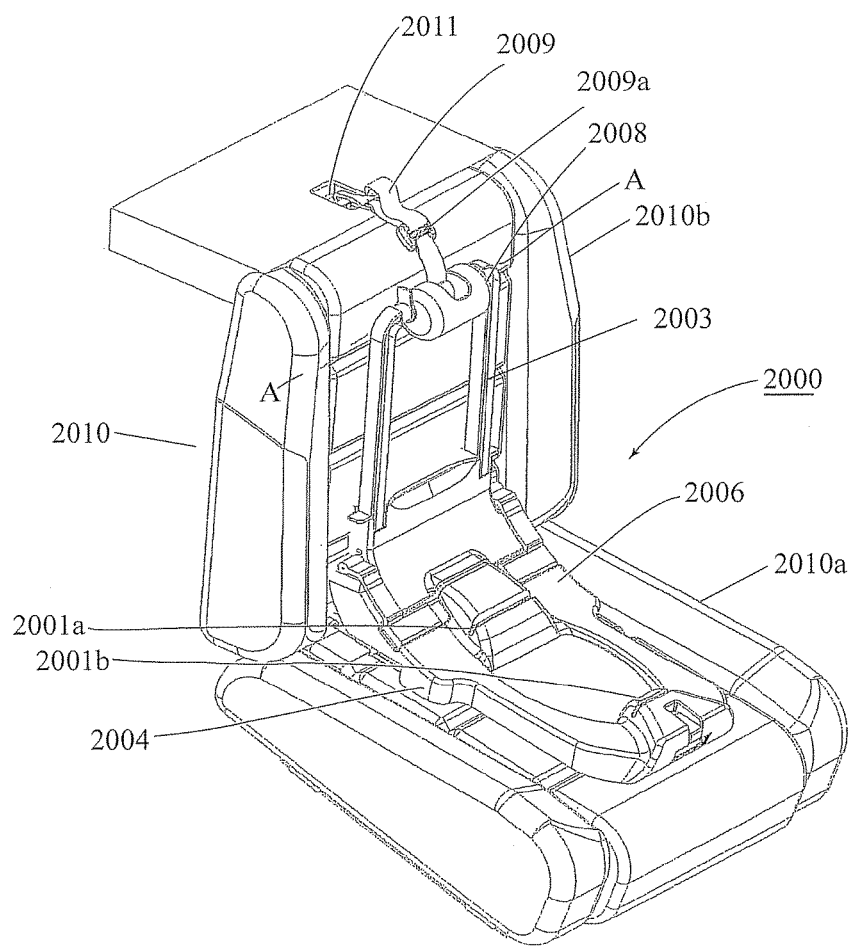
FIG. 27A shows another embodiment of a car seat mounting frame, which is shown installed in a vehicle seat.

FIG. 27A shows an embodiment of a car seat mounting frame 2000 shown installed in a vehicle seat 2010 having a horizontal seat 2010a and a seatback 2010b. The frame 2000 includes a vertical portion 2003 and a horizontal portion 2004 extending at an angle with respect to the vertical portion 2003. In the embodiment shown in FIG. 27A, the angle is approximately 97 degrees. The frame 2000 has a set of rear and front latches 2001a and 2001b that are configured for coupling a car seat 2020 (FIG. 27B), which may be constructed like car seats 10 and 110 described above, to the frame 2000. The frame 2000 has an angle adjuster 2008 to adjust the angle of the frame 2000 relative to the vehicle seat 2010, as will be described in greater detail below. Also, the angle adjuster 2008 may include a tether strap 2009 connected to a tether connector 2011. The tether strap 2009 includes an adjustment buckle 2009a, such as is illustrated in FIG. 27A, to tighten the tether strap 2009 after it is connected to a tether anchor of the vehicle. The frame 2000 may also have a cover 2006, which will be described in greater detail below.

Figure 27B:
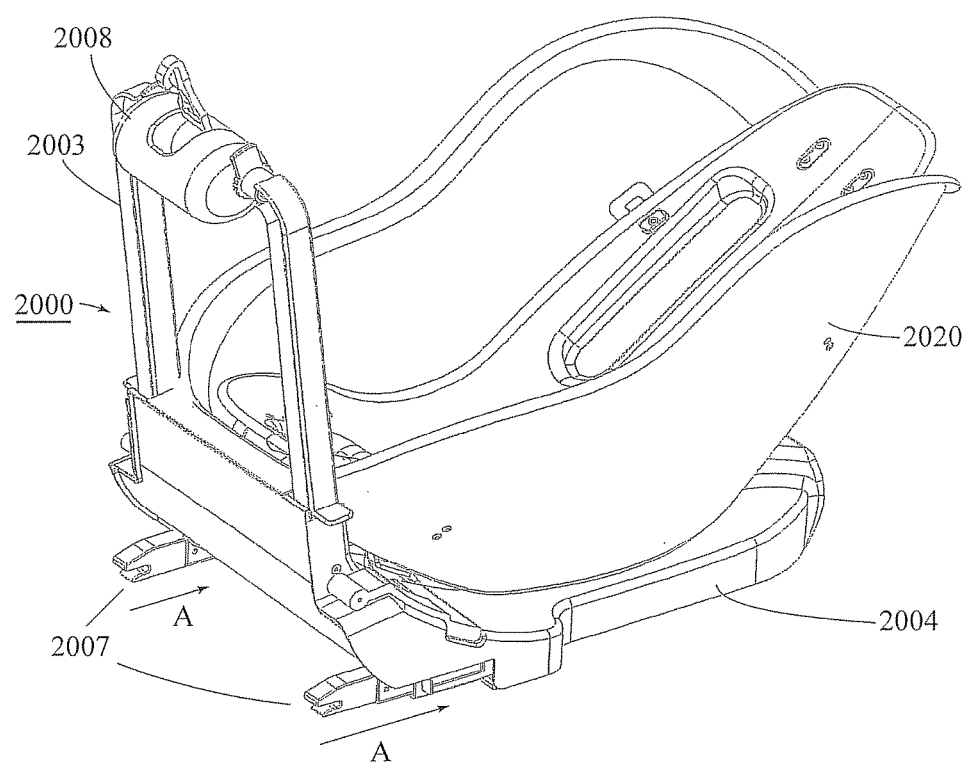
FIG. 27B shows a car seat system including a car seat mounted to the car seat mounting frame of FIG. 27A.

FIG. 27B shows the car seat mounting frame 2000 of FIG. 27A without the vehicle seat 2010, but with the car seat 2020 seated on and connected to the frame 2000. The frame 2000 has mini-connectors 2007 for connecting to vehicle LATCH anchors, as described above. The connectors 2007 may be laterally (horizontally) spaced apart by about 11 inches, which is standard for LATCH vehicle anchors. The connectors 2007 may be extended for use as shown in FIG. 27B or retracted in the direction of the arrows A in FIG. 27B for storage. As shown in FIG. 27B the car seat 2020 is oriented so that an occupant of the car seat 2020 faces towards the vertical portion 2003 of the frame 2000 (i.e., rearward facing in the vehicle).

The adjuster 2008 is shown as a generally cylindrical member extending horizontally across the top of the vertical portion 2003 of the frame 2000. The adjuster 2008 may be configured to rotate eccentrically with respect to a horizontal axis A-A (FIG. 27A) and to lock into a rotated position relative to that axis. In one embodiment the adjuster 2008 may be adjusted up to 180 degrees about axis A-A.

FIG. 28A is a side elevation view of the car seat mounting frame 2000 with the angle adjuster 2008 rotated and locked in a first position so that the horizontal portion 2004 of the frame 2000 is substantially flush with the vehicle seat 2010a. In the first position of the adjuster 2008 shown in FIG. 28A, a majority of the adjuster 2008 is disposed forward of axis A-A and the vertical portion 2003 of the frame 2000. FIG. 28B shows the frame 2000 is adjusted to fit in a vehicle where the angle between a seatback 2010b' and a seat 2010a' is larger than the angle between the seatback 2010b and the seat 2010a in FIG. 28A. In order for the horizontal portion 2004 of the frame 2000 to lie substantially flush with the vehicle seat 2010a' in FIG. 28B, the adjuster 2008 is rotated and locked into a second position in which a majority of the adjuster 2008 is disposed between the seatback 2010b' and the vertical portion 2003 of the frame 2000 (i.e., behind axis A-A).

It will be appreciated that although the adjuster 2008 is shown being connected to the vertical portion 2003 of the frame 2000, it may alternatively be connected to the horizontal portion 2004 of the frame 2000, such as at a front end thereof. Adjustments to such a horizontally mounted adjuster can adjust the angle between the vertical portion 2003 and the vehicle seatback 2010a.

FIG. 29A shows an exploded isometric view of the adjuster 2008 shown in FIGS. 27A to 28B. As shown in FIG. 29A, a locking arrangement 2200 may be mounted to the frame to lock the adjuster 2008 in a position relative to axis A-A. The locking arrangement may include at least one sprocketed hub 2201 that is configured for selective axial movement along axis A-A to engage or disengage a mating sprocketed circumferential surface 2008a defined in the side(s) of the adjuster 2008. The hub 2201 may have a handle 2201a to be grasped by a user to slide the hub 2201 for selective engagement or disengagement. As shown in FIG. 29A, the hub 2201 is disengaged from the surface 2008a of the adjuster 2008 so that the adjuster may be eccentrically rotated about axis A-A. When the adjuster 2008 is rotated into a position about axis A-A so that the horizontal portion 2004 of the frame 2000 is substantially flush with the vehicle seat 2010b, the user may selectively slide the hub 2201 into engagement with the surface 2008a of the adjuster 2008 to lock the adjuster 2008 into its adjusted position. The hub 2201 may be spring loaded such that the axial movement of the hub 2201 may be biased toward the engaged or locked position so that once the handle 2201a is released by a user, the hub 2201 will be spring loaded to engage the surface 2008a of the adjuster 2008 to automatically lock the adjuster 2008 in a position about axis A-A. Also, as shown in FIG. 29B, there may be hubs 2201 and surfaces 2008a on both sides of the adjuster 2008, which may provide additional resistance against rotation of the adjuster 2008 when it is locked in position.

Also, FIG. 29B shows tether strap 2009 wound as a spool in a retracted position about a retractor 2014 that is partially housed by the adjuster 2008. More specifically, the retractor is located in an annular groove formed in the adjuster 2008. The retractor 2014 may be embodied as a locking retractor and may be configured to exert a constant tension on the tether strap 2009 when it is extended and connected to a tether anchor of the vehicle, when the frame 2000 is installed in a vehicle. Alternatively, the retractor 2014 may be a non-locking retractor or simply a wound spool.

The frame 2000 may be collapsible or foldable, such as for ease of storage and travel. For example, FIG. 30A is an isometric view of the car seat mounting frame 2000 shown in a first, fully opened configuration and FIG. 30B is a view of the car seat mounting frame 2000 reconfigured in a second, fully closed or folded configuration. The frame 2000 may have one or more hinged latches 2030 to selectively control the reconfiguration of the frame 2000 between its open and closed configurations. The latches 2030 are configured to disengage a retaining mechanism (not shown) for retaining the frame 2000 in the open and/or closed positions. The latch(es) 2030 may have a user-actuated button 2030a, as shown in FIG. 30A, to disengage the retaining mechanism. As shown in FIG. 30A, two latches 2030 are provided on opposite lateral sides of the vertical portion 2003 of the frame 2000. The buttons 2030a of the latches 2030 may be depressed by a user to disengage the aforementioned retaining mechanism that retains the vertical portion 2003 in its upright position shown in FIG. 30A. Once the latches 2030 are depressed, the vertical portion 2003 is permitted to be reconfigured to its closed configuration by raising the vertical portion 2003 in the direction of arrows A until a stop 2030b of the vertical portion 2003 engages an upper end of a slot 2030c, and then rotating (folding) the vertical portion 2003 about the stop 2030b towards the horizontal portion 2004 in the direction of arrow B so that the frame 2000 assumes the second, closed configuration illustrated in FIG. 30B.

In the closed configuration, the adjuster 2008 may be in contact with a surface 2006a of the cover 2006. To reconfigure the frame 2000 from the closed configuration to the open configuration, a user may reverse the steps for closing the frame, i.e., rotating the vertical portion 2003 in a direction opposite arrow B and then lowering the vertical portion 2003 in a direction opposite arrows A until the latches 2030 engage the retaining mechanism.

When in the closed configuration, the frame 2000 may be retained in the closed configuration by a releaseable strap, clip, or other releaseable means (not shown) connecting the vertical portion 2003 and the horizontal portion 2004 in fixed relative position. Alternatively, in one embodiment, the latch(es) 2030 may also be configured to automatically re-engage the retaining mechanism when the frame 2000 is in the closed configuration to prevent inadvertent opening of the frame 2000. In such an embodiment, to reconfigure the frame 2000 from the closed configuration shown in FIG. 30B to the open configuration shown in FIG. 30A, the latches 2030 may be actuated again, such as by depressing buttons 2030a to disengage the retaining mechanism, so that the vertical portion 2003 may be rotated and lowered as described above.

The frame 2000 may be configured to be connected to a vehicle seat either by mini-connectors 2007 or by vehicle seatbelt straps (not shown) that are part of the vehicle. Vehicle seatbelt straps may be used for the connection of the frame 2000 in vehicles that do not have LATCH anchors. As shown in FIG. 31, the frame cover 2006 defines a vehicle seatbelt pathway 2017 that is configured to receive and route a lap belt of a vehicle seatbelt (not shown) horizontally across the frame cover 2006. Access to the pathway 2017 may be provided by selectively positioning a lap belt clamp 2016, which is pivotally coupled to the frame 2000. When the connectors 2007 are to be used, the lap belt clamp 2016 is positioned in a stowed configuration that partially blocks access to the pathway 2017, as shown in FIG. 27A, for example. When the connectors 2007 are not used, the lap belt clamp 2016 may be rotated away from the horizontal base 2004, as shown in FIG. 31, to permit entry and positioning of the lap belt across the pathway 2017. After the lap belt is connected to the vehicle's corresponding seatbelt connector and the belt is positioned horizontally in the pathway 2017, the lap belt clamp 2016 may be rotated down onto the lap belt in the pathway 2017 to aid in retaining the lap belt in the lap belt pathway 2017. When the car seat 2020 is connected to the frame 2000, the car seat 2020 prevents the lamp belt clamp 2016 from opening. Otherwise, when the car seat 2020 is not connected to the frame 2000, the lap belt clamp 2016 may be opened.

FIGS. 32A to 32D show the frame 2000, or portions thereof, with the cover 2006 (e.g., FIG. 31) removed for ease of illustrating a latch mechanism 2031, the details of which are described in further detail below.

As shown in FIG. 32B, the latch mechanism 2031 includes a rear latch 2001a, a front latch 2001b, and a linkage 2032, which operatively couples the rear latch 2001a to the front latch 2001b so that those latches operate in unison. The front latch 2001b is pivotally connected to a front bracket 2035 by an axle 2041. The front bracket 2035 is fixedly connected to the horizontal portion 2004 of the frame 2000. The rear latch 2001a is pivotally connected to a rear bracket 2034 by an axle 2040. The bracket 2034 is fixedly connected to the horizontal portion 2004 of the frame 2000. The linkage 2032, and thus the front and rear latches 2001b and 2001a, are biased by a spring 2039, which is also connected to the horizontal portion 2004 of the frame 2000. The front and rear latches 2001b and 2001a are configured to connect to features on the underside of a car seat, such as car seat 2020. In that regard, the bottom of the car seat 2020 may have the same configuration to that shown in FIG. 5, such that the car seat 2020 may have a rear bar 20k and a front bar 20r, as described above. For such a configuration, therefore, the front latch 2001b is configured to selectively couple to a front bar 20r on the bottom of the car seat 2020 and the rear latch 2001a is configured to selectively couple to a rear bar 20k on the bottom of the car seat 2020. The front and rear latches 2001b and 2001a are configured to connect to the respective front and rear bars 20r and 20k of the car seat 2020 when the car seat 2020 is moved vertically downward (i.e., in a direction substantially perpendicular to the horizontal base 2004) onto those latches 2001b and 2001a, as will be described in greater detail below.

Figure 32A:
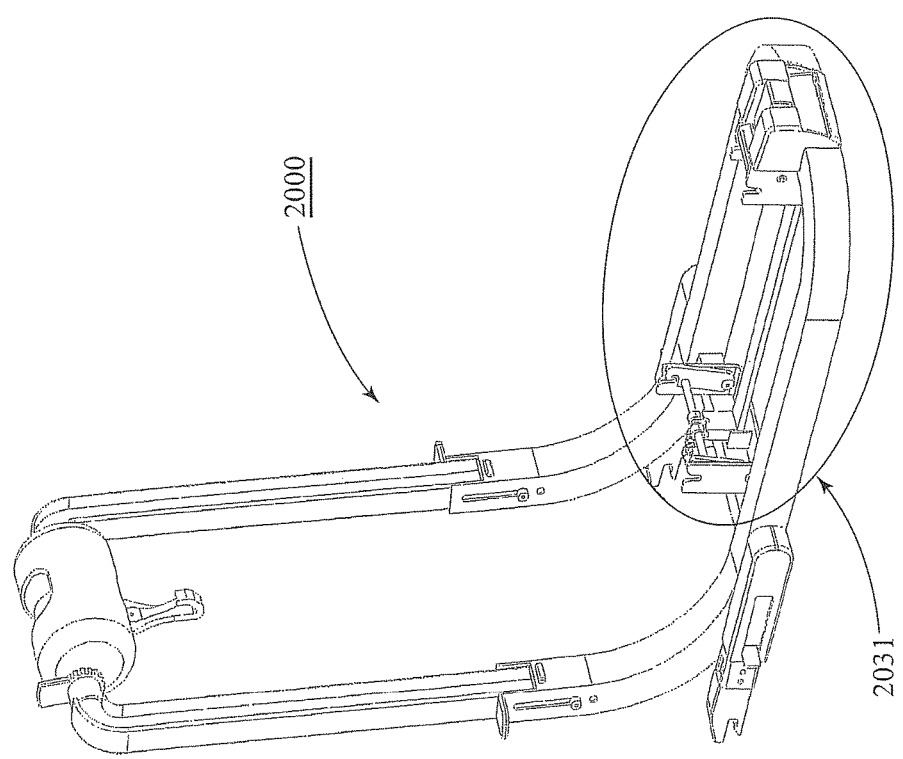
FIG. 32A is an isometric view of the car seat mounting frame of FIG. 27A with a cover thereof removed to show details of a latch mechanism.

The latches 2001a and 2001b are operatively coupled to a plurality of handles 2033 and 2053, which are configured to selectively actuate (i.e., rotate) the latches 2001a and 2001b in unison from a closed position shown in FIG. 32B to an open configuration shown in FIG. 32A. For example, when the car seat 2020 is connected to the latch mechanism 2031, the latches 2001a and 2001b may be opened (and the car seat 2020 may be subsequently released from the frame 2000) by pushing down on the upper handle 2033 and pulling up on the lower handle 2053 at the front end of the horizontal portion 2004 of the frame 2000, as will be described in greater detail below. When the latches 2001a and 2001b are opened, the car seat 2020 may be lifted vertically upwards (i.e., in a direction substantially perpendicular to the horizontal base 2004) away from the horizontal base 2004 of the frame 2000. Actuating the release mechanism 2031 with both handles 2033 and 2053 may provide protection from inadvertent release of the latches 2001a and 2001b and separation of the car seat 2020 from the frame 2000 in the event of some types of damage to the release mechanism 2031, specifically damage to the spring 2039, which potentially could occur in the event of a vehicle crash. In the embodiment described herein, the handles 2033 and 2053 are configured to move substantially in the vertical direction up and down, which is substantially perpendicular to the side-to-side motion of the latches 2001a, 2001b, and linkage 2032. This additionally protects (isolates) the release mechanism 2031 from an inadvertent release in case of damage to the 2031 mechanism by requiring movements of a plurality of handles (2033 and 2053) in directions that are substantially transverse (vertical direction) to the opening direction of movement (horizontal) of the latches 2001a and 2001b and the linkage 2032, which is a scenario that is not expected to occur during a vehicle crash event.

Figure 32C:
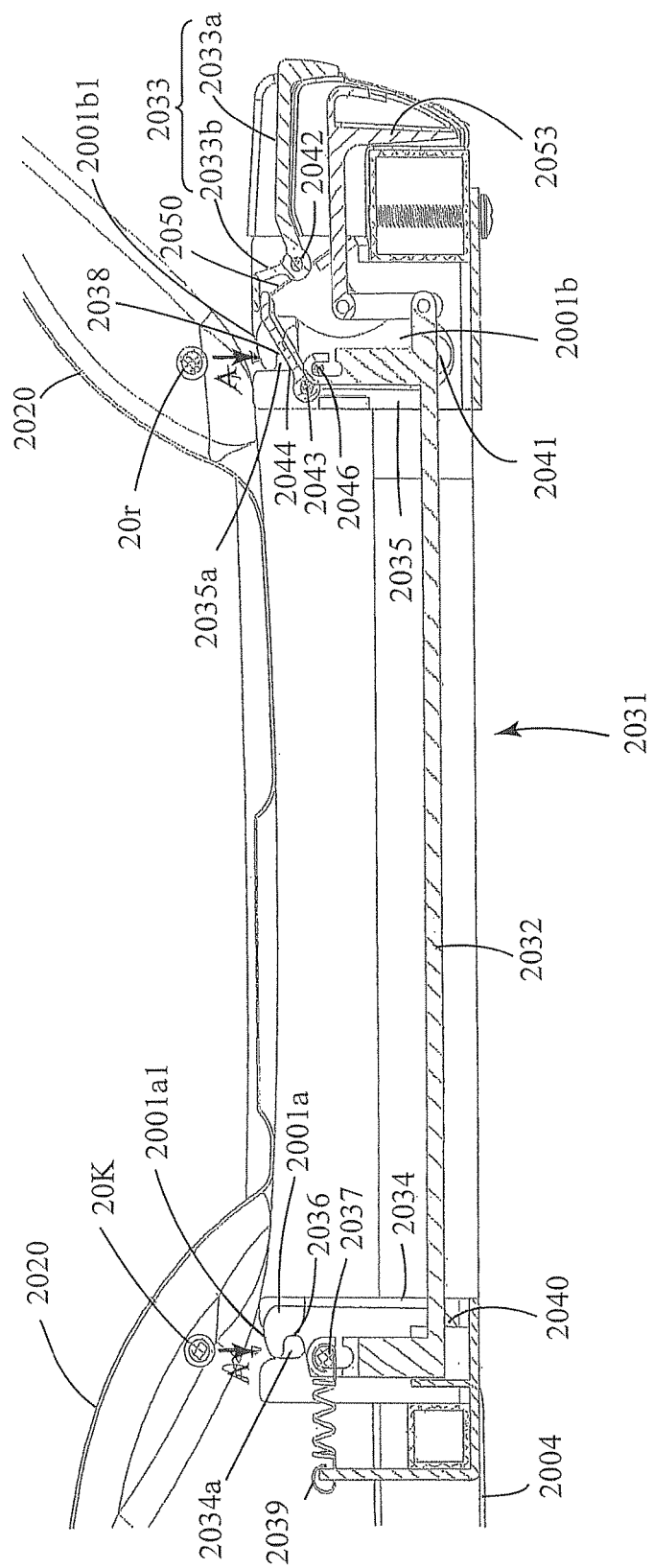
FIG. 32C is a side section view of the latch mechanism shown in FIG. 32B in the closed state viewed along section 32A-32A where a car seat is not connected to the latch mechanism.

FIGS. 32C-32G illustrate a sequence of steps of connecting and disconnecting the car seat 2020 with respect to a latch mechanism 2031 of the frame 2000. FIG. 32C shows the state of the latch mechanism 2031 when the car seat 2020 is disconnected from the frame 2000. In this configuration, the latches 2001a and 2001b are shown in their closed positions. As noted above, the front latch 2001b is configured to receive, capture, and release the front bar 20r of the car seat 2020. The front bracket 2035 defines a vertical slot 2035a that is configured to receive the front bar 20r. The front latch 2001b has an upper cam surface 2001b1, which in the position shown in FIG. 32C, is in a blocking position in the vertical slot 2035a. The front latch 2001b also defines a retaining slot 2038 that is oriented substantially transverse to the vertical slot 2035a. The front latch 2001b is connected to the linkage 2032 via a rod 2046 so that the front and rear latches 2001b and 2001a may move in unison. The front latch 2001b is configured to rotate from its closed position to an open position that does not block entry of the front bar 20r through the slot 2035 when the front bar 20r is lowered vertically on the cam surface 2001b1 of front latch 2001b.

Also shown in FIG. 32C is the upper handle 2033, which has a front portion 2033a and rear portion 2033b extending at an angle with respect to each other. The front latch 2001b has a notch 2045 (FIG. 32E) that selectively engages and disengages the rear portion 2033a of handle 2033, as described in greater detail herein below. The upper handle 2033 is configured to pivot about axle 2042. A spring 2050 biases the upper handle 2033 to the position shown in FIG. 32C. When the rear portion 2033a is disengaged from the notch 2045 (FIG. 32E) in the front latch 2001b, as shown in FIG. 32C, the front latch 2001b is free to rotate away from its closed position. However, it will be appreciated that when the rear portion 2033a of handle 2033 engages the notch 2045 (FIG. 32E) in the front latch 2001b, as is shown in FIG. 32E, the front latch 2001b is prevented from rotating away from its closed position.

A spring-biased lever 2044 is also pivotally connected to the bracket 2035 about axle 2043 and is configured to engage the rear portion 2033a of the upper handle 2033. The lever 2044 is spring biased to rotate upward in the counter-clockwise direction and engage the underside of the rear portion 2033a of the upper handle 2033, as shown in FIG. 32C. The upper handle 2033 is also spring biased to rotate in the counter-clockwise direction by spring 2050. However, when the lever 2044 is positioned as shown in FIG. 32C, the lever 2044 overcomes the spring force of spring 2050 to prevent the upper handle 2033, and more specifically, the rear portion 2033a, into engagement with the notch 2045 of front latch 2001b. Also, in the configuration shown in FIG. 32C, the lever 2044 crosses a plane defined by the vertical slot 2035a, such that the lever 2044 will contact the front bar 20r when it is received in the slot 2035a, as shown in FIG. 32D, and will cause the lever 2044 to rotate clockwise out of engagement with the rear portion 2033a of the upper handle 2033.

As shown in FIGS. 32B and 32C, the rear latch 2001a is connected to the linkage 2032 via a rod 2037. The linkage 2032 and the rod 2037 are connected to the spring 2039. The rear bracket 2034 defines vertical slots 2034a for receiving the rear bar 20k. The rear latch 2001a has an upper cam surface 2001a1 that blocks access to the vertical slot 2034. The rear latch 2001a defines a retaining slot 2036 that is oriented generally transverse to the vertical slot 2034a and is configured to receive and capture the rear bar 20k in the vertical slots 2034.

As shown in FIG. 32C, the latch mechanism 2031 is configured to receive the car seat 2020 in a vertical direction shown by the arrows A. Specifically, as noted above, the front latch 2001b is disengaged from the rear portion 2033b of the upper lever 2033 and is free to rotate. In view of the linkage 2032 between the latches 2001a and 2001b, the rear latch 2001a is also free to rotate in unison with the front latch 2001b.

Figure 32D:
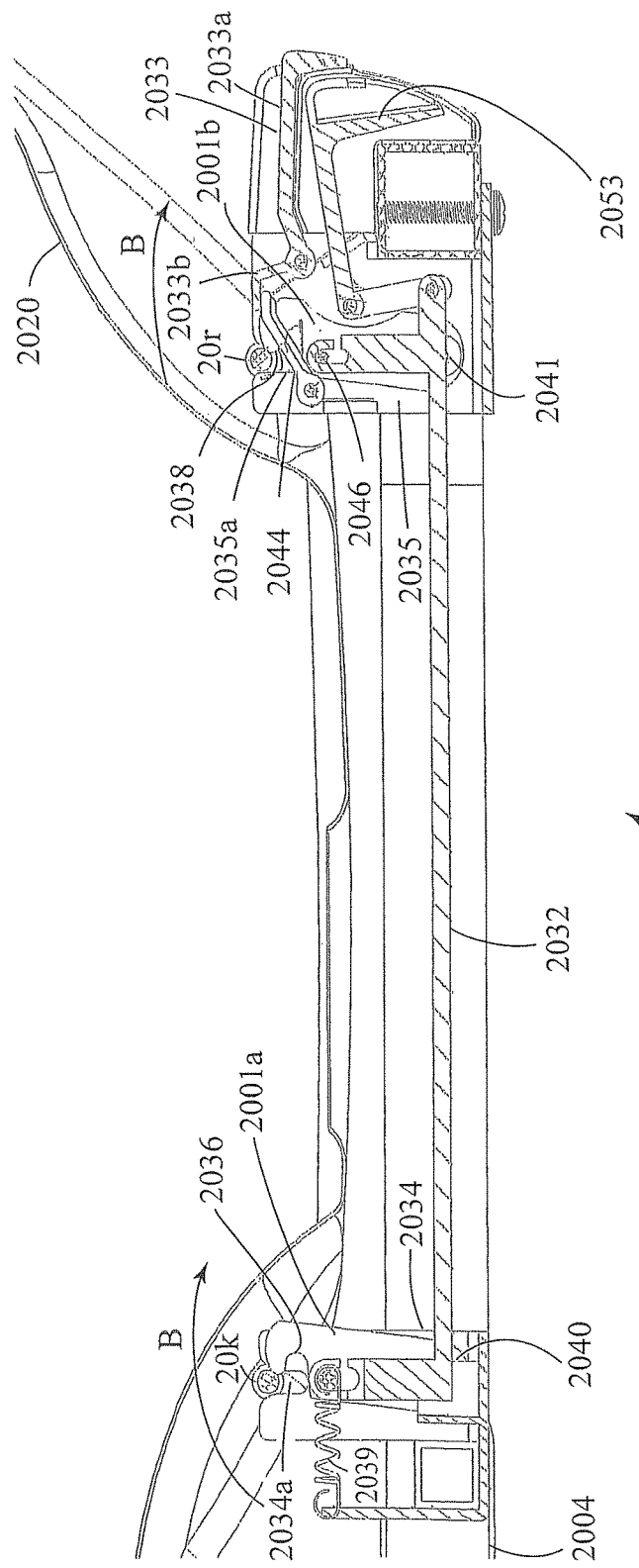
FIG. 32D is a section view of the latch mechanism showing the state of the latch mechanism when the car seat is initially lowered onto the latch mechanism.
Figure 32E:
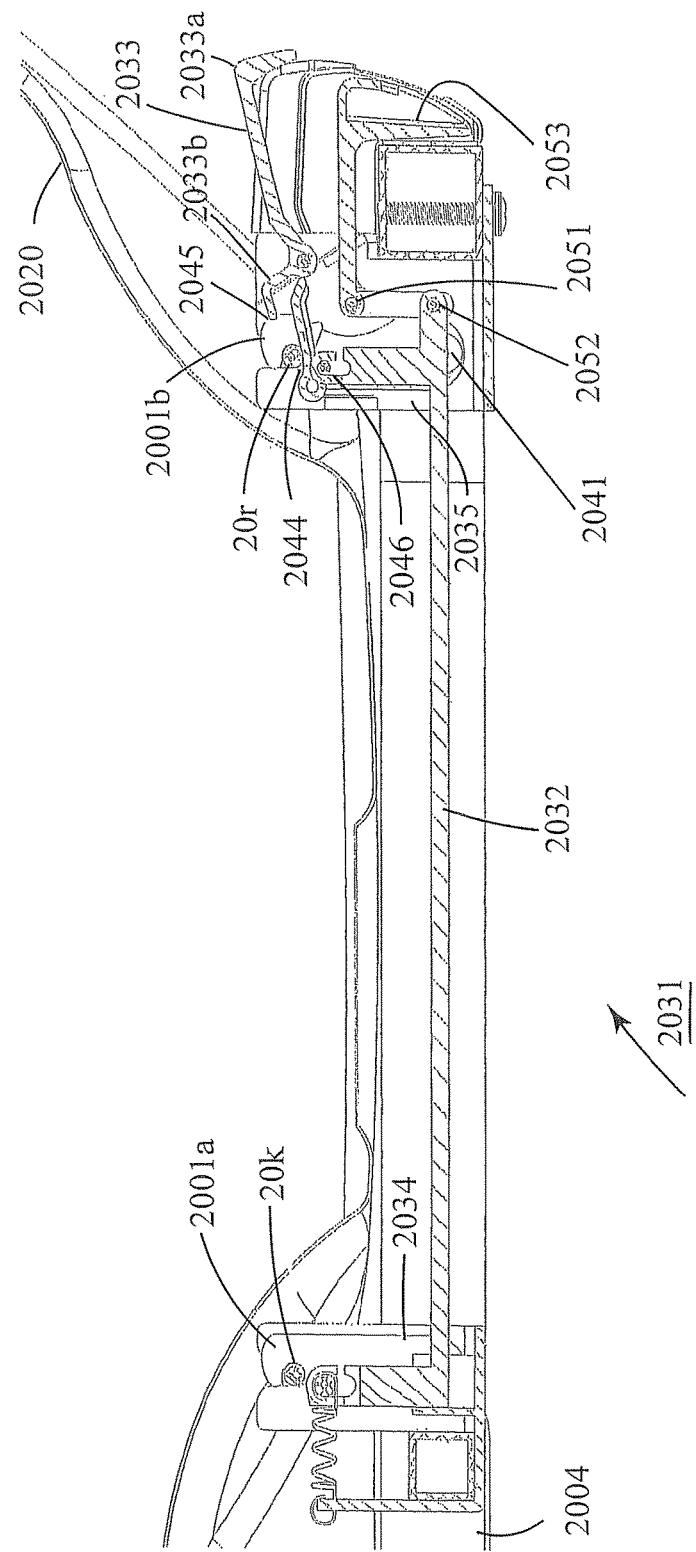
FIG. 32E is a section view of the latch mechanism showing the state of the latch mechanism when the car seat is lowered further down from the position shown in FIG. 32D and fully connected to the latch mechanism and the frame.

As shown in FIG. 32D, when the car seat 2020 is lowered vertically over the latches 2001a and 2001b, the rear bar 20k is lowered vertically to engage the cam surface 2001a1 of the rear latch 2001a and the front bar 20r is lowered vertically to engage the cam surface 2001b1 of the front latch 2001b so that the engagement causes the rear latch 2001a and front latch 2001b to rotate in the direction of arrow B to open the vertical slot 2034a for further passage of the rear bar 20k and to open the vertical slot 2035a for further passage of the front bar 20r. Also, when the front bar 20r pushes on the front latch 2001b, the front latch 2001b rotates out of its blocking position so that the front bar 20r is free to move further downward in the vertical slot 2035a.

When the rear bar 20k is lowered from its position shown in FIG. 32D, it passes into the retaining slot 2036 of the rear latch 2001a, at which point the spring biased rear latch 2001a rotates back across the vertical slot 2034a in a direction opposite the arrow B so that the rear bar 20k becomes captured between retaining slot 2036 and vertical slot 2034 to prevent vertical removal of the rear bar 20k, as shown in FIG. 32E. Also, as the front bar 20r is lowered from its position shown in FIG. 32D, it contacts the lever 2044 and causes it to rotate clockwise out of engagement with the rear end 2033 of the upper handle 2033. Then, as the bar 20r moves further downward in the vertical slot 2035a, the front bar 20r is received in the retaining slot 2038, at which point the spring biased latch 2001b rotates across the vertical slot 2035a in a direction opposite arrow B to capture the front bar 20r between the retaining slot 2038 and the vertical slot 2035a, as shown in FIG. 32E. While the movements of the latches 2001a and 2001b are described separately, it will be appreciated that both latches move in unison so that the closing of the latches occur substantially simultaneously.

When the lever 2044 is disengaged from the rear portion 2033a of the upper handle 2033, the spring-biased upper handle 2033 is free to rotate counter-clockwise from the position shown in FIG. 32D to the position shown in FIG. 32E, in which the rear portion 2033a engages the notch 2045 in the front latch 2001b, thereby limiting the rotation of the front latch 2001b. Thus, FIG. 32E shows the state of the latch mechanism 2031 when the car seat 2020 is fully connected to the frame 2000.

As shown in FIG. 32E, when the car seat 2020 is connected to the frame 2000, the upper handle 2033 is positioned in a raised position, while the lower handle 2053 is positioned in a lowered position. The lower handle 2053 is pivotally connected to the front bracket 2035 by axle 2051. The lower handle 2053 is also pivotally connected to the linkage 2032 by axle 2052.

The upper and lower handles 2033 and 2053 are both actuated to release the car seat 2020 from the latch mechanism 2031. As noted above, when the car seat 2020 is attached to the frame 2000, the front latch 2001b is locked in its closed position and cannot rotate about axle 2014 because the rear portion 2033a of the upper handle 2033 is engaged in the notch 2045. Moreover, as noted above, the front and rear latches 2001b and 2001a are configured to move in unison due to their fixed coupling by linkage 2032. Thus, the locking of the front latch 2001b also locks the rear latch 2001a in its closed position.

Figure 32F:
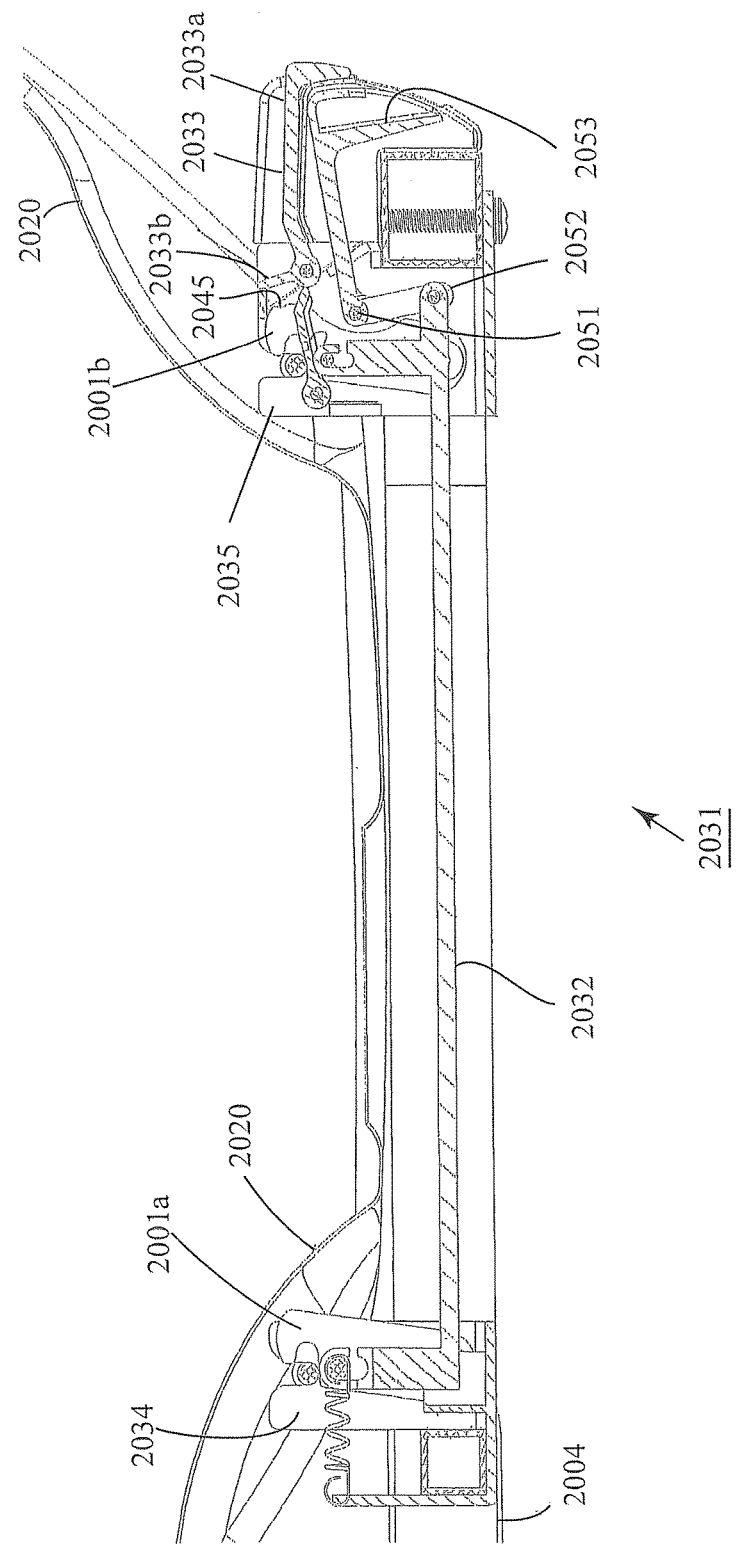
FIG. 32F is a section view of the latch mechanism showing the state of the latch mechanism when handles of the latch mechanism are actuated to open the latches.

To unlock the front latch 2001b, and thereby unlock the rear latch 2001a via the linkage 2032, the upper handle 2033 may be rotated clockwise (i.e., downward), as shown in FIG. 32F, so that the rear portion 2033a disengages from notch 2045 of the front latch 2011b. When the latches 2001a and 2001b are unlocked, the lower handle 2053 may be rotated counter-clockwise (i.e., upwardly) about axle 2051 to rotate the latches 2001a and 2001b into their open positions. Specifically, when the lower handle 2053 is rotated upwardly about axle 2051, the lower handle 2053 causes linkage 2032 to move forward, away from the rear bracket 2034, thereby causing both the front and rear latches 2001b and 2001a to rotate in unison to their open positions, as shown in FIG. 32F.

When the latches 2001a and 2001b are in their open positions, the car seat 2020 may be lifted vertically upward and separated from the frame 2000, as shown in FIG. 32G. As the car seat 2020 is lifted vertically, the front bar 20r will be lifted off of the lever 2044, which will rotate upward about axle 2043 as shown in FIG. 32G. Once the car seat 2020 is separated from the frame 2000, the latch mechanism 2031 will return to the state shown in FIG. 32C.

Figure 33A:
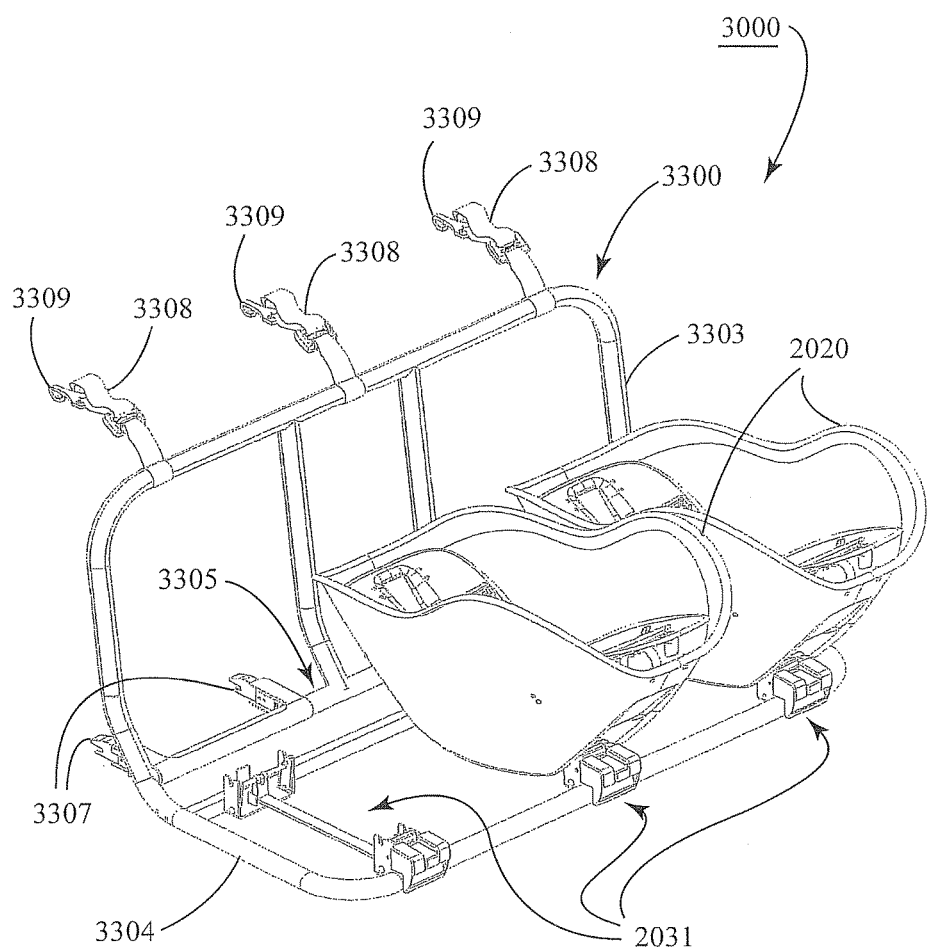
FIG. 33A shows an embodiment of a car seat mounting system having a frame configured to attach to a plurality of car seats.

FIG. 33A shows an embodiment of a car seat mounting system 3000 for multiple car seats, such as the aforementioned car seat 2020. As shown in FIG. 33A, a single frame 3300 is configured having a plurality of latch mechanisms 2031, described above, each of which is configured to removably connect to a corresponding car seat 2020, two of which are shown in FIG. 33A. In the embodiment shown in FIG. 33A, the frame 3300 is configured to connect to up to three car seats arranged laterally side-by-side. The frame 3300 has a vertical portion 3303 and a horizontal portion 3304 that are connected to a lateral frame member 3305, which may fix the angle between the vertical portion 3303 and the horizontal portion 3304. Such fixed angle may be about 97 degrees, for example.

The frame 3300 has a plurality of mini-connectors 3307 extending from the lateral frame member 3305. Specifically, in the embodiment shown in FIG. 33A, the frame 3300 is provided with four connectors 3307 arranged symmetrically across the frame 3300 (two connectors are visible in FIG. 33A and two are obscured by the two car seats 2020 shown therein). The two visible connectors 3307 shown in FIG. 33A are spaced about 11 inches apart, which is a standard spacing in vehicles having LATCH anchors. While four connectors 3307 may be provided, in other embodiments, the frame 3300 may be provided with fewer than four connectors, such as only two connectors (e.g., one connector at each end of the lateral frame member 3305). The frame 3300 also has at least one adjustable tether strap 3308 and tether connector 3309 for securing the vertical portion 3303 of the frame 3300 to the vehicle (not shown in FIG. 33A). Three tether strap 3308/connector 3309 pairs are shown in the example shown in FIG. 33A, although fewer pairs may be provided or used (depending upon the configuration of the vehicle the frame 3300 is installed).

In the embodiment of the frame 3300 shown in FIG. 33A, the vertical portion 3303 is a unitary assembly that is laterally coextensive with the horizontal portion 3304 of the frame 3300. An alternative embodiment to the construction of the frame 3300 is shown in FIG. 33B. Also, other embodiments of frames are shown in FIGS. 34A and 34B in which alternate constructions of the vertical portion 3303 of the frame 3300 are embodied.

FIG. 33B shows a frame 3300' that differs from frame 3300 in that the lateral frame dimension is adjustable to accommodate vehicles having differing seat widths. Those elements that differ from the embodiment in FIG. 33A are appended with a "'". The vertical portion 3303', lateral frame member 3305', and horizontal portion 3304' may be separable along a plane denoted by broken line A-A in FIG. 33B. The vertical portion 3303', lateral frame member 3305', and horizontal portion 3304' may be formed from tubular metal that may be dimensioned to be cut along line A-A and attached with tubular spacers 3310' that may connected between the cut ends of the frame 3300' to space the cut parts. In this way, adding such tubular spacers may increase the width of the frame and removing such spacers may decrease the width of the frame. Since the spacing between LATCH anchors is standardized at about 11 inches, adjusting the frame width may help align the pairs of connectors 3307 on each side of the frame, especially when the width of a center vehicle seat of various vehicles is variable among different models of vehicles.

Also, in another embodiment, the connectors 3307 may be laterally positionable relative to the lateral frame member 3305. For example, the lateral frame member 3305 may incorporate a rail or track or be connected to a rail or track which may permit the connectors to slide relative to the frame member 3305 so that the connectors 3307 may be positioned near anchor locations of the vehicle seat.

Figure 34A:
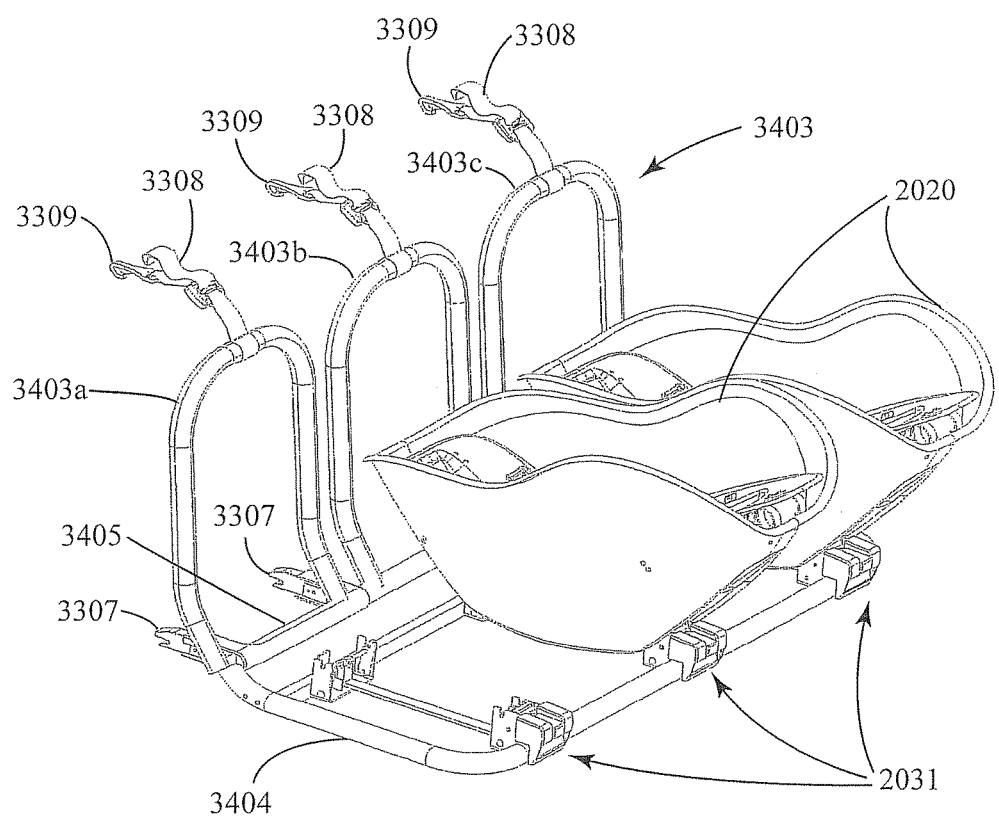
FIG. 34A shows another embodiment of a car seat mounting system having a frame configured to attach to a plurality of car seats.
Figure 34B:
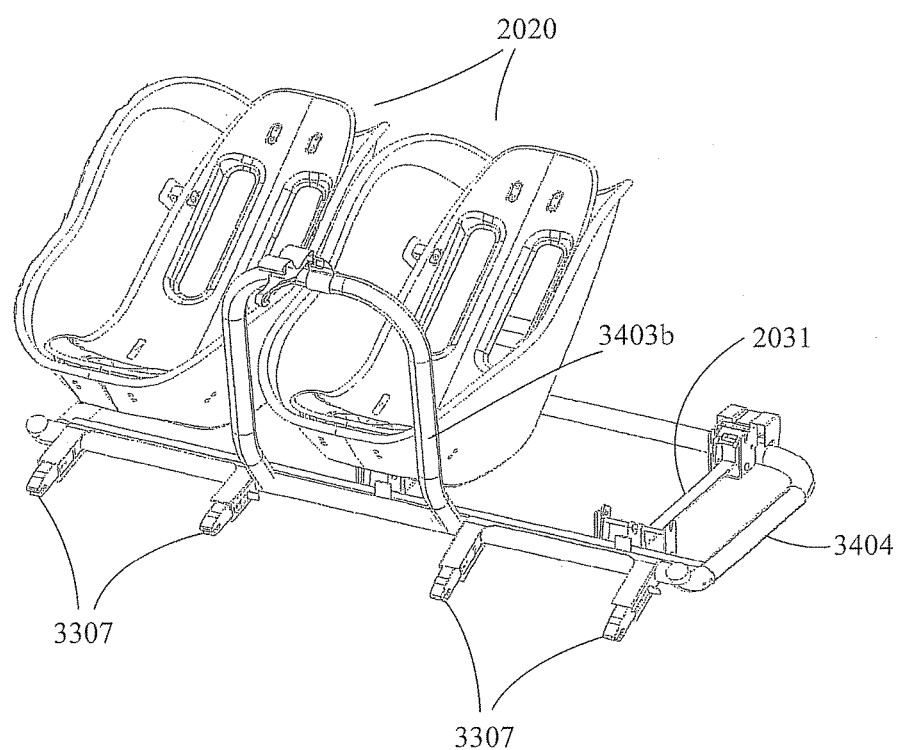
FIG. 34B shows an alternative embodiment of the car seat mounting system of FIG. 34A.

FIG. 34A shows a frame 3400 which has a vertical portion 3403 and a horizontal portion 3404 joined by a lateral frame member 3405. The horizontal portion 3404 is shown having the same configuration as the horizontal portion 3303 in FIG. 33A. However, the vertical portion 3403 is different from the vertical portion 3303 in FIG. 33A. Specifically, in the embodiment shown in FIG. 34A, the vertical portion 3404 includes three detachable frame members 3403a, 3403b, and 3403c, which are configured to attach to the lateral frame member 3405 at their ends of the frame members 3403a, 3403b, and 3403c. While the three frame members 3403a, 3403b, and 3403c are shown connected to the lateral frame member 3405 in FIG. 34A, it will be appreciated that fewer than three frame members may be connected. For example, in one embodiment, central frame member 3403b may be omitted leaving only side frame members 3403a and 3403c. In yet another embodiment, shown in FIG. 34B, side frame members 3403a and 3403c may be omitted leaving only central frame member 3403b connected.

Figure 35A:
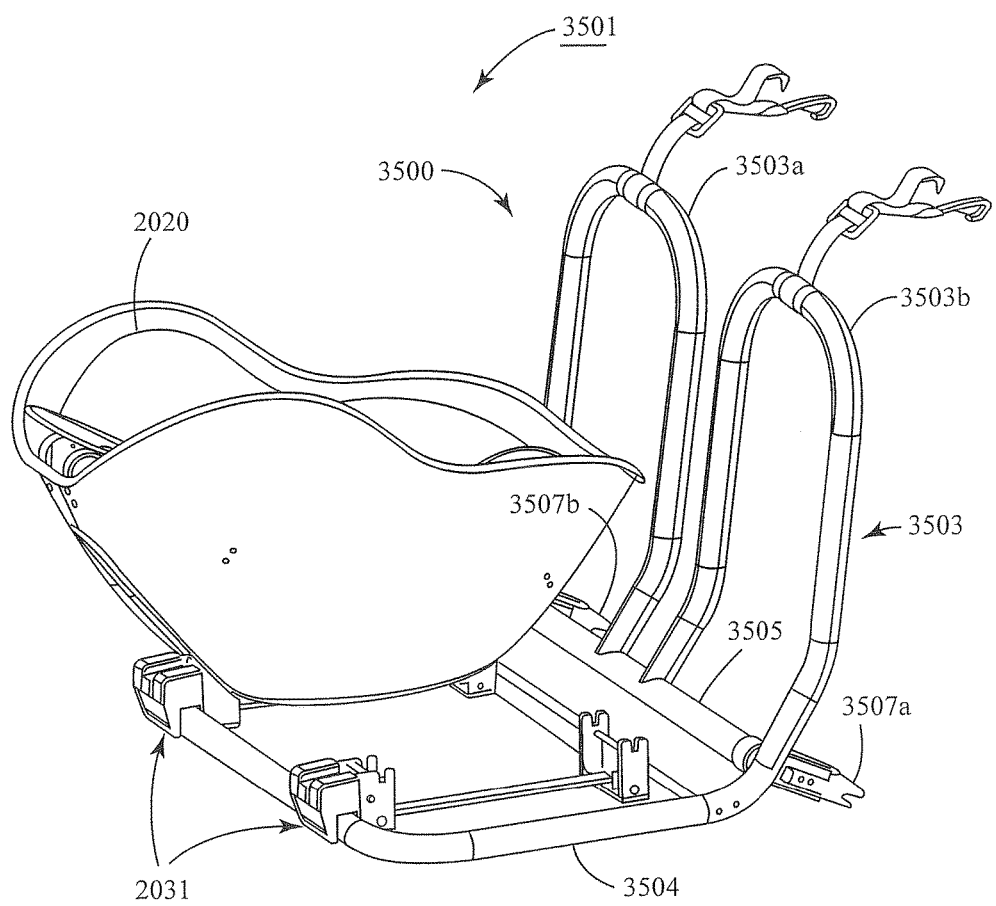
FIG. 35A shows another embodiment of a car seat mounting system having a frame configured to attach to a plurality of car seats.

FIG. 35A shows yet another embodiment of a car seat system 3501 that includes a car seat mounting frame 3500 and a plurality of car seats 2020 (only one car seat 2020 is shown in FIG. 35 for simplicity of illustration). The frame 3500 is constructed similarly to frame 3400 in FIG. 34A. However, the lateral dimension of the frame 3500 is reduced in comparison to that of frame 3400 for supporting only up to two car seats 2020, rather than three. Specifically, the frame 3500 has a vertical portion 3503 and a horizontal portion 3504 that are joined together by a lateral frame member 3505, which joins the vertical and horizontal portions 3503 and 3504 at a fixed angle, such as 97 degrees. The horizontal portion 3504 includes latch mechanisms 2031 for removably connecting the car seats 2020 to the frame 3500. The vertical portion 3504 of the frame 3500 includes two frame members 3503a and 3503b which are constructed like the frame members 3403a, 3403b, and 3403c in FIG. 34A.

As shown in FIG. 35A, mini-connectors 3507a and 3507b extend from the ends of the lateral frame member 3505. This arrangement may be useful in vehicles that have LATCH anchors dedicated for a center seat. Alternatively, in one embodiment, connector 3507b may be spaced about 11 inches from connector 3507a on lateral frame member 3505 so that both connectors 3507a and 3507b may be connected to a set of corresponding anchors in a vehicle that does not have dedicated center anchors.

Figure 35B:
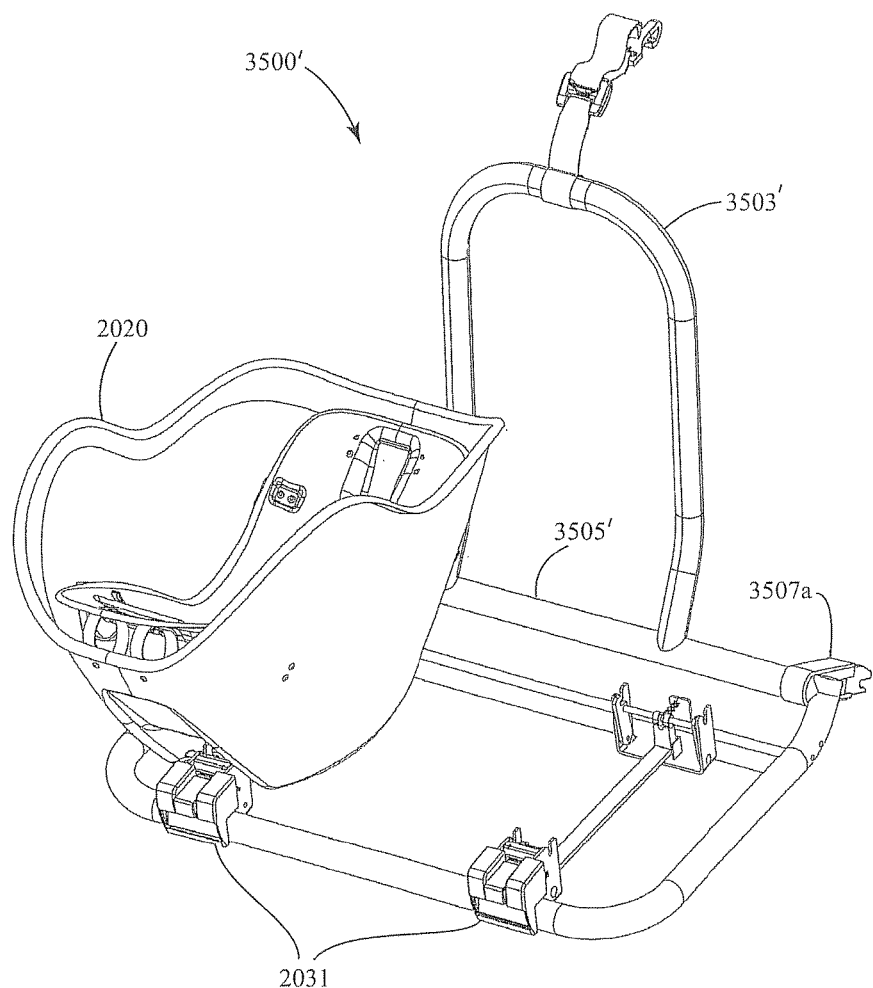
FIG. 35B shows an alternative embodiment of the car seat mounting system of FIG. 35A.

FIG. 35B shows an alternate configuration of the lateral frame member 3505 and frame members 3503a and 3503b of the frame 3500. Specifically, in FIG. 35B, the frame 3500' differs from frame 3500 of FIG. 35A in that the vertical portion 3503' of FIG. 35B is formed as a single frame member instead of the two frame members 3503a and 3503b of FIG. 35A. Although not shown in FIGS. 33 to 35B, the frames 3300, 3400, 3500, and 3500' may incorporate any of the frame angle adjustment arrangements described herein to adjust the orientation of those frames relative to a vehicle seat to which they are connected.

Figure 36A:
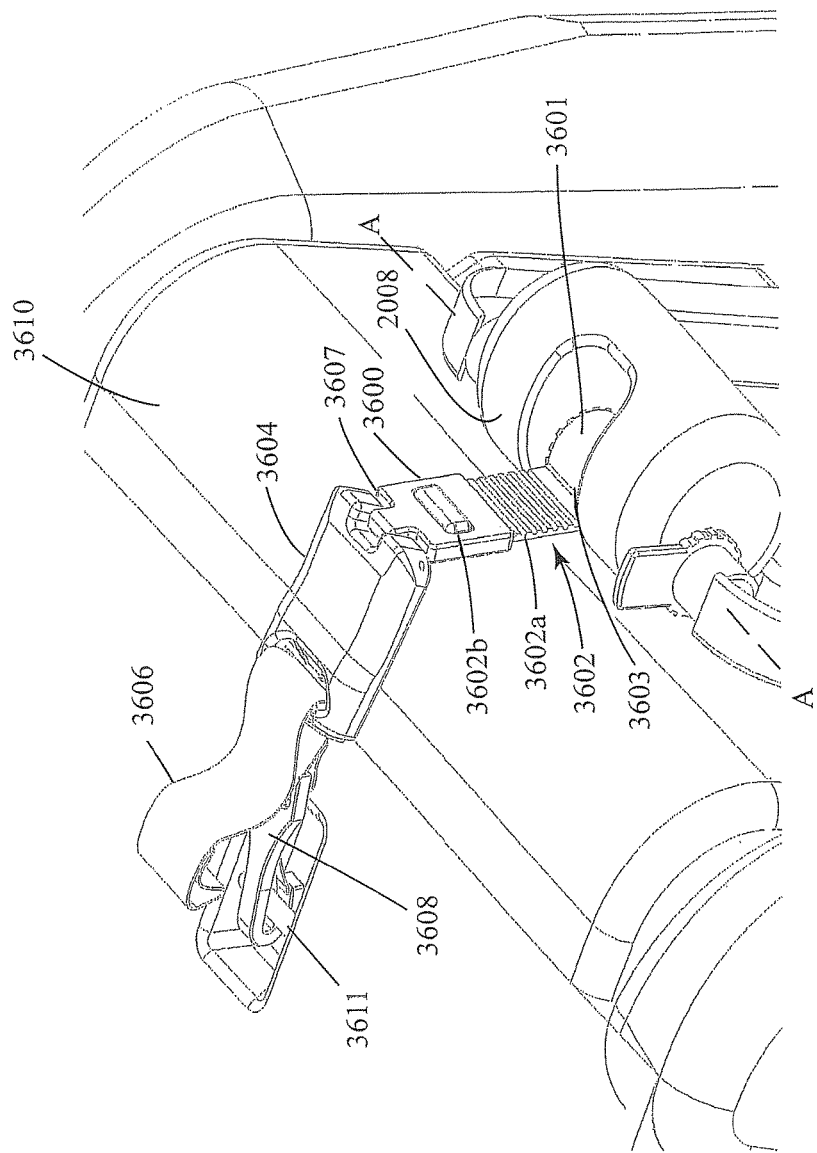
FIGS. 36A and 36B show an embodiment of a rigid tether connector.
Figure 36B:
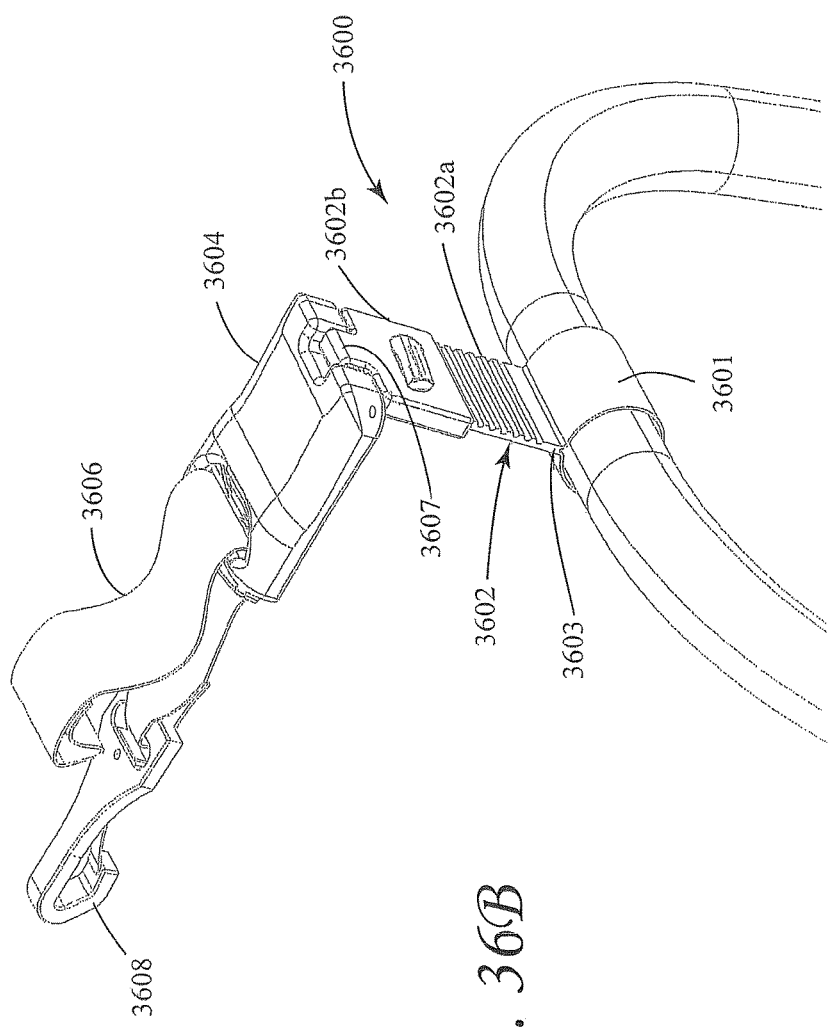

FIGS. 36A and 36B illustrate two embodiments of a rigid tether attachment. FIG. 36A shows a rigid tether attachment 3600 that may be used with the angle adjuster 2008, described above. For example, the rigid tether attachment 3600 may be substituted for the tether strap coil 2009 described above with respect to FIG. 29B. The rigid tether attachment 3600 may be pivotally attached to the angle adjuster 2008, as shown in FIG. 36A. The rigid tether attachment 3600 includes a cuff 3601 surrounding an axial shaft (not shown) through angle adjuster 2008. The shaft and cuff 3601 extend along eccentric axis A-A of the angle adjuster 2008. The rigid tether attachment 3600 includes a rigid vertical portion 3602 that has an adjustable length (i.e., can adjust the vertical dimension in FIGS. 36A and 36B). The vertical portion 3602 has a grooved strap 3602a and a positionable length adjuster 3602b. By way of example only, the grooved strap 3602a may be made from a rigid plastic or from metal. The vertical portion 3602 extends from a first end 3603 at the cuff 3601 to a hinged second end 3607 at the length adjuster 3602b. The length adjuster 3602b is configured to selectively engage and disengage one or more grooves of the strap 3602a to position and lock the length adjuster 3602b anywhere along the length of the strap 3602a. The length adjuster 3602b may be configured with a push button for selectively engaging and disengaging the one or more grooves of the strap 3602a. For example, the adjuster 3602b may be adjusted to extend vertically relative to the strap 3602a so that the second hinged end 3607 is at or above a vehicle seatback 3610, as shown in FIG. 36A.

Also, the rigid tether attachment 3600 includes a buckle 3604 that is hingedly attached to the second end 3607 of the vertical portion 3602. An adjustable tether strap 3606 extends from the buckle 3604 and connects to a tether clip 3608 for connection to a vehicle tether anchor 3611.

FIG. 36B illustrates the rigid tether attachment 3600 attached to a vertical portion of a car seat frame, such as portions 3303, 3403, and 3503. Specifically, the cuff 3601 is shown wrapped around a horizontally oriented section of the portion of the car seat frame. The cuff 3601 is configured to rotate about the frame member it is wrapped around.

Figure 37A:
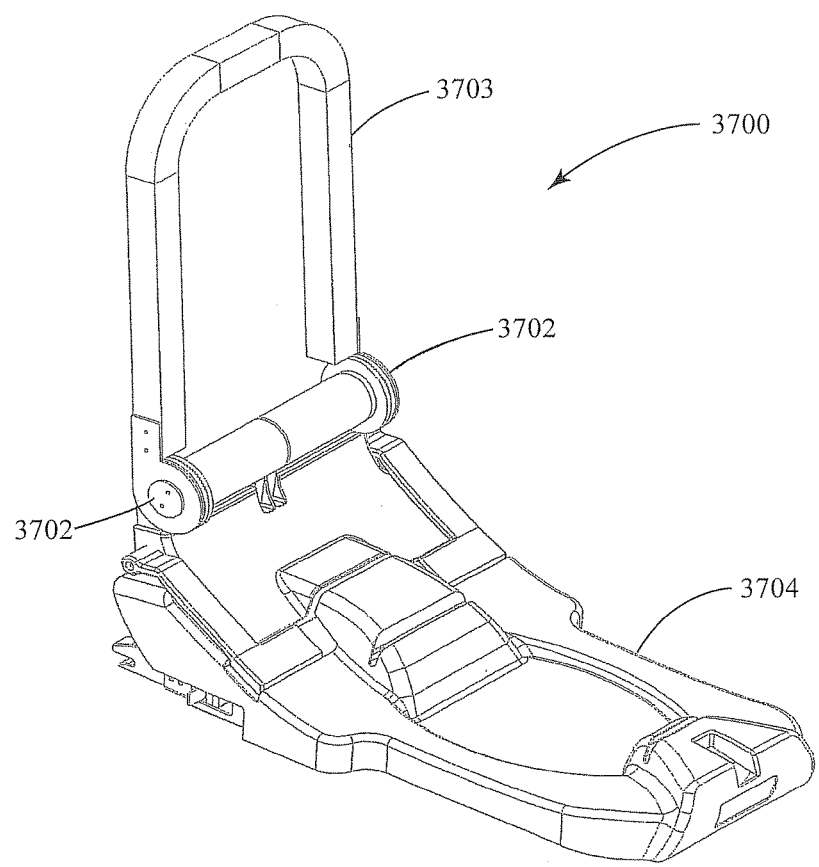
FIG. 37A shows an embodiment of a car seat mounting frame that includes a rosette hinge mechanism.
Figure 37B:
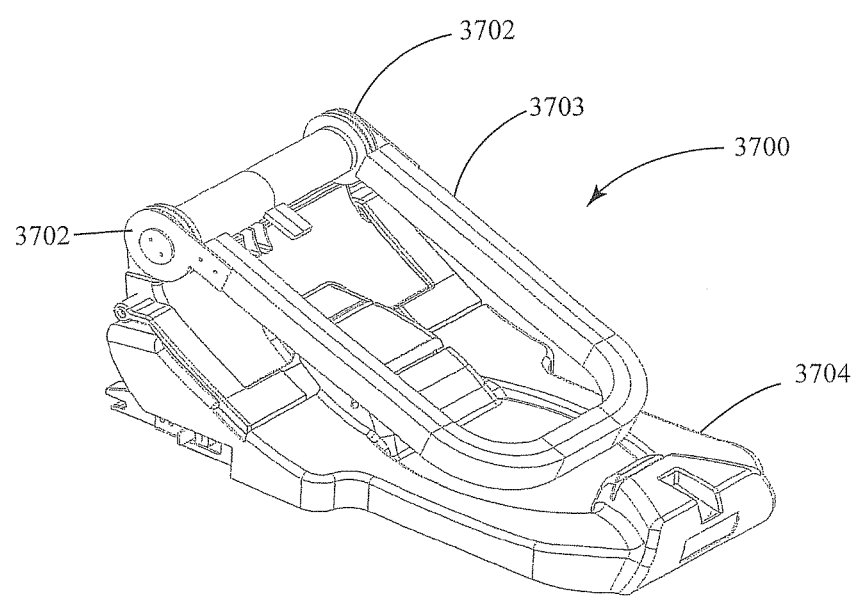
FIG. 37B shows the car seat mounting frame of FIG. 37A in a closed configuration.

FIGS. 37A-37C illustrate another embodiment of a car seat mounting frame 3700, which is configured to connect to a car seat, such as car seat 2020, described above. The frame 3700 is the same as frame 2000, with the exception that the frame 3700 incorporates a different vertical portion 3703. Specifically, the vertical portion 3703 incorporates pairs of rosette gears ("rosettes") 3702, which may be used to adjust the angle of the vertical portion relative to horizontal portion 3704. The angle adjustment provided by the rosettes 3702 may be used in place of the adjuster 2008, described above, to adjust the angle of the vertical portion 3703 relative to the vehicle seatback. Also, the angle adjustment provided by the rosettes 3702 may be used in place of the latches 2030 to close the frame 3700, such as shown in FIG. 37B.

FIG. 37C shows a partial cutaway section of a folding mechanism 3704 that includes the rosettes 3702. The mechanism 3704 includes a pair of handles 3706, which are shown in their locked positions. The handles 3706 are connected to cylindrical members 3708 that are configured to rotate about axis A-A. The cylindrical members 3708 each have an outer screw-threaded hub 3708a that is in mated engagement with threads of a screw 3710 fixed to outer rosettes 3702a and the vertical frame member 3703. Inner rosettes 3702b are disposed between the hubs 3708a and the outer rosettes 3702a. The inner rosettes 3702b have teeth which are configured to engage with teeth of the outer rosettes 3702a. The teeth of the outer and inner rosettes 3702a and 3702b remain engaged when lateral forces are applied along axis A-A to compress those rosettes together. Such lateral force is applied by rotating the handles into the locked position so that the hubs 3708a rotate relative to the screws 3710 and push the inner rosettes 3702b laterally outward along axis A-A into engagement with outer rosettes 3702a.

To adjust the angle between the vertical portion 3703 and the horizontal portion 3704 of the frame 3700, either to close the frame 3700 or to adjust the vertical portion 3703 relative to the vehicle seatback, the handles 3706 may be rotated counter-clockwise relative to axis A-A to reduce the axial force between the rosettes 3702a and 3702b. Specifically, when the handles are rotated counterclockwise, the hubs 3708a move axially inwardly due to the threads of screws 3710, thereby reducing the force exerted by the hubs 3708a against the inner rosettes 3702b. When the force exerted on the inner rosettes 3702b is sufficiently reduced, the teeth of the rosettes 3702a and 3702b may be disengaged by rotating the vertical portion 3703 of the frame 3700. Once the vertical portion 3703 is positioned as desired, it may be locked in place by rotating the handles 3706 back to their locked positions shown in FIGS. 37A and 37C.

The angle of adjustment of the vertical portion 3703 can be incrementally adjusted in increments based upon the angle of the teeth of the rosettes 3702. In one embodiment, the angle of the teeth is such that offsetting the teeth of the rosettes 3702a and 3702b by one tooth, rotates the vertical portion 3703 about 10 degrees about axis A-A.

There have been described and illustrated herein several embodiments of a car seat and car seat system. While particular embodiments of the invention have been described, it is not intended that the invention be limited thereto, as it is intended that the invention be as broad in scope as the art will allow and that the specification be read likewise. Thus, while particular shapes of the straps have been disclosed for the suspension system, it will be appreciated that other forms for the straps may be used as well. For example, the straps may have additional or other curvatures to those shown and may have more attachment points per strap. In addition, while particular types of strap and frame materials have been disclosed, it will be understood that other materials can be used. For example, the suspension system may be comprised of straps formed of at least one of metal, composite, and plastic, and which are rigid but deformable at at least a certain force, such as at a force of between 20 g to 100 g (measured as g-forces), for example. Also, each strap of the suspension system may be of the same or different material construction from the others. For example, the material construction of the straps may vary depending on their location in the car seat. Also, while bands are preferred for suspension elements for the car seats, it will be recognized that discontinuous strips may be used as well. Furthermore, while cylindrical members have been shown as forming the frame, it will be understood that other shapes can be similarly used. It will therefore be appreciated by those skilled in the art that yet other modifications could be made to the provided invention without deviating from its spirit and scope as claimed.

What is claimed is:

1. A child car seat for an occupant, comprising:
   a) an inner seat;
   b) an outer protective shell having a front wall, a back wall, and opposing side walls defining a space and extending around and protecting said inner seat, said outer protective shell configured to be connected to a vehicle; and
   c) a suspension system comprised of metal straps that couple and permit relative movement between said inner seat and said outer protective shell, said suspension system suspending said inner seat substantially within said space, wherein at least one metal strap is connected between said inner seat and said front wall of said outer protective shell, at least one metal strap is connected between said inner seat and said back wall of said outer protective shell, and at least one metal strap is connected between said inner seat and said opposing side walls of said outer protective shell.

2. The child car seat according to claim 1, wherein: said metal straps are formed as bands.

3. The child car seat according to claim 2, wherein: a first length of each band extends to an outer surface of said inner seat and a second length of each band extends to an inner surface of said outer protective shell.

4. The child car seat according to claim 1, wherein: said metal straps are formed of aluminum.

5. The child car seat according to claim 1, wherein: said outer protective shell is configured for coupling to a car seat mounting frame.

6. The child car seat according to claim 1, wherein: said suspension system is elastically and plastically deformable.

7. The child car seat according to claim 1, wherein: said at least one metal strap that is connected between said inner seat and said front wall of said outer protective shell extends from said inner seat to said front wall of said outer protective shell, said at least one metal strap that is connected between said inner seat and said back wall of said outer protective shell extends from said inner seat to said back wall of said outer protective shell, and said at least one metal strap that is connected between said inner seat and said opposing side walls of said outer protective shell extends from said inner seat to said opposing side walls of said outer protective shell.

8. A child car seat system comprising:
   a frame constructed to couple to a vehicle seat, said frame having a vertical portion that extends vertically upward substantially along a vehicle seatback, wherein said vertical portion extends at least half of the height of the vehicle seatback, and a horizontal portion extending from a lower end of said vertical portion at an angle with respect to said vertical portion, wherein said horizontal portion is constructed to extend along a vehicle seat when said frame is coupled to a vehicle; and a child car seat constructed to couple to said horizontal portion of said frame, wherein the frame is constructed to couple to one or more child car seats, and wherein:

said child car seat includes:
  a) an inner seat,
  b) an outer protective shell having a front wall, a back wall, and opposing side walls defining a space and extending around and protecting said inner seat, said outer protective shell configured to be connected to the vehicle, and
  c) a suspension system comprised of metal straps that couple and permit relative movement between said inner seat and said outer protective shell, said suspension system suspending said inner seat substantially within said space, wherein at least one metal strap is connected between said inner seat and said front wall of said outer protective shell, at least one metal strap is connected between said inner seat and said back wall of said outer protective shell, and at least one metal strap is connected between said inner seat and said opposing side walls of said outer protective shell.

9. The child car seat system according to claim 8, wherein: said vertical portion extends substantially along the entire height of said vehicle seatback.

10. The child car seat system according to claim 8, wherein: said angle is approximately 97 degrees.

11. The child car seat system according to claim 8, further comprising: a latch extending from said horizontal portion of said frame, said latch constructed to couple to said child car seat, said latch being coupled to a plurality of handles configured for actuation to selectively open said latch.

12. The child car seat system according to claim 11, wherein: said plurality of handles are configured for sequential actuation to selectively open said latch.

13. The child car seat system according to claim 11, wherein:
said plurality of handles are configured to move in a direction substantially transverse to a direction of said latch to selectively open said latch.

14. The child car seat system according to claim 8, further comprising: an angle adjustment member coupled to one of said vertical portion or said horizontal portion of said frame, said angle adjustment member constructed to adjust an angle between said frame and the vehicle seat.

15. The child car seat system according to claim 14, wherein: said adjustment member is pivotally coupled to one of said horizontal portion or said vertical portion and is constructed to rotate relative to said horizontal portion or said vertical portion to adjust the angle between said frame and the vehicle seat.

16. The child car seat system according to claim 15, wherein: said adjustment member is configured to rotate eccentrically about a respective member of said horizontal portion or said vertical portion to which the adjustment member is pivotally coupled.

17. The child car seat system according to claim 15, further comprising: a tether connector and tether strap extending from said angle adjuster.

18. The child car seat system according to claim 17, wherein: the angle adjuster is configured to at least partially store the tether strap in a coiled configuration.

19. The child car seat system according to claim 18, wherein: the angle adjuster includes a locking or unlocking belt retractor connected to the tether strap.

20. The child car seat system according to claim 8, wherein: said horizontal and vertical portions are pivotally coupled, wherein the frame is configurable between an open configuration and a closed configuration.

21. The child car seat system according to claim 8, further comprising: lap belt lockoffs coupled to said frame, said lap belt lockoffs configured from an unlocked position to a locked position, wherein the horizontal portion of the frame defines a lap belt pathway for routing a lap belt of a vehicle seatbelt across the horizontal portion, and wherein when the lap belt is received in said lap belt pathway, said lap belt lockoffs are locked and contact the lap belt.

22. The child car seat system according to claim 8, further comprising: at least one tether extending from said vertical portion for coupling to a vehicle anchor; and a plurality of mini-connectors extending from said horizontal portion for coupling to corresponding LATCH anchors on the vehicle.

23. The child car seat system according to claim 22, wherein: one or more of the mini-connectors are selectively laterally displaceable.

24. The child car seat system according to claim 22, wherein: the tether includes an adjustable length rigid portion extending from the vertical portion and a flexible portion extending from the rigid portion to a tether connector.

* * * * *